United States Patent [19]
Ishizu et al.

[11] Patent Number: 5,475,710
[45] Date of Patent: Dec. 12, 1995

[54] ADAPTIVE EQUALIZER AND RECEIVER

[75] Inventors: Fumio Ishizu; Kouji Ueda; Keishi Murakami, all of Kanagawa, Japan

[73] Assignee: Mitsubishi Denki Kabushiki Kaisha, Tokyo, Japan

[21] Appl. No.: 998,517

[22] Filed: Dec. 29, 1992

[30] Foreign Application Priority Data

Jan. 10, 1992 [JP] Japan .................................. 4-003276

[51] Int. Cl.⁶ .......................... H03H 7/30; H03H 7/40; H04L 7/00; H04L 27/06
[52] U.S. Cl. ..................... 375/232; 375/231; 375/233; 375/365; 375/344; 333/18; 364/724.19; 364/724.2; 381/103
[58] Field of Search ................................. 375/11, 12, 13, 375/14, 15, 96, 97, 114, 111, 116, 118, 85, 86, 53, 54; 333/18, 28 R; 364/724.19, 724.2

[56] References Cited

U.S. PATENT DOCUMENTS

| | | | |
|---|---|---|---|
| 3,648,171 | 3/1972 | Hirsch | 325/42 |
| 3,715,670 | 2/1973 | Hirsch et al. | 325/331 |
| 4,567,599 | 1/1986 | Mizoguchi | 375/14 |
| 4,599,732 | 7/1986 | LeFever | 375/13 |
| 4,811,360 | 3/1989 | Potter | 375/11 |
| 4,829,543 | 5/1989 | Borth et al. | 375/83 |
| 4,847,869 | 7/1989 | Labedz et al. | 375/85 |
| 4,852,090 | 7/1989 | Borth | 370/104 |

(List continued on next page.)

FOREIGN PATENT DOCUMENTS

| | | |
|---|---|---|
| 0225652 | 6/1987 | European Pat. Off. |
| 1251970 | 10/1989 | Japan |
| 2240674 | 1/1991 | United Kingdom |
| WO85/04999 | 11/1985 | WIPO |
| WO88/05981 | 8/1988 | WIPO |
| WO91/00660 | 1/1991 | WIPO |

OTHER PUBLICATIONS

Lars Svensson, "Channel Equalizer for a Digital Mobile Telephone Using Narrow–Band TDMA Transmission," 39th IEEE Vehicular Technology Conf., vol. I, pp. 55–58 (May 1–3, 1989).

Björn Gudmundson, "Adaptive Decision Feedback Equalizers to Combat Time Dispersion on the Mobile Radio Channel," Eurocon 88, 8th European Conf. on Electronics, pp. 106–109 (Nov. 14, 1988).

M. S. Mueller, "Least–Squares Algorithms for Adaptive Equalizers," The Bell System Technical Journal, Oct. 1981, pp. 1905–1925, (Manuscript received Mar. 17, 1981).

Wen–Hsiung Chen, and William K. Pratt, "Scene Adaptive Coder," IEEE Transactions on Communications, vol. Com–32, No. 3, Mar. 1984, pp. 225–232.

(List continued on next page.)

Primary Examiner—Stephen Chin
Assistant Examiner—William Luther
Attorney, Agent, or Firm—Wolf, Greenfield & Sacks

[57] ABSTRACT

A receiver capable of effecting frame synchronization control even at the time of initial acquisition and hand off in the presence of frequency selective fading. The receiver is provided in a demodulator part thereof with a quasi-coherent detector (140), a memory (144) for temporarily storing the output of the quasi-coherent detector, a write address counter (145) for the memory, an incoherent correlator (146) that determines correlation between a received data pattern and a known UW data pattern, a UW tentative detection circuit (147) that is supplied with the output of the address counter and the output of the incoherent correlator, an adaptive equalizer (148) that equalizes the received data stored in the memory by using the output of the UW tentative detection circuit, a UW detector (103) that effects UW position detection on the basis of the equalized data, and a frame synchronization control circuit (150) that effects frame synchronization control on the basis of the output of the UW tentative detection circuit and the output of the UW detector.

31 Claims, 37 Drawing Sheets

U.S. PATENT DOCUMENTS

| | | | |
|---|---|---|---|
| 4,890,298 | 12/1989 | Galpin | 375/14 |
| 4,891,698 | 1/1990 | Mattausch et al. | 358/135 |
| 4,893,184 | 1/1990 | Mattausch et al. | 358/135 |
| 4,947,409 | 8/1990 | Raith et al. | 375/97 |
| 4,985,902 | 1/1991 | Gurcan | 375/14 |
| 5,050,186 | 9/1991 | Gurcan et al. | 375/14 |
| 5,068,873 | 11/1991 | Murakami | 333/18 |
| 5,121,414 | 6/1992 | Levine et al. | 375/13 |
| 5,150,380 | 9/1992 | Okanoue | 375/12 |
| 5,164,962 | 11/1992 | Nakai et al. | 375/13 |
| 5,175,746 | 12/1992 | Inoue et al. | 375/13 |
| 5,175,747 | 12/1992 | Murakami | 375/14 |
| 5,199,047 | 3/1993 | Koch | 375/96 |
| 5,214,671 | 5/1993 | Nakai . | |
| 5,276,706 | 1/1994 | Critchlow | 375/13 |

OTHER PUBLICATIONS

Ronald Plompen et al., "Motion Video Coding in CCITT SG XV—The Video Source Coding," pp. 0997–1004, IEEE, 1988.

Ueda & Suzuki "Performance of Equalizers Employing a Re–Training RLS Algorithm for Digital Mobile Radio Communications".

Nakai, et al "Adaptive Equalizer for Digital Cellular Radio".

K. Murakami, et al "Design of an Adaptive Kalman Equalizer and its Performance Over Fading Multipath Channels", May, 1990.

M. Nakajima, et al "Performance of a Decision Feedback Equalizer Under Frequency–Selective fading in Land Mobile Communications" Electronics & Communications in Japan, Nov. 1990.

| $X_K$ | -1 | 1 | 1 | -1 |
|---|---|---|---|---|
| $Y_K$ | -1 | -1 | 1 | 1 |
| CODE (K) | 0 | 1 | 2 | 3 |

Fig. 3

| K | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $X_K$ | 1 | 1 | 1 | -1 | -1 | -1 | 1 | -1 | 1 | 1 | -1 | -1 | 1 | 1 |
| $Y_K$ | -1 | -1 | -1 | 1 | -1 | 1 | 1 | 1 | 1 | -1 | 1 | -1 | -1 | -1 |
| CODE(2)~CODE(15) | 1 | 1 | 1 | 3 | 0 | 3 | 2 | 3 | 2 | 1 | 3 | 0 | 1 | 1 |

Fig. 4

| K | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| CODE(K) | 0 | 1 | 2 | 3 | 2 | 2 | 1 | 3 | 2 | 0 | 1 | 0 | 0 | 1 | 2 |

Fig. 5

| CODE(K) | 0 | 1 | 2 | 3 |
|---|---|---|---|---|
| COALR(K) | -1 | -1 | 1 | 1 |
| COBMR(K) | -1 | 1 | 1 | -1 |

Fig. 6

| K | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| COALR(K) | -1 | -1 | 1 | 1 | 1 | 1 | -1 | 1 | 1 | -1 | -1 | -1 | -1 | -1 | 1 |
| COBMR(K) | -1 | 1 | 1 | -1 | 1 | 1 | -1 | 1 | -1 | 1 | 1 | -1 | -1 | 1 | 1 |

Fig. 7(a)

| ADDRESS | 0 | 1 | 2 | 3 | 4 | 5 | 6 | 7 |
|---|---|---|---|---|---|---|---|---|
| PHASE OF ROTATION | 0 | $-\pi/4$ | $-\pi/2$ | $-3\pi/4$ | $-\pi$ | $-5\pi/4$ | $-3\pi/2$ | $-7\pi/4$ |

Fig. 7(b)

| ADDRESS | 0 | 1 | 2 | 3 | 4 | ..... | 8N-1 |
|---|---|---|---|---|---|---|---|
| PHASE OF ROTATION | 0 | $-\pi/4N$ | $-\pi/2N$ | $-3\pi/4N$ | $-\pi/N$ | ..... | $-(8N-1)\pi/4N$ |

Fig. 8

| K | 1 | 2 | 3 | 4 | 5 | 6 | 7 | 8 |
|---|---|---|---|---|---|---|---|---|
| $X^I_k$ | $\sqrt{2}$ | 0 | $-\sqrt{2}$ | 0 | $-\sqrt{2}$ | $-\sqrt{2}$ | 0 | 0 |
| $X^Q_k$ | 0 | $-\sqrt{2}$ | 0 | $\sqrt{2}$ | 0 | 0 | $-\sqrt{2}$ | $\sqrt{2}$ |

| K | 9 | 10 | 11 | 12 | 13 | 14 | 15 |
|---|---|---|---|---|---|---|---|
| $X^I_k$ | $-\sqrt{2}$ | $\sqrt{2}$ | 0 | $\sqrt{2}$ | $\sqrt{2}$ | 0 | $-\sqrt{2}$ |
| $X^Q_k$ | 0 | 0 | $-\sqrt{2}$ | 0 | 0 | $-\sqrt{2}$ | 0 |

Fig. 9

| $d^I(K)$ | -1 | -1 | 1 | 1 |
|---|---|---|---|---|
| $d^Q(K)$ | -1 | 1 | 1 | -1 |
| CODEF (K) | 0 | 1 | 2 | 3 |

Fig. 10

| K | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| $d^I(K)$ | -1 | -1 | 1 | 1 | 1 | 1 | -1 | 1 | 1 | -1 | -1 | -1 | -1 | -1 | 1 |
| $d^Q(K)$ | -1 | 1 | 1 | -1 | 1 | 1 | 1 | -1 | 1 | -1 | 1 | -1 | -1 | 1 | 1 |
| CODEF (K) | 0 | 1 | 2 | 3 | 2 | 2 | 1 | 3 | 2 | 0 | 1 | 0 | 0 | 1 | 2 |

Fig. 11

| CODEF (K) | 0 | 1 | 2 | 3 |
|---|---|---|---|---|
| $X_K'$ | -1 | 1 | 1 | -1 |
| $Y_K'$ | -1 | -1 | 1 | 1 |

Fig. 12

| K | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| CODEF (K) | 1 | 1 | 1 | 3 | 0 | 3 | 2 | 3 | 2 | 1 | 3 | 0 | 1 | 1 |
| $X_K'$ | 1 | 1 | 1 | -1 | -1 | -1 | 1 | -1 | 1 | 1 | -1 | -1 | 1 | 1 |
| $Y_K'$ | -1 | -1 | -1 | 1 | -1 | 1 | 1 | 1 | 1 | -1 | 1 | -1 | -1 | -1 |

Fig. 14

```
┌─────────────────────────────────────────────────────────┐
│ RECEIVED SIGNAL IS STORED IN MEMORY 24 BY WRITE         │
│ ADDRESS COUNTER 23.                                      │
└─────────────────────────────────────────────────────────┘
                            ↓
┌─────────────────────────────────────────────────────────┐
│ READ ADDRESS COUNTER 25 CAUSES RECEIVED SIGNAL          │
│ DATA CORRESPONDING TO UW 13, RANDOM DATA a 14 AND       │
│ CC 15 TO BE READ OUT FROM MEMORY 24 AND OUTPUT          │
│ TO FF PART 1, SYMBOL BY SYMBOL.                         │
└─────────────────────────────────────────────────────────┘
                            ↓
┌─────────────────────────────────────────────────────────┐
│ FF PART 1, FB PART 2, ADDER 3, DECISION CIRCUIT 4,      │
│ TAP-COEFFICIENT-UPDATE CIRCUIT 26 AND SWITCHING CIR-    │
│ CUIT 6 EQUALIZE UW 13, RANDOM DATA a 14 AND CC 15.      │
└─────────────────────────────────────────────────────────┘
                            ↓
┌─────────────────────────────────────────────────────────┐
│ UPON COMPLETION OF EQUALIZATION OF CC 15, TAP-          │
│ COEFFICIENT-UPDATE CIRCUIT 26 SENDS CC EQUALIZATION     │
│ COMPLETION SIGNAL TO READ ADDRESS COUNTER 25 AND        │
│ INITIALIZATION CIRCUIT 27.                              │
└─────────────────────────────────────────────────────────┘
                            ↓
┌─────────────────────────────────────────────────────────┐
│ ON RECEIPT OF CC EQUALIZATION COMPLETION SIGNAL,        │
│ INITIALIZATION CIRCUIT 27 INITIALIZES TAP-COEFFICIENT   │
│ -UPDATE CIRCUIT 26 AS WELL AS TAP-COEFFICIENTS OF       │
│ FF AND FB PARTS 1 AND 2.                                │
└─────────────────────────────────────────────────────────┘
                            ↓
┌─────────────────────────────────────────────────────────┐
│ READ ADDRESS COUNTER 25 READS OUT RECEIVED SIG-         │
│ NAL DATA CORRESPONDING TO CC 15 AND RANDOM DATA         │
│ b 16 FROM MEMORY 24 SEQUENTIALLY.                       │
└─────────────────────────────────────────────────────────┘
                            ↓
┌─────────────────────────────────────────────────────────┐
│ FF PART 1, FB PART 2, ADDER 3, DECISION CIRCUIT 4, TAP- │
│ COEFFICIENT-UPDATE CIRCUIT 26 AND SWITCHING CIRCUIT     │
│ 6 EXECUTE RETRAINING BY USING CC 15 AND THEREAFTER      │
│ EQUALIZE RANDOM DATA b 16 SEQUENTIALLY.                 │
└─────────────────────────────────────────────────────────┘
```

Fig. 16A

| Fig. 16A | Fig. 16B |

```
┌─────────────────────────────────────────────────────┐
│ RECEIVED SIGNAL IS STORED IN MEMORY 24              │
│ BY WRITE ADDRESS COUNTER 23.                        │
└─────────────────────────────────────────────────────┘
                         ↓
┌─────────────────────────────────────────────────────┐
│ READ ADDRESS COUNTER 28 CAUSES RECEIVED SIGNAL      │
│ DATA CORRESPONDING TO UW 13, RANDOM DATA a 14 AND   │
│ CC 15 TO BE READ OUT FROM MEMORY 24 AND OUTPUT      │
│ TO FF PART 1, SYMBOL BY SYMBOL.                     │
└─────────────────────────────────────────────────────┘
                         ↓
┌─────────────────────────────────────────────────────┐
│ FF PART 1, FB PART 2, ADDER 3, DECISION CIRCUIT 4,  │
│ TAP-COEFFICIENT-UPDATE CIRCUIT 29 AND SWITCHING     │
│ CIRCUIT 6 EQUALIZE UW 13, RANDOM DATA a 14          │
│ AND CC 15.                                          │
└─────────────────────────────────────────────────────┘
                         ↓
┌─────────────────────────────────────────────────────┐
│ TAP-COEFFICIENT-UPDATE CIRCUIT 29 OUTPUTS RESULT    │
│ OF EQUALIZATION OF RECEIVED DATA CC 15, i.e., HARD  │
│ DECISION RESULT MADE BY DECISION CIRCUIT 4, TO EQUA-│
│ LIZED DATA COMPARISON CIRCUIT 30, SYMBOL BY SYMBOL. │
└─────────────────────────────────────────────────────┘
                         ↓
┌─────────────────────────────────────────────────────┐
│ EQUALIZED DATA COMPARISON CIRCUIT 30 MAKES COM-     │
│ PARISON TO DECIDE WETHER OR NOT EQUALIZED RECE-     │
│ IVED DATA CC 15 IS COINCIDENT WITH KNOWN CC 15.     │
└─────────────────────────────────────────────────────┘
                   MATCH │
                         ↓
┌─────────────────────────────────────────────────────┐
│ READ ADDRESS COUNTER 28 READS OUT RECEIVED          │
│ SIGNAL DATA CORRESPONDING TO RANDOM DATA b 16       │
│ FROM MEMORY 24 SEQUENTIALLY.                        │
└─────────────────────────────────────────────────────┘
                         ↓
┌─────────────────────────────────────────────────────┐
│ FF PART 1, FB PART 2, ADDER 3, DECISION CIRCUIT 4,  │
│ TAP-COEFFICIENT-UPDATE CIRCUIT 29 AND SWITCHING     │
│ CIRCUIT 6 EQUALIZE RANDOM DATA b 16 SEQUENTIA-      │
│ LLY.                                                │
└─────────────────────────────────────────────────────┘
```

Fig. 16B

MISMATCH

INITIALIZATION CIRCUIT 31 INITIALIZES TAP-COEFFI-CIENT-UPDATE CIRCUIT 29 AND TAP-COEFFICIENTS OF FF AND FB PARTS 1 AND 2.

READ ADDRESS COUNTER 28 READS OUT RECEIVED SIGNAL DATA CORRESPONDING TO CC 15 AND RANDOM DATA b 16 FROM MEMORY 24 SEQUENTIALLY.

FF PART 1, FB PART 2, ADDER 3, DECISION CIRCUIT 4, TAP-COEFFICIENT-UPDATE CIRCUIT 29 AND SWITCHING CIRCUIT 6 EXECUTE RETRAINING BY USING CC 15 AND THEREAFTER EQUALIZE RANDOM DATA b 16 SEQUENTIALLY.

Fig. 18

```
┌─────────────────────────────────────────────────────────────┐
│ RECEIVED SIGNAL IS STORED IN MEMORY 32 BY WRITE             │
│ ADDRESS COUNTER 23.                                         │
└─────────────────────────────────────────────────────────────┘
                             ↓
┌─────────────────────────────────────────────────────────────┐
│ READ ADDRESS COUNTER 25 CAUSES RECEIVED SIGNAL DA-          │
│ TA CORRESPONDING TO UW 13 TO BE READ OUT FROM ME-           │
│ MORY 32 AND OUTPUT TO FF PART 1, SYMBOL BY SYMBOL.          │
└─────────────────────────────────────────────────────────────┘
                             ↓
┌─────────────────────────────────────────────────────────────┐
│ FF PART 1, FB PART 2, ADDER 3, DECISION CIRCUIT 4, TAP-     │
│ COEFFICIENT-UPDATE CIRCUIT 34 AND SWITCHING CIRCUIT 6       │
│ EXECUTE TRAINING BY USING RECEIVED SIGNAL DATA CORR-        │
│ ESPONDING TO UW 13. AFTER UPDATING OF TAP-COEFFICIENTS      │
│ FOR LAST UW DATA IN RECEIVED SIGNAL, TAP-COEFFICIENTS       │
│ ARE FIXED TO THE LAST UPDATED VALUES, AND TRAINING          │
│ COMPLETION SIGNAL IS SENT TO READ ADDRESS CO-               │
│ UNTER 33.                                                   │
└─────────────────────────────────────────────────────────────┘
                             ↓
┌─────────────────────────────────────────────────────────────┐
│ READ ADDRESS COUNTER 33 CAUSES RECEIVED SIGNAL DATA         │
│ CORRESPONDING TO UW 13 TO BE READ OUT FROM MEMORY 32        │
│ AND OUTPUT TO FF PART 1 AGAIN, SYMBOL BY SYMBOL.            │
└─────────────────────────────────────────────────────────────┘
                             ↓
┌─────────────────────────────────────────────────────────────┐
│ RECEIVED SIGNAL DATA IS SUBJECTED TO PRODUCT-SUM OP-        │
│ ERATION TOGETHER WITH THE FIXED TAP-COEFFICIENTS, AND       │
│ THE RESULT UNDERGOES HARD DECISION IN DECISION CIRCUIT      │
│ 4 AND IS SENT TO UW DETECTOR 35.                            │
└─────────────────────────────────────────────────────────────┘
                             ↓
┌─────────────────────────────────────────────────────────────┐
│ UW DETECTOR 35 COMPARES OUTPUT DATA SEQUENCE OF             │
│ DECISION CIRCUIT 4 WITH KNOWN UW DATA TO EFFECT             │
│ UW DETECTION                                                │
└─────────────────────────────────────────────────────────────┘
                             ↓
┌─────────────────────────────────────────────────────────────┐
│ AFTER COMPLETION OF UW DETECTION, RANDOM DATA               │
│ a 14, CC 15 AND RANDOM DATA b 16 ARE EQUALIZED              │
│ SEQUENTIALLY.                                               │
└─────────────────────────────────────────────────────────────┘
```

Fig. 23A

| Fig. 23A |
|----------|
| Fig. 23B |

```
         INPUT RECEIVED SIGNAL DATA
                    |
    ┌───────────────┴───────────────┐
NO COMPENSATION IS TO BE MADE    COMPENSATION IS TO BE MADE
                                        │
                                        ▼
                        FREQUENCY OFFSET COMPENSATION CIRCUIT 51 COMPENSATES FOR
                        FREQUENCY OFFSET WITH Δf (HZ).
                                        │
                                        ▼
                        RECEIVED SIGNAL DATA IS STORED IN MEMORY 47 BY ADDRESS
                        COUNTER 48.
                                        │
                                        ▼
                        ADDRESS COUNTER 48 CAUSES RECEIVED SIGNAL DATA CORRESPONDING
                        TO UW 13 TO BE READ OUT FROM MEMORY 47 AND OUTPUT TO FF PART 1
                        SYMBOL BY SYMBOL.
                                        │
                                        ▼
                        TRAINING IS EXECUTED BY USING RECEIVED SIGNAL DATA CORRESPONDING
                        TO UW 13, AND AFTER UPDATING OF TAP-COEFFICIENTS FOR LAST UW DATA
                        IN RECEIVED SIGNAL, TAP-COEFFICIENTS ARE FIXED TO THE LAST UPDATED VALUES.
                                        │
                                        ▼
                        ADDRESS COUNTER 48 CAUSES RECEIVED SIGNAL DATA CORRESPONDING TO
                        UW 13 TO BE READ OUT FROM MEMORY 47 AND OUTPUT TO FF PART 1 AGAIN,
                        SYMBOL BY SYMBOL. THE READOUT DATA IS SUBJECTED TO
                        PRODUCT-SUM OPERATION TOGETHER WITH THE FIXED TAP-COEFFICIENTS,
                        AND THE RESULT IS SENT TO FREQUENCY OFFSET DIRECTION ESTIMATION
                        CIRCUIT 49.
```

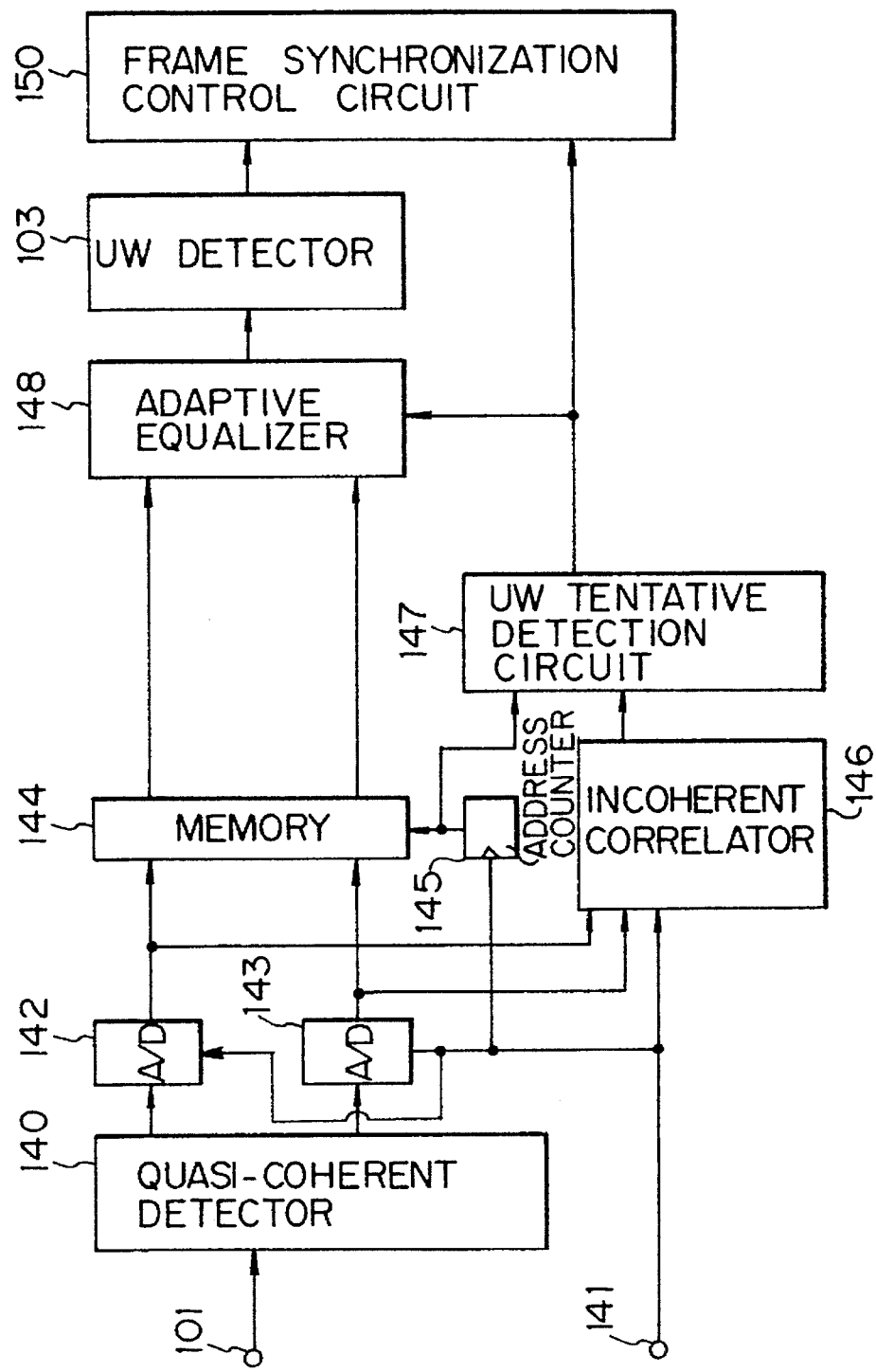

| FREQUENCY OFFSET | UW DETECTION |
|---|---|
| $fmax - N \cdot \Delta df$ | X |
| $fmax - (N-1) \cdot \Delta df$ | X |
| ⋮ | ⋮ |
| $fmax - df$ | O |
| $fmax$ | O |
| $fmax + \Delta df$ | O |
| ⋮ | ⋮ |
| $fmax + (N-1) \Delta df$ | X |
| $fmax + N \cdot \Delta df$ | X |

O : UW DETECTED
X : NO UW DETECTED

| Xk | Yk | ΔΦ |
|---|---|---|
| 1 | 1 | $-3\pi/4$ |
| -1 | 1 | $3\pi/4$ |
| -1 | -1 | $\pi/4$ |
| 1 | -1 | $-\pi/4$ |

| K | 1 | 2 | 3 | 4 | 5 | 6 | 7 | 8 |
|---|---|---|---|---|---|---|---|---|
| Ik | $\sqrt{2}$ | 1 | 0 | -1 | $\sqrt{2}$ | 1 | $-\sqrt{2}$ | 1 |
| Qk | 0 | -1 | $-\sqrt{2}$ | -1 | 0 | 1 | 0 | 1 |

| K | 9 | 10 | 11 | 12 | 13 | 14 | 15 |
|---|---|---|---|---|---|---|---|
| Ik | $-\sqrt{2}$ | 1 | $\sqrt{2}$ | -1 | $-\sqrt{2}$ | -1 | 0 |
| Qk | 0 | 1 | 0 | 1 | 0 | 1 | $\sqrt{2}$ |

ADAPTIVE EQUALIZER AND RECEIVER

BACKGROUND OF THE INVENTION

1. Field of the Invention

The present invention relates to an adaptive equalizer which is used for minimizing degradation of transmission characteristics in high bit rate digital mobile communication, in which transmission characteristics are substantially degraded by waveform distortion due to frequency selective fading. The present invention also relates to a receiver which may be used in an environment attended with frequency selective fading.

2. Description of the Prior Art

There have heretofore been baseband waveform adaptive equalizers which are capable of tracking a rapid time-varying channel as in mobile communication and whose initial setting can be effected by a training process in a short period of time. One example of known adaptive equalizers of the type described above is a decision-feedback adaptive equalizer which is disclosed in Nakajima and Sampei, "Performance of a Decision Feedback Equalizer under Frequency Selective Fading in Land Mobile Communications", the Transaction of the Institute of Electronics, Information and Communication Engineers (B-II), J72-B-II, No. 10, pp. 513–523 (October 1989).

FIG. 42 is a block diagram of the decision-feedback adaptive equalizer disclosed in the above-mentioned literature, which is designed for a system in which the received signal is a Quaeternary Phase-Shift Keying (QPSK) modulation signal (transmission bit rate: 2/T bps; T is 1 symbol time).

In the figure, reference numeral 1 denotes a feedforward transversal filter (hereinafter referred to as "FF part") in which the tap interval is a predetermined delay time Tp (second) and the number of taps is L, and 2 a feedback transversal filter (hereinafter referred to as "FB part") in which the tap interval is a predetermined delay time T (second) and the number of taps is (M-L). An adder 3 adds together data output from the FF and FB parts 1 and 2. A decision circuit 4 identifies a data sequence output from the adder 3 every T sec. and makes a hard decision thereon. A tap-coefficient-update circuit 5 determines tap-coefficients for the FF part i and the FB part 2 every T sec. A switching circuit 6 functions such that either the output data sequence of the decision circuit 4 or a reference data sequence is selectively input to the FB part 2. Reference numeral 7 denotes a received signal input port of the decision-feedback adaptive equalizer, 8 a reference sequence input port, and 9 an output pore of the adaptive equalizer.

FIG. 43 shows one example of a burst format for signals employed in mobile communication.

The burst shown in FIG. 43 comprises a unique word (UW) 13 which is used for training of a decision-feedback adaptive equalizer and for establishing frame synchronization, random data a (information bits) 14, a color code (hereinafter referred to as "CC") 15 which is used for identification of a base station or as a training sequence for the equalizer, and random data b (information bits) 16.

The operation of the conventional decision-feedback adaptive equalizer will be explained below.

in the decision-feedback adaptive equalizer shown in FIG. 42, which is designed for a system in which the received signal is a QPSK modulation signal, the received signal is converted into a baseband signal by a demodulator, and channel characteristics are estimated by using the UW 13 (shown in FIG. 43), which is at the head of each burst, thus effecting convergence of the tap-coefficients (training mode). The signal input to the FB part 2 at this time is data without decision error, that is, a reference data sequence that is determined by the UW 13. Next, equalization is executed on the random data a 14, the CC 15 and the random data b 16 (tracking mode).

For the random data a 14 and the random data b 16, the signal output from the decision circuit 4 is input to the FB part 2 as a received signal sequence. For the CC 15, a reference data sequence that is determined by the CC 15 is input to the FB part 2.

The tap-coefficient-update circuit 5 updates the tap coefficients of the FF and FB parts 1 and 2 for each symbol according to a tap-coefficient-update algorithm, e.g., Kalman filter algorithm (RLS algorithm), by using the received signal sequence input to the decision-feedback adaptive equalizer, reference data sequences that are determined by the respective known training sequences of the UW 13 and the CC 15, the output data sequence of the decision circuit 4, and the output data from the adder 3.

As one example of the tap-coefficient-update algorithm, Kalman filter algorithm (RLS algorithm) will be briefly explained below.

It is assumed that the signal vector input to the equalizer at time $t=nT$ ($n=0,1,2,\ldots$) is $X_M(n)$, the tapcoefficient is $C_M(n)$, the equalizer output is $I(n)$, the desired output is $d(n)$, and the error is $e(n)$.

Here, $X_M(n)$, $C_M(n)$, $I(n)$ and $d(n)$ are complex numbers comprising in-phase and quadrature channels.

Assuming that the number of taps in the FF part 1 of the decision feedback adaptive equalizer is L and the total number of taps is M, the above factors are represented as follows:

$$X_M(n)=[y_1^*(n),\ldots,y_L^*(n),d_1^*(n),d_2^*(n),\ldots,d_{M-L}^*(n)]^* \quad (1)$$

$$C_{NM}(n)=[C_1^*(n),C_2^*(n),\ldots,C_M^*(n)] \quad (2)$$

$$I(n)=C_M^*(n-1)X_M(n) \quad (3)$$

$$e(n/n-1)=d(n)-I(n)=d(n)-C_M^*(n-1)X_M(n) \quad (4)$$

In the above equations * represents a complex conjugate transpose matrix (or vector).

In addition, $d(n)$ is a known training sequence in the training mode, whereas in the tracking mode it is an output data sequence obtained from the decision circuit 4 as a result of a hard decision made on the result of Equation 3. The desired value in this algorithm is the tap-coefficient $C_M(n)$ which minimizes the estimation function $\epsilon$ represented by $$\epsilon = \sum_{i=1}^{n} \lambda^{n-i} e^*(i/n)e(i/n) \quad (5)$$

where $\lambda$ represents the forgetting factor ($0<\lambda\leq 1$). $C_M(n)$ that minimizes Equation 5 is given by $$C_M(n) = R^{-1}(n)D(n) \quad (6)$$

$$P^{-1}(n) = R(n) = \sum_{i=1}^{n} \lambda^{n-i} X_M(i)X_M^*(i) + \delta\lambda^n I \quad (7)$$

where $\delta$ represents a positive constant.

$$D(n) = \sum_{i=1}^{n} \lambda^{n-i} X_M(i) d^*(i) \quad (8)$$

The algorithm for recursively obtaining $C_M(n)$ at time $t=nT$ from $C_M(n-1)$ and $P(n-1)$ at time $t=(n-1)T$ is as follows:

$$K(n)=P(n-1)X_M(n)/[\lambda+X_M^*(n)P(n-1)X_M(n)] \quad (9)$$

$$P(n)=[P(n-1)-K(n)X_M^*(n)P(n-1)] \quad (10)$$

$$C_M(n)=C_M(n-1)+K(n)e^*(n/n-1) \quad (11)$$

$$P(0)=\delta^{-1}I, \; C_M(0)=0 \quad (12)$$

where $K(n)$ is the Kalman gain, $P(n)$ the tapcoefficient error covariance matrix, and $I$ the identity matrix.

It should be noted that the tap-coefficient-update algorithm is described in detail in S. Haykin, "Introduction to Adaptive Filters", Chapter 5, Gendai Kogaku-Sha (1987), translated by Tsuyoshi Takebe, and J. G. Proakis, "Digital Communications", Chapter 6.8, McGraw-Hill (1983).

In the foregoing, the decision-feedback adaptive equalizer, which is designed for a system in which the received signal is a QPSK modulation signal, as shown in FIG. 42, has been described; the following is consideration of a case where the received signal input to the abovedescribed adaptive equalizer is a π/4 shifted QPSK modulation signal (transmission bit rate: 2/T bps; T is symbol time).

Here, as one example of π/4 shifted QPSK modulation, an encoding scheme that is disclosed in EIA Document, IS-54, "Cellular System Dual-Mode Mobile Station Compatibility Standard" (Dec. 1990) will be shown, and the reference signal of the adaptive equalizer for the encoding scheme will also be explained.

FIG. 44 is a block diagram showing one example of a means for encoding a transmission data sequence according to the above encoding scheme.

Referring to FIG. 44, a transmission data sequence bm is converted sequentially from the first data by serial-to-parallel conversion in such a manner that odd-numbered data is converted into a data sequence $X_K$, while even-numbered data is converted into a data sequence $Y_K$. Then, $(X_K, Y_K)$ is converted into a transmission data sequence $(I_K, Q_K)$ by differential encoding according to Equations 13a and 13b:

$$K_K=I_{K-1}\cos[\Delta\phi(X_K,Y_K)] - Q_{K-1}\sin[\Delta\phi(X_K,Y_K)] \quad (13a)$$

$$Q_K=I_{K-1}\sin[\Delta\phi(X_K,Y_K)] + Q_{K-1}\cos[\Delta\phi(X_K,Y_K)] \quad (13b)$$

The phase change $\Delta\phi$ is given according to the table shown in FIG. 45.

Assuming that the reference point $(I_1, Q_1)$ is $(2^{1/2}, 0)$ and that the transmission data sequence bm (1,-1,1,-1,1,-1, -1,1, -1,-1,-1,1,1,1,-1,1,1,1,1,-1,-1,1,-1,-1,1,-1,1,-1) is processed according to the above encoding scheme, it is converted into a differentially encoded data sequence $(I_K, Q_K)$ shown in the table of FIG. 46.

Accordingly, when the transmission data sequence bm is the UW 13 or the CC 15, the data sequence $(I_K, Q_K)$ shown in the table of FIG. 46 is used as a reference data sequence for the adaptive equalizer shown in FIG. 42.

Next, the decision circuit of the conventional adaptive equalizer will be explained.

In the decision-feedback adaptive equalizer shown in FIG. 42, a decision is made on the output of the adder 3 in the decision circuit 4 by using a method explained below:

First, the output $(I'(K), I^Q(K))$ of the adder 3 ($K$ represents the output data of the adder 3 for the $K$-th symbol) is sorted according to whether $K$ is an odd number or an even number.

(a) When $K$ is an odd number: the output $(I'(K), I^Q(K))$ of the adder 3 is subjected to an arithmetic operation for π/4 phase rotation, and the phase-rotated data $(I^{r'}(K), I^{Q'}(K))$ is judged to determine a decision value $(d^I(K), d^Q(K))$ according to whether the sign of $(I^{r'}(K), I^{Q'}(K))$ is positive or negative, as shown in FIG. 47(a).

(b) When $K$ is an even number: the output $(I'(K), I^Q(K))$ of the adder 3 is judged to determine a decision value $(d^I(K), d^Q(K))$ according to whether the sign of $(I'(K), IQ(K))$ is positive or negative, as shown in FIG. 47(b).

Further, the above decision value (i.e., the output of the decision circuit 4) is differentially decoded to obtain an equalized data sequence.

As has been described above, when the received signal input to the adaptive equalizer shown in FIG. 42 is a π/4 shifted QPSK modulation signal, the output $(I'(K), I^Q(K))$ of the adder 3 is sorted according to whether $K$ is an odd number or an even number. When $K$ is an odd number, the output $(I'(K), I^Q(K))$ of the adder 3 needs an arithmetic operation for π/4 phase rotation. Therefore, the number of arithmetic operations required in the decision circuit 4 increases, and the arrangement becomes complicated.

Conventional receivers used in time-division multiplex (TDM) or time-division multiple access (TDMA) communication include the one that is disclosed in Yamamoto and Kato, "TDMA Communications", the Institute of Electronics, Information and Communication Engineers (1989), for example.

FIG. 48 is a block diagram of a demodulator part including a frame synchronization system in the conventional receiver, disclosed in the above-mentioned reference.

In the figure, reference numeral 101 denotes an input port for a received IF signal. A demodulator 102 extracts a timing clock and data from the received IF signal and outputs them. A UW detector 103 performs UW detection on the basis of the data output from the demodulator 102 and outputs either a UW detection signal or a UW missed detection signal. A frame synchronization control circuit 104 effects frame synchronization control on receipt of the UW detection signal.

FIG. 49 is a block diagram showing exemplarly the internal arrangement of the UW detector 103 shown in FIG. 48.

In the figure, reference numerals 121 and 122 denote input ports for data of two quadrature channels Ich and Qch output from the demodulator 102, and 123 an input port for a recovered clock output from the demodulator 102. A correlator 124 receives the Ich data as an input signal and operates on the basis of the recovered clock supplied through the input port 123, while a correlator 125 receives the Qch data as an input signal and operates on the basis of the recovered clock supplied through the input port 123. An adder 126 adds together the outputs of the two correlators 124 and 125. A comparator 127 makes a comparison between the output of the adder 126 and a predetermined threshold and outputs a UW detection signal in accordance with the result of the comparison. Reference numeral 128 denotes an output port of the comparator 127.

FIG. 50 is a block diagram showing exemplarly the internal arrangement of the correlator 124 shown in FIG. 49.

In the figure, a correlator input port 130 is equivalent to the input port 121 of the UW detector 103.

Reference numeral 131 denotes an input port for the recovered clock. A shift register 132 has a number of stages corresponding to the UW length (unit symbol) for taking in the input signal and operates on the basis of the recovered clock. A register 133 has a number of stages corresponding to the UW length (unit symbol) for storing the Ich UW pattern. A multiplexer part 134 comprises multiplexers which are each arranged to multiply together a pair of corresponding bits of data stored in the shift register 132 and the register 133. An adder 135 adds together the outputs of the multiplexers constituting the multiplexer part 134. Reference numeral 136 denotes an output port of the adder 135.

It should be noted that the correlator 125 is arranged in the same way as the correlator 124 except that the register 133 in the correlator 125 stores the Qch UW pattern.

The operation of the UW detector 103 will be explained below with reference to FIGS. 48, 49 and 50.

In the correlator 124, the Ich data in the output of the demodulator 102 is input to the shift register 132, and the contents of the shift register 132 are shifted to the right in response to the recovered clock. Bits of data which are shifted to the right in the shift register 132 are multiplied in the respective multiplexers by the corresponding bits of the known Ich UW pattern ($r_1$ to $r_N$) stored in the register 133, and the resulting outputs of the multiplexers are input to the adder 135. The adder 135 adds together the outputs of the multiplexers and outputs a correlation value between the data stored in the shift register 132 and the register 133.

Similarly, the correlator 125 determines a correlation between the Qch data and the known Qch UW pattern and outputs a correlation value.

The respective outputs of the correlators 124 and 125 are added together in the adder 126. As a result, the total correlation value between the input data and the Ich and Qch UW patterns is input to the comparator 127.

The comparator 127 makes a comparison between the output value of the adder 126 and a predetermined threshold A. When the adder output value $\geq A$, the comparator 127 sends a UW detection signal to the frame synchronization control circuit 104, whereas, when the adder output value <A, the comparator 127 sends a UW missed detection signal to the circuit 104. On receipt of the UW detection signal or the UW missed detection signal, the frame synchronization control circuit 104 recognizes the frame position and the synchronization state and then effects frame synchronization control.

It should be noted that the UW detector is detailed in the above-mentioned reference entitled "TDMA communications", at pp. 48.

In mobile communication where frequency selective fading is present in the channel, however, the conventional receiver arrangement shown in FIG. 48 suffers from degradation of the transmission characteristics, and there is therefore a demand for a receiver equipped with an adaptive equalizer as one of the measures to solve the problem.

The conventional adaptive equalizers, arranged as described above, suffer from problems as stated below:

When the received signal is a π/4 shifted QPSK modulation signal, the decision circuit of the adaptive equalizer needs to sort the output of the adder when making a decision and to execute an arithmetic operation for π/4 phase rotation, so that the number of arithmetic operations required in the decision circuit increases, resulting in a complicated arrangement.

In addition, if data decision errors occur successively due to rapid time-varying channel characteristics after the tap-coefficients have been made to converge to the optimum values by estimating the channel characteristics by use of the UW at the head of a burst in the presence of frequency selective fading, updating of the tap-coefficients cannot be effected in the direction in which the tap-coefficients converge to the optimum values, so that the bit error rate for data in the latter half of the burst increases.

In addition, since the bit error rate remains high until the tap-coefficients are made to converge to the optimum values by estimating channel characteristics by use of the UW at the head of a burst in the presence of frequency selective fading, the UW detection probability at the UW detector that uses the output of the decision circuit in the adaptive equalizer is low.

In addition, when the received signal input to the adaptive equalizer has a frequency offset due to the difference between the carrier frequency of the received signal and the local oscillator frequency of the receiver including the adaptive equalizer, equalization cannot be performed in such a manner as to follow up the phase change of the received signal caused by the frequency offset, so that the equalization characteristics degrade considerably.

The conventional receiver having the above-described arrangement suffers from the following problems.

To obtain synchronization for reception as a synchronization control procedure in the conventional receiver, a UW detection signal is obtained from data output from the demodulator, thereby effecting synchronization control.

However, if an adaptive equalizer is provided in the demodulator to cope with the fast variation of channel characteristics in the presence of frequency selective fading, it is necessary to know the UW position at the head of the burst in advance (that is, frame synchronization must be established in advance). However, since the UW position has not yet been known at the time of initial acquisition or hand off, the adaptive equalizer cannot operate, so that the receiver cannot start on its operation (that is, frame synchronization cannot be attained).

In addition, when a demodulator including an equalizer is used in the presence of frequency selective fading, it may be impossible to detect the UW position accurately because the output value of an incoherent correlator included in the demodulator depends on not only the input data pattern but also other factors due to rapid level variation caused by the fading.

In addition, when a demodulator including an adaptive equalizer is used, the adaptive equalizer cannot operate due to a frequency offset of the received signal at the time of initial acquisition or hand off, so that the UW position cannot be detected in the UW detector and hence frame synchronization control cannot be effected.

SUMMARY OF THE INVENTION

In view of the above-described circumstances, it is an object of the invention to provide an adaptive equalizer which is designed so that the decision circuit that makes a decision on a received signal of π/4 shifted QPSK modulation has a simplified arrangement.

It is an object of the invention to provide an adaptive equalizer which is designed so that even in a case where channel characteristics vary rapidly in the presence of frequency selective fading, the bit error rate in the latter half of each burst is minimized, thereby reducing the bit error rate in the burst as a whole.

It is an object of the invention to provide an adaptive equalizer which is designed so that the UW detection probability in the presence of frequency selective fading is increased.

It is an object of the invention to provide an adaptive equalizer which is designed so that even if the received signal has a frequency offset, the degradation of the equalization characteristics due to the frequency offset is minimized.

It is an object of the invention to provide a receiver wherein the UW position is detected before frame synchronization is established, thereby enabling frame synchronization control to be effected even at the time of initial acquisition or hand off in the presence of frequency selective fading.

It is an object of the invention to provide a receiver which is designed so that even when there is rapid level variation in the presence of frequency selective fading, UW detection can be performed normally and frame synchronization control can be effected normally.

It is an object of the invention to provide a receiver which is designed so that even when there is a frequency offset due to the difference between the carrier frequency of the received signal and the local oscillator frequency of the receiver including an adaptive equalizer at the time of initial acquisition or hand off, UW detection can be performed normally and frame synchronization control can be effected normally.

To attain the above-described objects, the invention provides an adaptive equalizer having a transversal filter, a decision part, and a tap-coefficient-update part that updates tap-coefficients of the transversal filter according to a tap-coefficient-update algorithm, e.g., Kalman filter, wherein the improvement is characterized by comprising a complex multiplexer that phase-rotates a received signal input to the transversal filter, and a differential decoder that differentially decodes the output of the decision part, and in that the received signal is equalized after a ($\pi/4$) phase rotation component has been eliminated therefrom.

In addition, the invention provides an adaptive equalizer having a transversal filter, a decision part, and a tap-coefficient-update part that updates tap-coefficients of the transversal filter according to a tap-coefficient-update algorithm, e.g., Kalman filter, wherein the improvement comprises: means for initializing the tap-coefficient-update part and the tap-coefficients of the transversal filter a plurality of times during one burst; and means for retraining the transversal filter by using a training sequence contained in the burst.

In addition, the invention provides an adaptive equalizer, which further comprises means for making a comparison between a training sequence interposed in the burst, which has been equalized, and a known training sequence; and means for initializing the tap-coefficients and executing retraining only when there is an error in the equalized training sequence.

In addition, the invention provides an adaptive equalizer having a transversal filter, a decision part, and a tap-coefficient-update part that updates tap-coefficients of the transversal filter according to a tap-coefficient-update algorithm, e.g., Kalman filter, wherein the improvement comprises: a memory for storing a received signal; and a unique word (hereinafter referred to as "UW") detector that effects UW detection by using the inner product of the last updated tap-coefficients for the UW and the received signal stored in the memory.

In addition, the invention provides an adaptive equalizer, which further comprises: means for subjecting UW data stored in the memory to an arithmetic operation to provide phase rotations corresponding to different frequency offsets; UW detection means that sends the result of the arithmetic operation to the transversal filter and effects UW detection with respect to the UW data; and means for estimating a frequency offset by using the result of the UW detection and for compensating for the frequency offset.

In addition, the invention provides an adaptive equalizer having a transversal filter, a decision part, and a tap-coefficient-update part that updates tap-coefficients of the transversal filter according to a tap-coefficient-update algorithm, e.g., Kalman filter, wherein the improvement comprises: a memory disposed in front of the transversal filter to store a received signal; and means for estimating for each burst a frequency offset direction by using the last updated tap-coefficients for the UW and the received signal stored in the memory, for detecting a frequency offset direction by averaging the estimated frequency offset directions, and for making compensation for frequency offset at a certain minute step.

In addition, the invention provides a receiver comprising: means for quasi-coherently detecting a received signal; a memory for temporarily storing received data output from the quasi-coherent detection means; an address counter that designates a write address for the memory; an incoherent correlator that determines correlation between a received data pattern output from the quasi-coherent detection means and a known UW pattern; means for tentatively detecting a UW position on the basis of an output of the address counter and an output of the incoherent correlator; an adaptive equalizer that equalizes the received data in the memory on the basis of an output of the UW position tentative detection means; a UW detector that detects a UW pattern on the basis of the equalized data; and means for effecting frame synchronization control on the basis of an output of the UW tentative detection means and an output of the UW detector.

In addition, the invention provides a receiver, further comprising means for selecting either a hard decision value or a soft decision value, which are obtained from data output from the quasi-coherent detection means, as one signal input to the incoherent correlator.

In addition, the invention provides a receiver, which further comprises means by which when UW data is to be sent to the adaptive equalizer, coarse Automatic Frequency Control (AFC) is effected in advance by using the output of the incoherent correlator, and a plurality of UW data which have been phase-rotated at minute steps around the frequency attained by the coarse AFC are sent to the adaptive equalizer to effect UW detection for each UW data.

In addition, the invention provides a receiver, which further comprises: a mixer which effects frequency conversion of a received signal; a voltage controlled oscillator which gives a local oscillator output to the mixer; and means for detecting a frequency offset in the adaptive equalizer and for feeding it back to the voltage controlled oscillator to make compensation for frequency offset.

In addition, the invention provides a receiver, which further comprises: means for estimating a frequency offset direction for each burst in the adaptive equalizer by using the last updated tap-coefficients for the UW and the received signal stored in the memory; means for detecting a frequency offset direction by averaging the estimated frequency offset directions; and means for making compensation for a frequency offset when detected by changing the control voltage applied to the voltage controlled oscillator in a direction in which the frequency offset is canceled.

The above-described adaptive equalizers and receivers according to the present invention function as follows:

In the adaptive equalizer of the invention, when a $\pi/4$ shifted QPSK modulation signal is received, the $\pi/4$ phase rotation component is eliminated from the received signal in the complex multiplexer provided in the input stage of the adaptive equalizer, thereby eliminating the need for sorting each output data of the adder and for an arithmetic operation for π/4 phase rotation in the decision circuit, and thus making it possible to simplify the arrangement of the decision circuit.

In the adaptive equalizer of the invention, when the CC and data following it are to be equalized, the tap-coefficient-update circuit and the tap-coefficients are initialized by the initialization circuit, and retraining is executed with the CC used as a reference data sequence for reestimation of the channel, thereby minimizing the increase in the bit error rate in the latter half of the burst even when there is a large change in the channel condition during one burst, and thus improving the bit error rate in the burst as a whole.

In the adaptive equalizer of the invention, when the CC and data following it are to be equalized, a comparison is made between the result of equalization executed without initializing the tap-coefficient-update circuit and the tap-coefficients and the known transmission signal sequence of the CC, and only when there is an error in the equalized data sequence, the tap-coefficient-update circuit and the tap-coefficients are initialized, and retraining is executed to reestimate the channel, thereby improving the bit error rate in the burst as a whole.

In the adaptive equalizer of the invention, UW detection is effected by making a comparison between the inner product of the last updated tap-coefficients for the UW and the received signal read out from the memory and a known training sequence UW, thereby making it possible to minimize the lowering of the UW detection probability even in the presence of frequency selective fading.

In the adaptive equalizer of the invention, the received signal is phase-rotated with different frequency offsets, and UW detection is effected with respect to the received signal phase-rotated in this way, so that even if the received signal has a frequency offset, the UW detection probability increases. In addition, the frequency offset can be estimated from the result of UW detection carried out on each of the phase-rotated received signal data. Therefore, by making compensation for the frequency offset, the equalization characteristics are improved.

In the adaptive equalizer of the invention, a frequency offset direction of the received signal is estimated for each burst, and the frequency offset directions estimated over several bursts are averaged to detect the frequency offset direction of the received signal, whereby the estimation accuracy is improved. In addition, by making compensation for the frequency offset, the equalization characteristics are improved.

The functions of the receivers of the present invention, which are arranged as described above, will be explained below.

In the receiver of the invention, the UW position is tentatively detected by the incoherent correlator, and the demodulator is activated by using the tentatively detected UW position, thereby enabling the demodulator, including the adaptive equalizer, to be activated before the frame synchronization control circuit starts its operation. In addition, it is possible to realize UW detection of high accuracy by effecting final UW detection with respect to the output of the demodulator, which has undergone adaptive equalization.

In the receiver of the invention when UW detection is performed in a range where the level variation cannot be ignored, the input signal of the incoherent correlator is subjected to a hard decision, thereby enabling the influence of the level variation to be eliminated, whereas, when UW detection is performed in a range where the level variation can be ignored, the input signal of the incoherent correlator is subjected to a soft decision, thereby allowing the desired operation.

In the receiver of the invention, coarse AFC is effected in advance, and a plurality of UW data which have been phase-rotated with different frequencies are sent to the adaptive equalizer to effect UW detection, whereby UW detection of high accuracy can be performed even when the received signal has a frequency offset.

In the receiver of the invention, a frequency offset that is estimated in the adaptive equalizer is fed back to the VCO (voltage controlled oscillator) to make compensation for the frequency offset, whereby stable demodulation can be realized even when the received signal has a frequency offset.

In the receiver of the invention, a frequency offset that is estimated in the adaptive equalizer is fed back to the VCO. In addition, the frequency offset direction is detected for each burst in the adaptive equalizer, and the frequency offset directions thus detected are averaged to detect the frequency offset direction of the received signal, which is then fed back to the VCO to make compensation for the frequency offset, whereby stable demodulation can be realized even when the received signal has a frequency offset.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which:

FIG. 3 is a table showing a data sequence CODE(K) obtained according to the code generation table shown in FIG. 2;

FIG. 4 is a table showing a data sequence CODE(K) obtained by differentially converting the data sequence CODE(K) shown in FIG. 3 according to Equation 14a;

FIG. 5 is a conversion table employed to obtain training sequences COALR(K) and COBMR(K) from the data sequence CODE(K) shown in FIG. 4;

FIG. 6 is a table showing a training data sequence obtained by converting the data sequence CODE(K), shown in FIG. 4, according to the conversion table shown in FIG. 5;

FIG. 7 shows the relationship between the input address and the phase of rotation in a COS/SIN generator of the adaptive equalizer shown in FIG. 1;

FIG. 8 is a table showing an output data sequence of a complex multiplexer of the adaptive equalizer shown in FIG. 1 when the input data sequence corresponds to the input data sequence shown in FIG. 46;

FIG. 9 is a code generation table employed to obtain a data sequence CODEF(K) from the output data sequence of a decision circuit of the adaptive equalizer shown in FIG. 1;

FIG. 10 is a table showing a data sequence CODEF(K) obtained when the output data sequence of the decision circuit of the adaptive equalizer shown in FIG. 1 is equal to the output data sequence of the complex multiplexer shown in FIG. 8;

FIG. 11 is a decoded data sequence conversion table employed to obtain a decoded data sequence $(X_K', Y_K')$ from a data sequence CODEF(K) obtained by differentially decoding the data sequence CODEF(K), shown in FIG. 10, according to Equation 14b;

FIG. 12 is a table showing a decoded data sequence $(X_K', Y_K')$ obtained by converting the data sequence CODEF(K), shown in FIG. 10, according to the decoded data sequence conversion table shown in FIG. 11;

FIG. 14 is a flowchart showing the operation of the adaptive equalizer shown in FIG. 13;

FIGS. 16A–16B are flowcharts showing the operation of the adaptive equalizer shown in FIG. 15;

FIG. 18 is a flowchart showing the operation of the adaptive equalizer shown in FIG. 17;

FIGS. 23A–23B are flowcharts showing the operation of the adaptive equalizer shown in FIG. 22;

FIG. 24 is a block diagram showing Embodiment 7 of the receiver according to the present invention;

DESCRIPTION OF THE PREFERRED EMBODIMENTS

Embodiment 1

A first embodiment of the present invention will be described below.

Figures 1, 2:
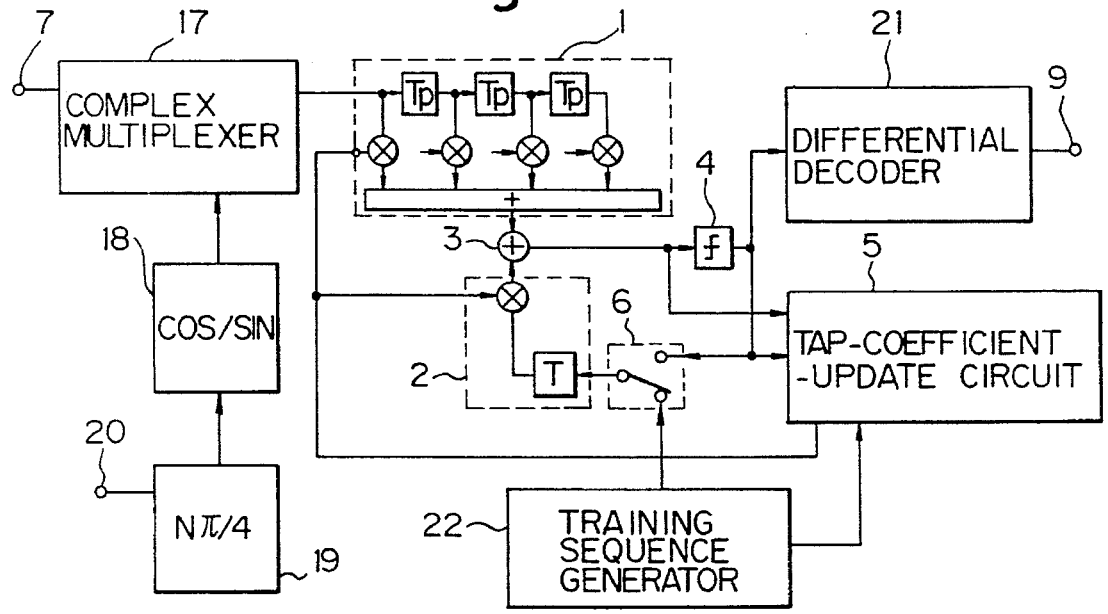
FIG. 1 is a block diagram showing Embodiment 1 of the adaptive equalizer according to the present invention.
FIG. 2 is a code generation table employed to obtain a data sequence CODE(K) by serial-to-parallel converting and encoding a known transmission data sequence in a training sequence generator of the adaptive equalizer shown in FIG. 1.

FIG. 1 is a block diagram showing a first embodiment of the adaptive equalizer according to the present invention. In the figure, the same elements as those in the prior art are denoted by the same reference numerals, and description thereof is omitted.

Referring to FIG. 1, a complex multiplexer 17 performs an arithmetic operation for phase rotation of an input signal that is input through an input port 7. A COS/SIN generator 18 generates a phase of rotation which is to be given to the complex multiplexer 17. An address counter 19 determines data which is to be generated by the COS/SIN generator 18. An input port 20 is used to input a start pulse representative of the frame position of the received signal. A differential decoder 21 differentially decodes the output of the decision circuit 4. A training sequence generator 22 outputs a known data sequence.

The operation of the adaptive equalizer shown in FIG. 1 will be explained below.

First, a training sequence generating means in the training sequence generator 22 of the adaptive equalizer shown in FIG. 1 in a case where the received signal is a π/4 shifted QPSK modulation signal, will be explained with (1, -1,1,-1,1,-1,-1,1,-1,-1,1,1,1,1,-1,1,1,1,1,-1,-1,1,-1, -1,1,-1,1,-1) taken as an example of a known transmission data sequence bm. (a) First, the known transmission data sequence bm is serial-to-parallel converted to obtain data sequences $X_K$ and $Y_K$, and thereafter a data sequence CODE(K) is obtained by encoding based on the code generation table shown in FIG. 2.

FIG. 3 is a table showing the encoded data sequence CODE(K).

(b) Next, assuming that CODE(1)=0, the encoded data sequence CODE(K), shown in FIG. 3, is differentially converted according to the following equation:

$$CODE(K)=MOD(CODE(K-1)+CODE(K),4)(K=2,15) \quad (14a)$$

FIG. 4 is a table showing the encoded data sequence CODE(K) which has been differentially converted according to the above equation.

(c) Next, training data sequences COALR(K) and COBMR(K) are generated from the data sequence CODE(K), shown in FIG. 4, according to the conversion table shown in FIG. 5.

FIG. 6 shows the result of the code generation, which is the output data sequence of the training sequence generator 22 of the adaptive equalizer shown in FIG. 1.

The following is an explanation of elimination of the π/4 phase rotation component in a case where the received signal is a π/4 shifted QPSK modulation signal.

The address counter 19 is reset by the start pulse representative of the frame position of the received signal, and it outputs addresses to the COS/SIN generator 18 repeatedly in synchronism with the input timing of the received signal such that if the received signal has been subjected to symbol rate sampling, the address counter 19 outputs addresses (0,1,2,3,4,5,6,7), whereas, if the received signal has been subjected to N samples/symbol it outputs addresses (0,1,2,3,4,5,6,7 . . . 8N–1). The COS/SIN generator 18 sends phases of rotation to the complex multiplexer 17 according to the above addresses.

FIG. 7(a) is a table showing the relationship between the addresses of the received signal that is input to the adaptive equalizer and the phases of rotation generated by the COS/SIN generator 18 in a case where the received signal has been subjected to symbol rate sampling.

FIG. 7(b) is a table showing the relationship between the addresses of the received signal that is input to the adaptive equalizer and the phases of rotation generated by the COS/SIN generator 18 in a case where the received signal has been subjected to N-fold over sampling.

The complex multiplexer 17 performs an arithmetic operation for phase-rotating the received signal.

Figures 44, 45, 46:
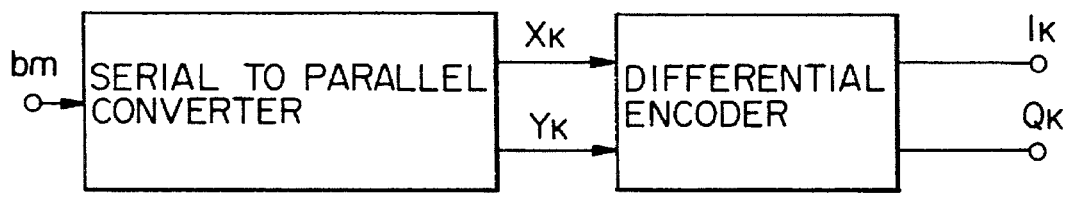
FIG. 44 shows one example of a means for encoding a transmission data sequence based on $\pi/4$ shifted QPSK modulation.
FIG. 45 is a table showing the phase change which is given to Equations 13a and 13b in the means for differentially encoding a transmission data sequence, shown in FIG. 44.
FIG. 46 is a table showing the result of differential encoding of a transmission data sequence by the means shown in FIGS. 44 and 45.
Figure 47:
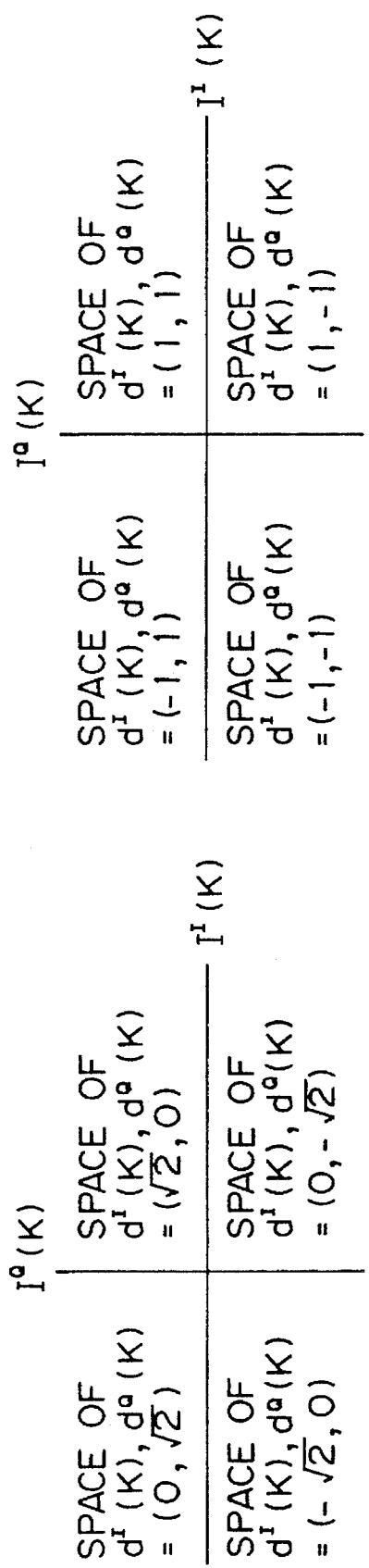
FIG. 47 illustrates a hard-decision method employed in a decision circuit of an adaptive equalizer shown in FIG. 42 in a case where the received signal is a $\pi/4$ shifted QPSK modulation signal.
Figure 48:
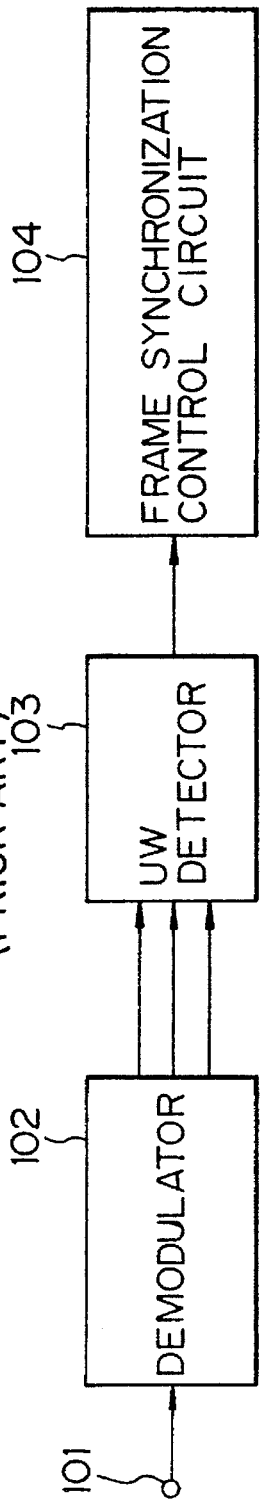
FIG. 48 is a block diagram of a demodulator part including a frame synchronization system in a conventional receiver.

FIG. 8 is a table showing a data sequence output from the complex multiplexer 17 in a case where the received signal that is input to the adaptive equalizer shown in FIG. 1 has the data sequence shown in the table of FIG. 46 and the received signal has been subjected to symbol rate sampling. The output data sequence of the complex multiplexer 17 is the same as the data sequence obtained by (5/4)π phase-rotating each value in the output data sequence of the training sequence generator 22 which is shown in the table of FIG. 6.

The equalizer section that comprises the FF part 1, the FB part 2, the adder 3, the decision circuit 4, the tap-coefficient-update circuit 5 and the switching circuit 6 is supplied with the result $(X^I_K, S^Q_K)$ of the arithmetic operation executed in the complex multiplexer 17, and it operates in the same way as the conventional adaptive equalizer designed for QPSK modulation. That is, the equalizer section effects equalization of the type in which the input data is phase-rotated by –(5/4). The output of the decision circuit 4 is sent to the differential decoder 21.

Next, the operation of the differential decoder 21, shown in FIG. 1, will be explained:

(a) First, a data sequence CODEF(K) is obtained from the output data sequence of the decision circuit 4 according to the code generation table that is shown in of FIG. 9.

FIG. 10 is a table showing the data sequence CODEF(K) obtained when the output data sequence of the decision circuit 4, shown in FIG. 1, is obtained from the output data sequence $(X^I_K, X^Q_K)$ of the complex multiplexer 17 shown in FIG. 8 by –(5/4)π phase rotating in equalizer section.

(b) Next, the data sequence CODEF(K), which is shown in FIG. 10, is differentially decoded according to the following equation:

$$CODEF(K)=MOD(CODEF(K+1)-CODEF(K),4) \quad (14b)$$

(c) Next, a decoded data sequence $(X_K', Y_K')$ is obtained from the differentially decoded data sequence CODEF(K) according to the decoded data sequence generation table shown in FIG. 11.

FIG. 12 shows the decoded data sequence $(X_K', Y_K')$, which is obtained by converting the data sequence CODEF(X), shown in FIG. 10, according to the decoded data sequence generation table shown in FIG. 11. The decoded data sequence $(X_K', Y_K')$ is parallel-to-serial converted to obtain a data sequence shown below, which is coincident with the known transmission data sequence bm:

(1, –1, 1, –1, 1, –1, –1, 1, –1, –1, –1, 1, 1, 1, –1, 1, 1, 1, 1, –1, –1, 1, –1, –1, 1, –1, 1, –1)

Embodiment 2

A second embodiment of the present invention, will be described below.

Figure 13:
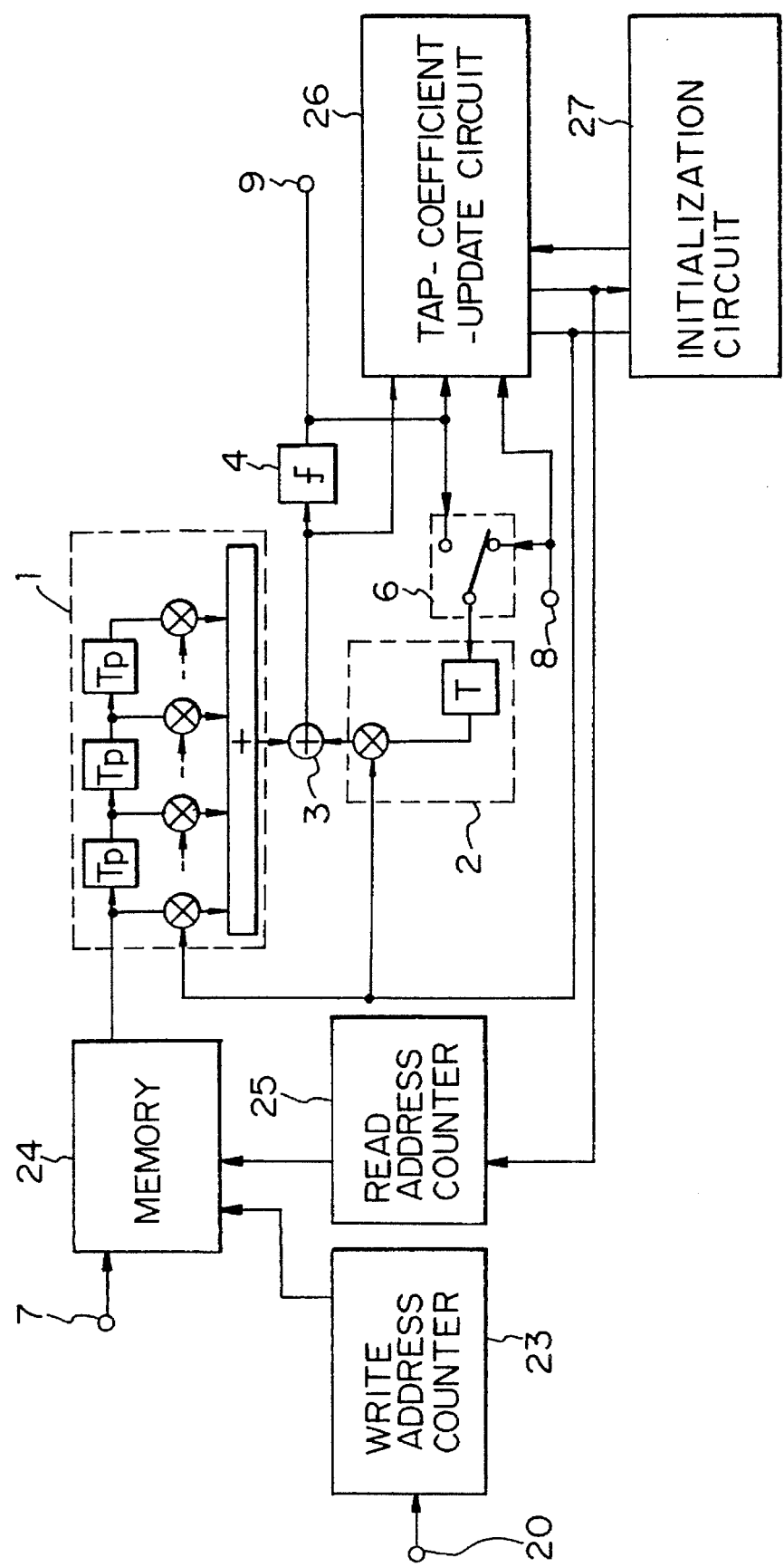
FIG. 13 is a block diagram showing Embodiment 2 of the adaptive equalizer according to the present invention.

FIG. 13 is a block diagram showing this embodiment of the adaptive equalizer according to the present invention. In the figure, the same elements as those in the prior art are denoted by the same reference numerals, and description thereof is omitted.

In FIG. 13, reference numeral 23 denotes a write address counter, 24 a buffer memory for storing the received signal, 25 a read address counter for reading data from the memory 24, 26 a tap-coefficient-update circuit, and 27 an initialization circuit that initializes the tap-coefficient-update circuit 26 and the tap-coefficients of the FF and FB parts 1 and 2.

The operation of the adaptive equalizer shown in FIG. 13 will be explained. FIG. 14 is a flowchart showing the operation of the adaptive equalizer shown in FIG. 13.

Figure 43:
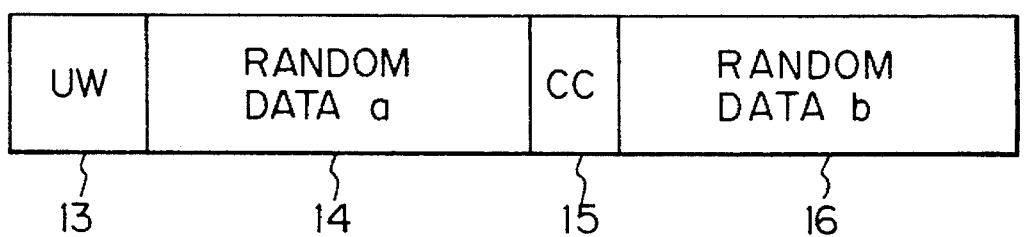
FIG. 43 shows one example of the burst format employed in mobile communication.

First, the write address counter 23 is reset by the start pulse representative of the frame position of the received signal, and it generates and sends write addresses to the memory 24 in synchronism with the input timing of the received signal transmitted according to the burst format shown in FIG. 43, which is input through the received signal input port 7.

The memory 24 stores the received signal in accordance with the respective addresses.

The read address counter 25 causes the received signal data corresponding to the UW 13, the random data a 14 and the CC 15 to be read out from the memory 24 and output to the FF part 1, symbol by symbol.

The equalizer section that comprises the FF part 1, the FB part 2, the adder 3, the decision circuit 4, the tap-coefficient-update circuit 26 and the switching circuit 6 executes equalization of the UW 13, the random data a 14 and the CC 15.

When the UW 13 is input (in the training mode), the known training sequence UW 13, which is input through the reference sequence input port 8, is input to the FB part 2 through the switching circuit 6, whereas, when the random data a 14 and the CC 15 are input (in the tracking mode), the output data sequence of the decision circuit 4 is input to the FB part 2 through the switching circuit 6.

When the equalization of the CC 15 is completed, the tap-coefficient-update circuit 26 sends a CC equalization completion signal to the read address counter 25 and the initialization circuit 27.

On receipt of the CC equalization completion signal, the initialization circuit 27 initializes the tap-coefficients of the FF and FB parts 1 and 2 and also initializes the tap-coefficient-update circuit 26.

Here, the initialization of the tap-coefficients corresponds to CM(0)=0 of Equation 12 in the prior art, whereas the initialization of the tap-coefficient-update circuit 26 is equivalent to executing $P(0)=\delta^{-1}I$ of Equation 12.

In response to the CC equalization completion signal, the read address counter 25 reads out the received signal data corresponding to the CC 15 and the random data b 16 from the memory 24.

The equalizer section that comprises the FF part 1, the FB part 2, the adder 3, the decision circuit 4, the tap-coefficient-update circuit 26 and the switching circuit 6 executes retraining for the readout data by using the known training sequence CC 15 and thereafter performs equalization of the random data b 16.

When retraining is to be performed by using the known training sequence CC 15, the data sequence input to the FB part 2 is changed by the switching circuit 6 to the known training sequence CC 15 that is input through the reference sequence input port 8, whereas, when the random data b 16 is to be equalized, the data sequence input to the FB part 2 is changed over to the output data sequence of the decision circuit 4.

Embodiment 3

A third embodiment of the present invention, will be described below.

Figure 15:
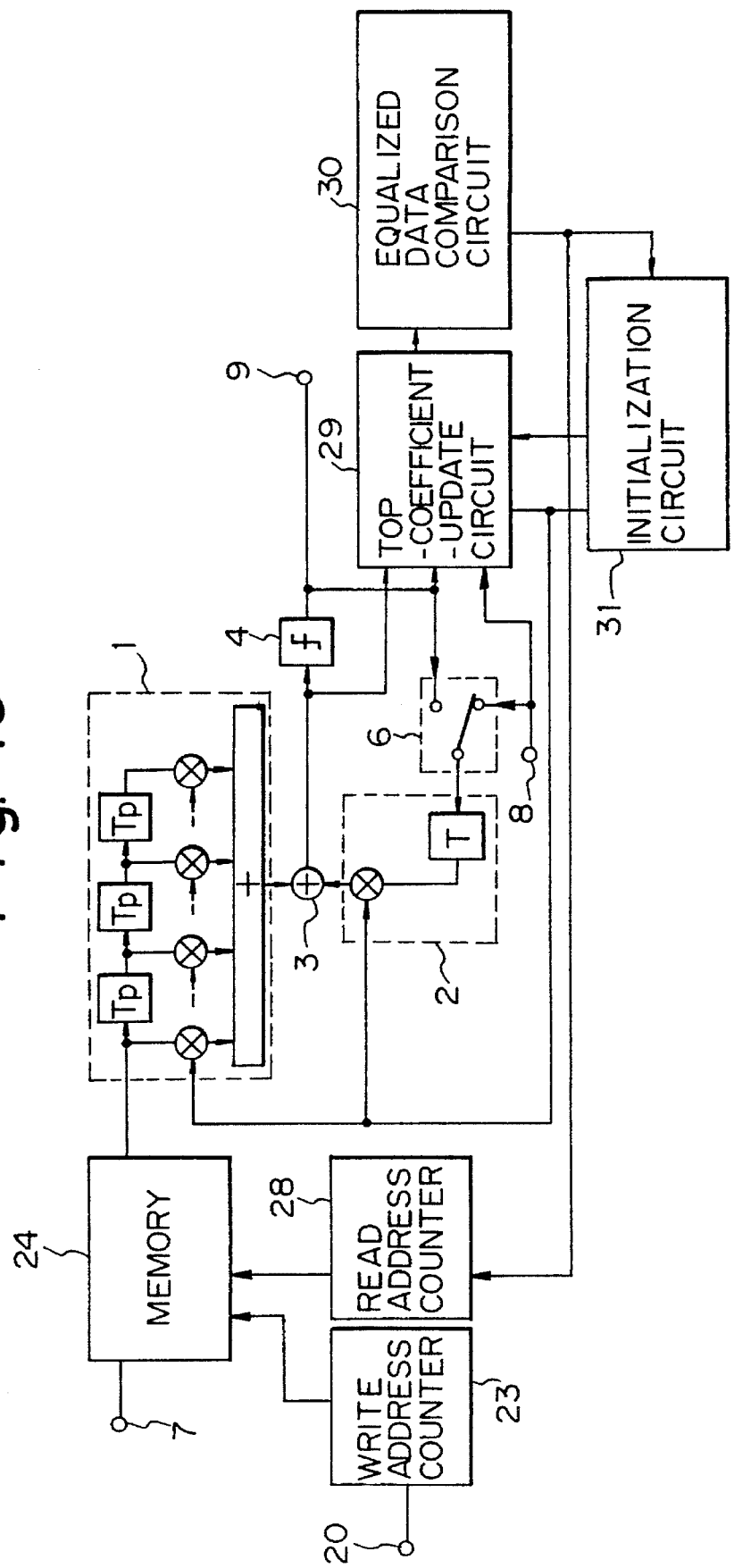
FIG. 15 is a block diagram showing Embodiment 3 of the adaptive equalizer according to the present invention.

FIG. 15 is a block diagram showing this embodiment of the adaptive equalizer according to the present invention. In the figure, the same elements as those in the prior art are denoted by the same reference numerals, and description thereof is omitted.

Referring to FIG. 15, a read address counter 28 reads out data from the memory 24. Reference numeral 29 denotes a tap-coefficient-update circuit, and 30 an equalized data comparison circuit. An initialization circuit 31 initializes the tap-coefficient-update circuit 29 and also initializes the tap-coefficients of the FF and FB parts 1 and 2 on the basis of the result of comparison made by the equalized data comparison circuit 30.

The operation of the adaptive equalizer shown in FIG. 15 will be explained below. FIG. 16 is a flowchart showing the operation of the adaptive equalizer shown in FIG. 15.

The write address counter 23 is reset by the start pulse representative of the frame position of the received signal, and it generates and sends write addresses in synchronism with the input timing of the received signal that is transmitted according to the burst format shown in FIG. 43.

In the memory 24, the received signal that is input through the received signal input port 7 is stored in accordance with the addresses generated. The read address counter 28 causes the received signal data corresponding to the UW 13, the random data a 14 and the CC 15 to be read out from the memory 24 and output to the FF part 1, symbol by symbol.

The equalizer section that comprises the FF part 1, the FB part 2, the adder 3, the decision circuit 4, the tap-coefficient-update circuit 29 and the switching circuit 6 performs equalization of the UW 13, the random data a 14 and the CC 15.

The tap-coefficient-update circuit 29 outputs the result of the equalization of the received signal data corresponding to the CC 15, that is, the result of the hard decision made by the decision circuit 4, to the equalized data comparison circuit 30, symbol by symbol.

The equalized data comparison circuit 30 makes a comparison to decide whether or not the result of the equalization of the received signal data corresponding to the CC 15 is coincident with the known training sequence of the CC 15, and outputs the result of the comparison to the initialization circuit 31 and the read address counter 28. When the comparison result reveals the equalized data sequence is not coincident with the known training sequence, the initialization circuit 31 acknowledges that the channel estimation by the adaptive equalizer is not effectively performed, and initializes the tap-coefficient-update circuit 29 and the tap-coefficients of the FF and FB parts 1 and 2. When the equalized data sequence is coincident with the known training sequence, initialization of the tap-coefficient-update circuit 29 and the tap-coefficients is not executed.

Here, the initialization of the tap-coefficients corresponds to $C_M(0)=0$ of Equation 12 in the prior art, whereas the initialization of the tap-coefficient-update circuit 29 is equivalent to executing $P(0)=\delta^{-1}I$ of Equation 12.

When the comparison result reveals that the equalized data sequence is not coincident with the known training sequence, the read address counter 28 reads out the received signal data corresponding to the CC 15 and the random data b 16 from the memory 24.

The equalizer section that comprises the FF part 1, the FB part 2, the adder 3, the decision circuit 4, the tap-coefficient-update circuit 29 and the switching circuit 6 executes retraining for the readout data by using the known training sequence CC 15 and thereafter performs equalization of the random data b 16.

When the equalized data sequence is coincident with the known training sequence, the read address counter 28 reads out the received signal data corresponding to the random data b 16 from the memory 24, and the equalizer section that comprises the FF part 1, the FB part 2, the adder 3, the decision circuit 4, the tap-coefficient-update circuit 29 and the switching circuit 6 performs equalization of the random data b 16 without retraining.

Embodiment 4

A fourth embodiment of the present invention, will be described below.

Figure 17:
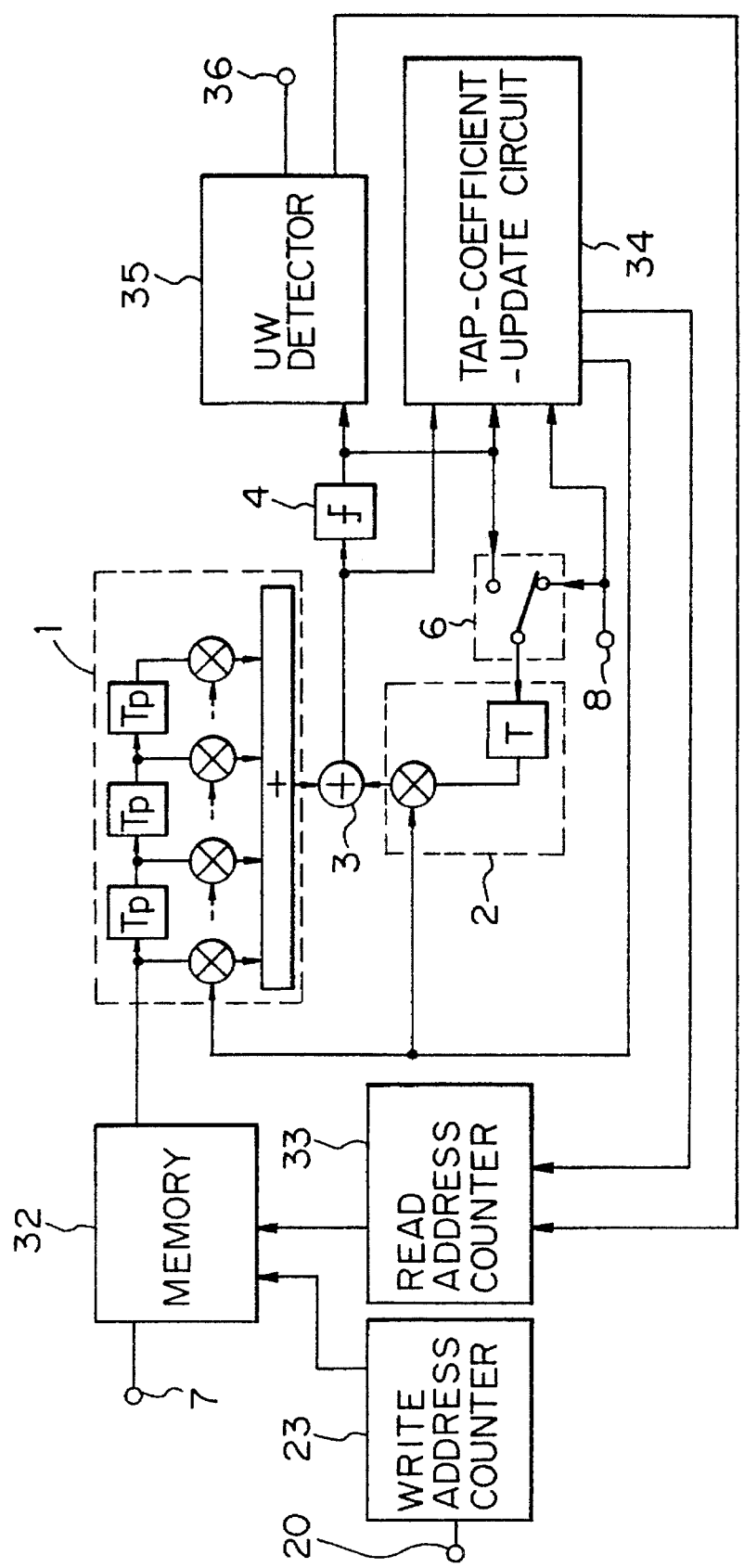
FIG. 17 is a block diagram showing Embodiment 4 of the adaptive equalizer according to the present invention.

FIG. 17 is a block diagram showing this embodiment of the adaptive equalizer according to the present invention. In the figure, the same elements as those in the prior art are denoted by the same reference numerals, and description thereof is omitted.

Referring to FIG. 17, a memory 32 stores the received signal, and a read address counter 33 reads out data from the memory 32. Reference numeral 34 denotes a tap-coefficient-update circuit, 35 a UW detector, and 36 a UW detection output port.

The operation of the adaptive equalizer shown in FIG. 17 will be explained below. FIG. 18 is a flowchart showing the operation of the adaptive equalizer shown in FIG. 17.

The write address counter 23 is reset by the start pulse representative of the head of a burst, and thereafter it generates addresses in synchronism with the input timing of the received signal transmitted according to the burst format shown in FIG. 43, which is input through the received signal input port 7. The memory 32 stores the received signal in accordance with the addresses generated. The read address counter 33 causes the received signal data corresponding to the UW 13 to be read out from the memory 32 and output to the FF part 1, symbol by symbol.

The equalizer section that comprises the FF part 1, the FB part 2, the adder 3, the decision circuit 4, the tap-coefficient-update circuit 34 and the switching circuit 6 executes an operation in the training mode (a) with respect to the readout data, thereby updating the tap-coefficients.

After updating the tap-coefficients for the last UW data in the received signal, the tap-coefficient-update circuit 34 fixes the tap-coefficients of the FF and FB parts 1 and 2 to the last updated values and further sends a training completion signal to the read address counter 33. On receipt of the signal, the read address counter 33 causes the received signal data corresponding to the UW 13 to be read out from the memory 32 and output to the FF part 1 again, symbol by symbol. The data sequence input to the FB part 2 at this time is the known training sequence UW 13, which is input through the reference sequence input port 8.

The data input to the FF and FB parts 1 and 2 is subjected to a product-sum operation together with the fixed tap-coefficients, and the result of the operation undergoes a hard decision in the decision circuit 4 and is then sent to the UW detector 35.

The UW detector 35 makes a comparison between the output data sequence of the decision circuit 4 and the known training sequence UW 13 as a data sequence without decision error. If these two data sequences are coincident with each other, the UW detector 35 outputs a UW detection signal to the UW detection output port 36, whereas, if the two data sequences are not coincident with each other, the UW detector 35 outputs a UW missed detection signal to the output port 36.

After the completion of the UW detection, the UW detector 35 sends a UW detection completion signal to the read address counter 33. The read address counter 33 causes the received signal data corresponding to the random data a 14, the CC 15 and the random data b 16 to be read out from the memory 32 and output to the FF part 1, symbol by symbol, thereby effecting equalization sequentially.

Embodiment 5

A fifth embodiment of the present invention will be described below.

Figure 19:
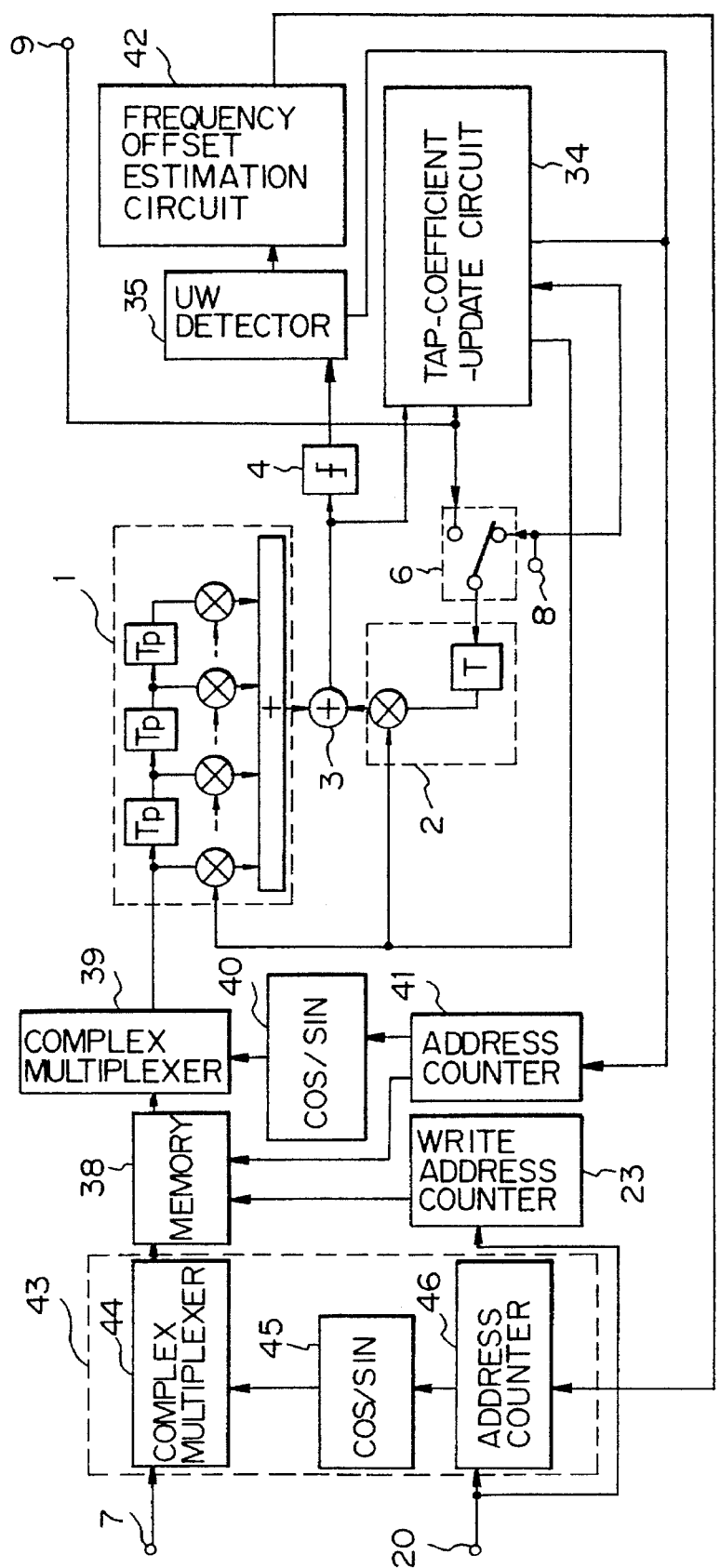
FIG. 19 is a block diagram showing Embodiment 5 of the adaptive equalizer according to the present invention.

FIG. 19 is a block diagram showing this embodiment of the adaptive equalizer according to the present invention. In the figure, the same elements as those in the prior art are denoted by the same reference numerals, and description thereof is omitted.

In FIG. 19, reference numeral 38 denotes a memory for storing the received signal, 39 a complex multiplexer, and 40 a COS/SIN generator that gives the complex multiplexer 39 a COS/SIN value in accordance with the amount of phase rotation to be made. An address counter 41 gives read addresses to the memory 38 and also gives COS/SIN generation data to the COS/SIN generator 40. A frequency offset estimation circuit 42 estimates an offset frequency from the result of the UW detection effected by the UW detector 35. A frequency offset compensation circuit 43 compensates for the frequency offset of the received signal on the basis of the result of the estimation made by the frequency offset estimation circuit 42. Reference numeral 44 denotes a complex multiplexer, 45 a COS/SIN generator that gives phase rotation data to the complex multiplexer 44, and 46 an address counter that gives data for generating phase rotation data to the COS/SIN generator 45.

The operation of the adaptive equalizer shown in FIG. 19 will be explained below.

Figure 21:
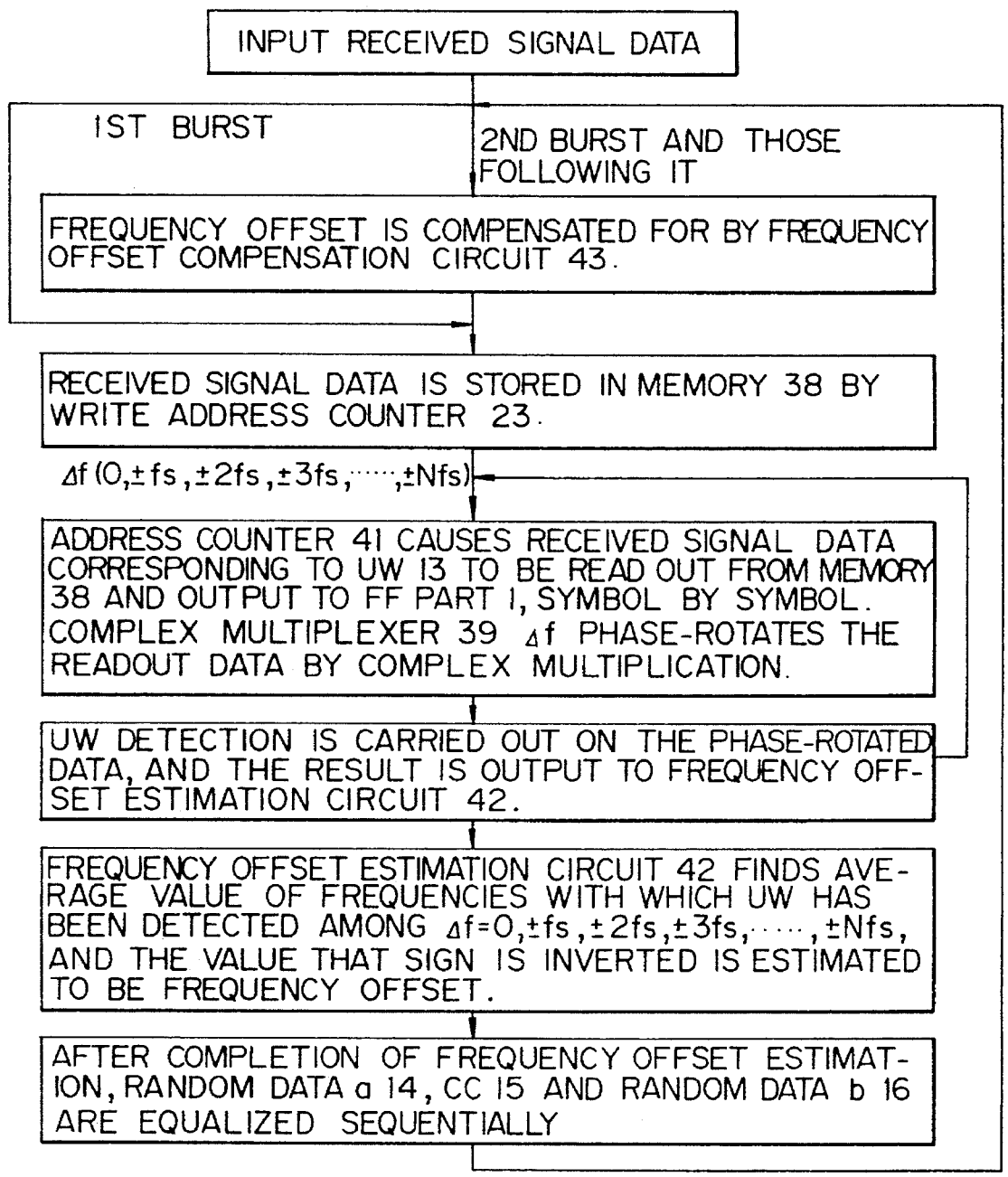
FIG. 21 is a flowchart showing the operation of the adaptive equalizer shown in FIG. 19.

FIG. 21 is a flowchart showing the operation of the adaptive equalizer shown in FIG. 19.

For the first burst of the signal received after the beginning of communication, the frequency offset compensation circuit 43 does not make compensation for frequency offset, but outputs the received signal as it is. The write address counter 23 is reset by the start pulse representative of the head of the burst input through the start pulse input port 20 and thereafter generates addresses in synchronism with the input timing of the received signal transmitted in the burst format shown in FIG. 43, which is input through the received signal input port 7. The memory 38 stores the received signal that is input through the received signal input port 7 and passed through the frequency offset compensation circuit 43 in accordance with the addresses generated. The address counter 41 causes the received signal data corresponding to the UW 13 to be read out from the memory 38 and output to the complex multiplexer 39, symbol by symbol. For this data, the complex multiplexer 39 does not perform an arithmetic operation for phase rotation by complex multiplication, but outputs the data to the FF part 1 as it is.

For this input data, the equalizer section that comprises the FF part 1, the FB part 2, the adder 3, the decision circuit 4, the tap-coefficient-update circuit 34 and the switching circuit 6 updates the tap-coefficients successively in the same way as in the operation of the conventional adaptive equalizer in the training mode (a), which has been set forth in the paragraph describing the operation of the conventional adaptive equalizer designed for QPSK modulation. After updating the tap-coefficients for the last UW data in the received signal, the tap-coefficient-update circuit 34 fixes the tap-coefficients of the FF and FB parts 1 and 2 to the last updated values and further sends a training completion signal to the address counter 41. On receipt of the signal, the address counter 41 causes the received signal data corresponding to the UW 13 to be read out from the memory 38 and output to the FF part 1, symbol by symbol, through the complex multiplexer 39. The data sequence input to the FB part 2 at this time is the known training sequence UW 13, which is input through the reference sequence input port 8. The data that is input to the FF and FB parts 1 and 2 is subjected to a product-sum operation together with the fixed tap-coefficients, and the result of the operation undergoes a hard decision in the decision circuit 4 and is sent to the UW detector 35.

The UW detector 35 makes a comparison between the output data sequence of the decision circuit 4 and the known training sequence UW 13 as a data sequence without decision error. If these two data sequences are coincident with each other, the UW detector 85 outputs a UW detection signal to the frequency offset estimation circuit 42, whereas, if the two data sequences are not coincident with each other, the UW detector 35 outputs a UW missed detection signal to the frequency offset estimation circuit 42. The frequency offset estimation circuit 42 stores the result of the comparison as a result of $\Delta f=0$.

Upon completion of the UW detection for the data of $\Delta f=0$, the address counter 41 causes the memory 88 to output received signal data corresponding to the UW 13 again and also causes the COS/SIN generator 40 to generate fs(Hz) phase rotation data.

The complex multiplexer 39 multiplies together the received signal data corresponding to the UW 13 and the phase rotation data from the COS/SIN generator 40 to give fs(Hz) phase rotation to the received signal data corresponding to the UW 13. The data that has been fs(Hz) phase-rotated is subjected to UW detection again by the above-described method, and the result of the UW detection is stored as a result of $\Delta f=fs$ in the frequency offset estimation circuit 42. Thereafter, UW detection is similarly carried out on pieces of data which are obtained by phase rotating the received signal data corresponding to the UW 13 with $\Delta f=0$, ±fs, ±2fs, ±3fs, . . . , ±Nfs, respectively, and the results of the UW detection are successively stored in the frequency offset estimation circuit 42.

The frequency offset estimation circuit 42 finds an average value of the frequencies with which UW has been detected among $\Delta f=0$, ±fs, ±2fs, ±3fs, . . . , ±Nfs and estimates the value that sign is inverted to be a frequency offset.

Figure 20:
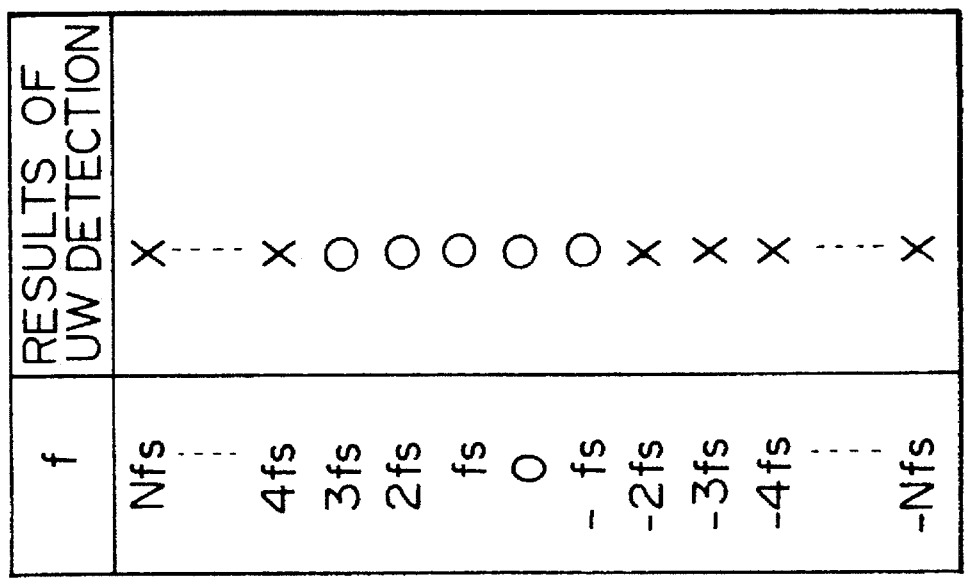
FIG. 20 is a table showing the result of UW detection with respect to the phase rotation (frequency change) given to the received signal input to the adaptive equalizer shown in FIG. 19.

FIG. 20 is a table showing exemplarily the results of UW detection for each phase rotation equivalent to $\Delta f$.

In this example, UW is detected when $\Delta f=-fs$, 0, +fs, 2fs and 3fs, but no UW is detected on the other occasions; therefore, the frequency offset of the received signal is estimated to be $-fs(Hz)$.

After the completion of the UW detection, the UW detector 35 sends a UW detection completion signal to the address counter 41. The address counter 41 causes the received signal data corresponding to the random data a 14, the CC 15 and the random data b 16 to be read out from the memory 38 and output to the FF part 1 through the complex multiplexer 39, symbol by symbol.

The equalizer section that comprises the FF part 1, the FB part 2, the adder 3, the decision circuit 4, the tap-coefficient-update circuit 34 and the switching circuit 6 performs equalization on the data corresponding to the random data a 14, the CC 15 and the random data b 16 sequentially, as has been described in connection with the prior art.

For the second burst and those following it, the frequency offset estimated in the preceding burst is compensated for in the frequency offset compensation circuit 43.

The operation of the frequency offset compensation circuit 43 will be explained below.

After receiving the result of the estimation made in the frequency offset estimation circuit 42, the address counter 46 is reset by the start pulse representative of the head of the burst input through the start pulse input port 20, and thereafter it gives the COS/SIN generator 45 the address of the phase rotation data for making compensation for the frequency offset which has been estimated in the preceding burst.

The complex multiplexer 44 multiplies together the received signal and the phase rotation data from the COS/SIN generator 45 to give fs(Hz) phase rotation to the received signal, thereby compensating for the frequency offset of the received signal that is input to the adaptive equalizer.

It should be noted that frequency offset estimation may also be made for each of the received signal data following the first burst by the above-described method, thereby compensating for each frequency offset estimated.

Embodiment 6

A sixth of the present invention, will be described below.

Figure 22:
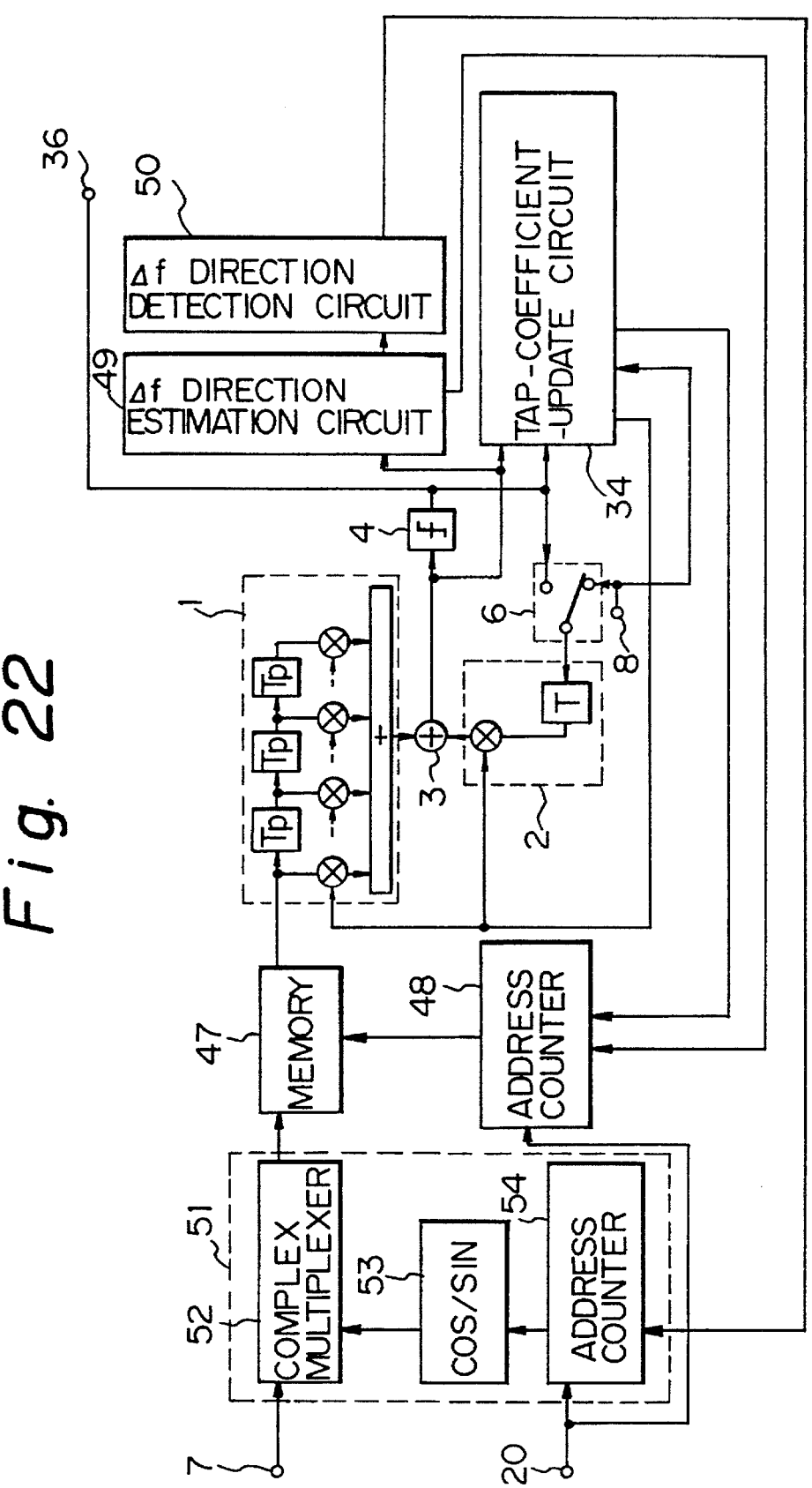
FIG. 22 is a block diagram showing Embodiment 6 of the adaptive equalizer according to the present invention.

FIG. 22 is a block diagram showing the embodiment of the adaptive equalizer according to the present invention. In the figure, the same elements as those in the prior art are denoted by the same reference numerals.

Referring to FIG. 22, a memory 47 stores the received signal that is input to the adaptive equalizer. An address counter 48 generates addresses for writing and reading data to and from the memory 47. A frequency offset direction estimation circuit 49 estimates a frequency offset direction of the received signal. A frequency offset direction detection circuit 50 detects a frequency offset direction by averaging the results of estimation made by the frequency offset direction estimation circuit 49. A frequency offset compensation circuit 51 compensates for a frequency offset of the received signal on the basis of the output of the frequency offset direction detection circuit 50. Reference numeral 52 denotes a complex multiplexer, 53 a COS/SIN generator that generates phase rotation data for the complex multiplexer 52, and 54 an address counter that gives the COS/SIN generator 53 data for generating phase rotation data.

Figure 23B:
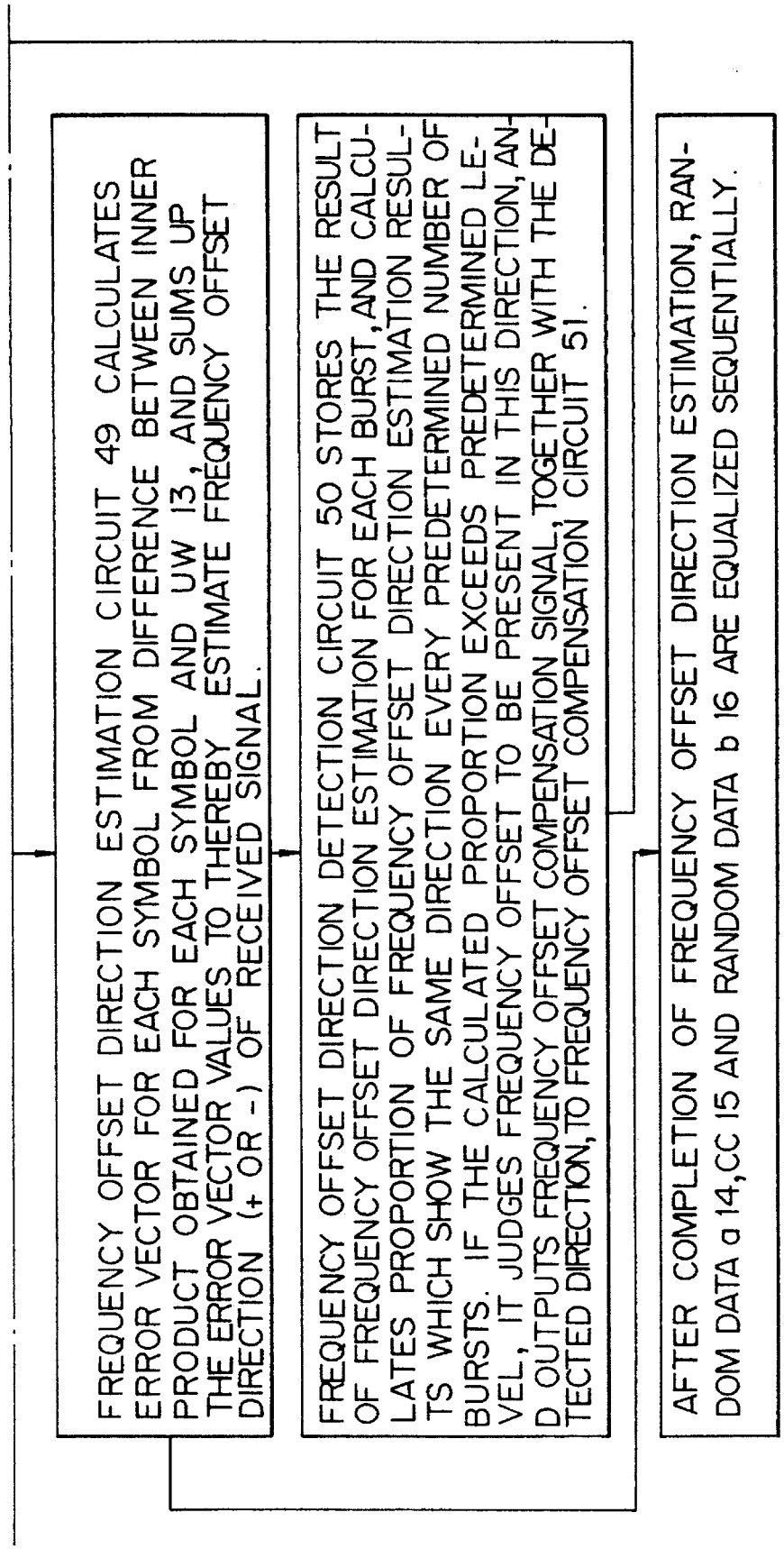

The operation of the adaptive equalizer shown in FIG. 22 will be explained below. FIG. 23 is a flowchart showing the operation of the adaptive equalizer shown in FIG. 22.

The frequency offset compensation circuit 51 does not perform frequency offset compensation but outputs the received signal as it is until a frequency offset compensation signal is output from the frequency offset direction detection circuit 50 with respect to the received signal that is input through the received signal input port 7.

The address counter 48 is reset by a start pulse representative of the head of a burst input through the start pulse input port 20, and thereafter it generates write addresses in synchronism with the input timing of the received signal that is input through the received signal input port 7 and passed through the frequency offset compensation circuit 51.

The received signal that is output from the frequency offset compensation circuit 51 is stored in the memory 47 in accordance with the output of the address counter 48.

After an amount of input data which corresponds to one symbol at the burst head has been stored in the memory 47, the address counter 48 generates read addresses to cause data to be read out from the memory 47 and input to the FF part 1, symbol by symbol.

The interval of time at which data is read out from the memory 47, symbol by symbol, is equal to or longer than the interval at which the received signal is stored in the memory 47, symbol by symbol.

For this input data, the equalizer section that comprises the FF part 1, the FB part 2, the adder 3, the decision circuit 4, the tap-coefficient-update circuit 34 and the switching circuit 6 updates the tap-coefficients in the same way as in the operation of the conventional adaptive equalizer in the training mode (a), which has been set forth in the paragraph describing the operation of the conventional adaptive equalizer designed for QPSK modulation. After updating the tap-coefficients for the last UW data in the received signal, the tap-coefficient-update circuit 34 fixes the tap-coefficients of the FF and FB parts 1 and 2 to the last updated values and further sends a training completion signal to the address counter 48.

On receipt of the signal, the address counter 48 causes the received signal data corresponding to the UW 13 to be read out from the memory 38 and output to the FF part 1 again, symbol by symbol. The data sequence input to the FB part 2 at this time is the known training sequence UW 13, which is input through the reference sequence input port 8.

The data that is input to the FF and FB parts 1 and 2 is subjected to a product-sum operation together with the fixed tap-coefficients, and the result of the operation is sent to the frequency offset direction estimation circuit 49.

The frequency offset direction estimation circuit 49 finds a difference between the inner product obtained for each symbol and the value of the UW 13, which is known, to thereby calculate an error vector for each symbol, and sums up the error vector values thus obtained.

If the received signal has a frequency offset, the result of the product-sum operation is reflected on the error vector; therefore, it is possible to estimate the frequency offset direction (+ or −) of the received signal from the sign of the result of the summation. The result of the estimation is output to the frequency offset compensation circuit 51.

After the completion of the frequency offset direction estimation, the frequency offset direction estimation circuit 49 sends a frequency offset direction estimation completion signal to the address counter 48. On receipt of the signal, the address counter 48 causes the received signal data corresponding to the random data a 14, the CC 15 and the random data b 16 to be read out from the memory 24 and output to the FF part 1, symbol by symbol.

The equalizer section that comprises the FF part 1, the FB part 2, the adder 3, the decision circuit 4, the tap-coefficient-update circuit 34 and the switching circuit 6 performs equalization on the above data sequentially.

The frequency offset direction detection circuit 50 stores the result of frequency offset direction estimation for each burst, and after the estimation results for a predetermined number of bursts have been stored, the circuit 50 calculates the proportion of frequency offset direction estimation results which show the same frequency offset direction every predetermined number of bursts. If the calculated proportion exceeds a predetermined level, the frequency offset direction detection circuit 50 judges that the frequency offset is present in this direction, and outputs a frequency offset compensation signal and the detected frequency offset direction to the frequency offset compensation circuit 51.

The frequency offset compensation circuit 51 performs frequency offset compensation with respect to the received signal from the burst which is subsequent to the burst for which the frequency offset compensation signal is output thereto.

The operation of the frequency offset compensation circuit 51 will be explained below.

After being reset by a start pulse representative of the head of a burst input through the start pulse input port 20, the address counter 54 gives the COS/SIN generator 53 an address of phase rotation data that causes a predetermined amount of change in the frequency in a direction in which the frequency offset is compensated for, in accordance with the input timing of the received signal input through the received signal input port 7, from the burst subsequent to the burst for which the frequency offset compensation signal is sent to the circuit 51.

The complex multiplexer 52 multiplies together the received signal and the phase rotation data output from the COS/SIN generator 53 to give Δf(Hz) phase rotation to the received signal, thereby compensating for the frequency offset of the received signal that is input to the adaptive equalizer.

Embodiment 7

A seventh embodiment of the present invention, will be described below.

FIG. 24 is a block diagram showing this embodiment of the receiver according to the present invention. In the figure, the same elements as those in the prior art are denoted by the same reference numerals, and detailed description thereof is omitted.

Referring to FIG. 24, a quasi-coherent detector 140 quasi-coherently detects a received IF signal. An input port 141 is used to input a sample clock used when the output of the quasi-coherent detector 140 is A/D converted. A pair of A/D converters 142 and 143 convert quasi-coherently detected Ich and Qch signals into digital signals, respectively. A memory 144 stores data output from the A/D converters 142 and 143. An address counter 145 operates on the clock supplied through the input port 141 to send addresses to the memory 144. An incoherent correlator 146 determines correlation between the received data output from the A/D converters 142 and 143 and the known transmission data sequence UW 13 and outputs a correlation value. A UW tentative detection circuit 147 detects a tentative UW position from the output of the incoherent correlator 146 and the output of the address counter 145 and outputs the tentative UW position thus detected. An adaptive equalizer 148 recognizes the position of the UW 13 from the output of the UW tentative detection circuit 147, equalizes data read out from the memory 144 and outputs equalized Ich and Qch data, together with clock pulses. A UW detector 103 is supplied with the output of the adaptive equalizer 148 to effect final UW detection and outputs a UW detection signal. A frame synchronization control circuit 150 is supplied with the UW detection signal and the UW tentative detection address to effect frame synchronization control.

Figure 25:
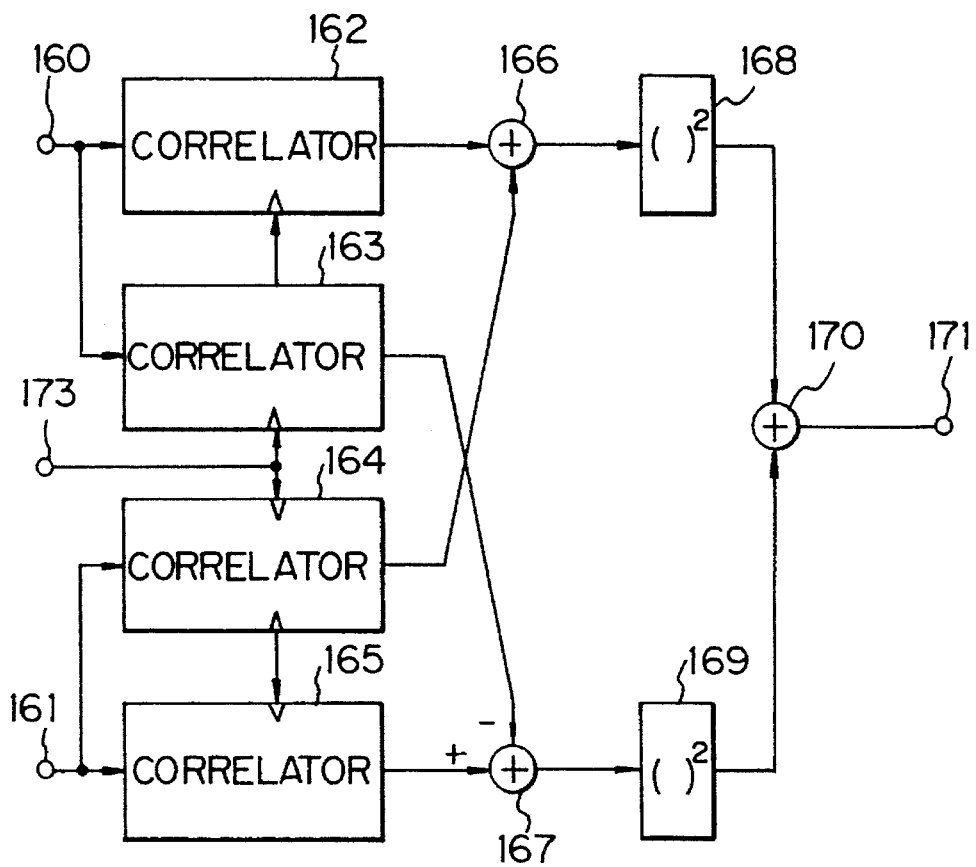
FIG. 25 is a block diagram showing exemplarily the internal arrangement of an incoherent correlator shown in FIG. 24.

FIG. 25 is a block diagram showing the internal arrangement of the incoherent correlator 146 shown in FIG. 24.

In FIG. 25, reference numerals 160 and 161 denote input ports for Ich data and Qch data, respectively. A correlator No. 3 162 determines a correlation between the data input through the input port 160 and Ich reference UW data. A correlator No. 4 163 determines a correlation between the data input through the input port 160 and Qch reference UW data. A correlator No. 5 164 determines a correlation between the data input through the input port 161 and the Qch reference UW data. A correlator No. 6 165 determines a correlation between the data input through the input port 161 and the Ich reference UW data. An adder 166 adds together the outputs of the correlators 162 and 164. A subtracter 167 subtracts the output of the correlator 163 from the output of the correlator 165. A square-law circuit 168 squares the output of the adder 166. A square-law circuit 169 squares the output of the subtracter 167. An adder 170 adds together the outputs of the square-law circuits 168 and 169. An output port 171 is used to deliver the output of the adder 170 (i.e., a correlation value). An input port 173 is used to input clock pulses for activating the four correlators.

Figure 26:
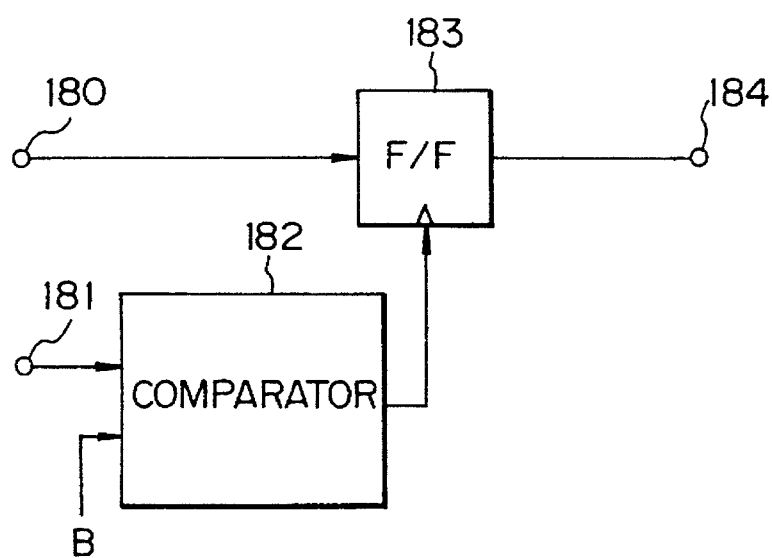
FIG. 26 is a block diagram showing exemplarily the internal arrangement of a tentative UW detection circuit shown in FIG. 24.

FIG. 26 is a block diagram showing the internal arrangement of the UW tentative detection circuit 147.

Referring to FIG. 26, an input port 180 is used to input the output value of the address counter 145. An input port 181 is used to input the output of the incoherent correlator 146. A comparator 182 makes a comparison between the output value (correlation value) of the incoherent correlator 146 and a predetermined threshold B, and if the correlation value $\geq$B, the comparator 182 outputs a tentative UW detection signal. A flip-flop 183 latches the output value of the address counter 145 on the basis of the output of the comparator 182. An output port 184 is used to deliver the output value (tentative UW position) of the flip-flop 183 to the outside.

Figure 27:
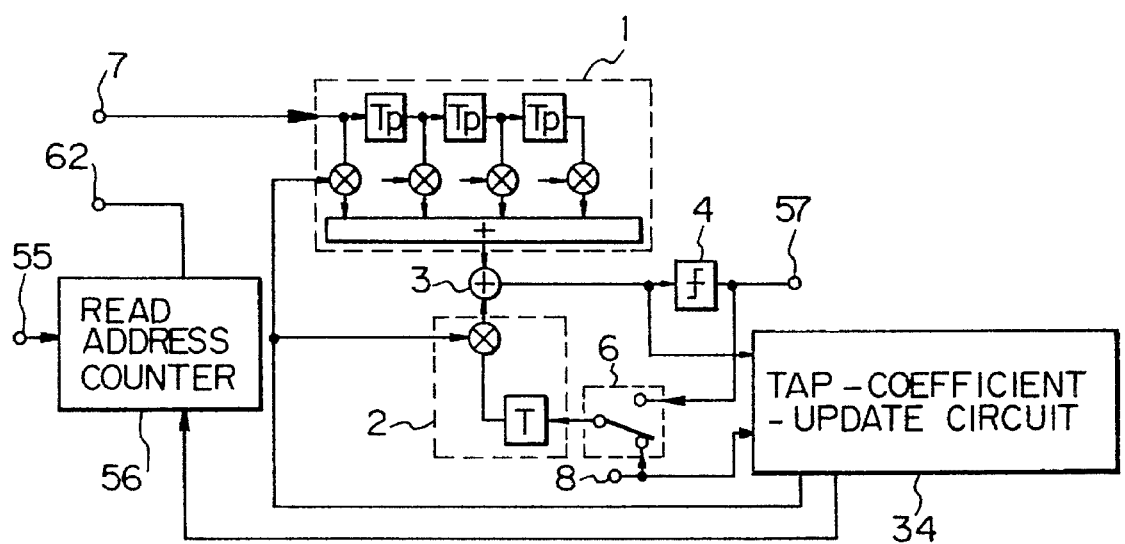
FIG. 27 is a block diagram showing exemplarily the internal arrangement of an adaptive equalizer shown in FIG. 24.

FIG. 27 is a block diagram showing exemplarily the internal arrangement of the adaptive equalizer 148. In the figure, the same elements as those in FIG. 17, which shows Embodiment 4, are denoted by the same reference numerals, and detailed description thereof is omitted.

Referring to FIG. 27, a UW address input port 55 is used to input an address in the memory 144 where the head of UW data has been written. A read address counter 56 designates a read address in the memory 144. Reference numeral 57 denotes an output port for outputting equalized UW data, and 62 an address output port.

The operation of the receiver shown in FIG. 24 will be explained below.

The received IF signal is converted into two orthogonal quasi-coherent signals in the quasi-coherent detector 140. The quasi-coherent signals are assumed to be expressed by complex representation as follows:

$$V(t) = K \cdot \exp(j(\Delta\omega t + \theta(t) + \Delta\theta))) \quad (15)$$
$$= K \cdot \{a(t) + jb(t)\} \cdot \exp(J(\Delta\omega t + \Delta\theta)$$

where K is the amplitude; $\Delta\omega$ is the difference between the center frequency of the received signal and the frequency oscillated by a local oscillator for quasi-coherent detection; $\Delta\theta$ is the initial phase difference between the received signal and the local oscillator output; $\theta(t)$ is the modulation component; and a(t) and b(t) are Ich and Qch baseband signals, respectively.

Assuming, for simplification, that $\Delta\omega=0$ and that the A/D converters are adapted for symbol interval sampling at Nyquist point, the A/D converter output is represented by $$V(nT)=K\cdot\{a(nT)+jb(nT)\}\cdot\exp(j\Delta\theta) \quad (16)$$

In the above equation, V(nT) is a sampled data which is stored in the memory 144 and also input to the incoherent correlator 146. Further, the sample clock is input to the address counter 145 to designate an address in the memory 144.

The real part (Ich component) of V(nT) that is input to the incoherent correlator 146 is input to the correlators 162 and 163 through the input port 160, while the imaginary part (Qch component) is input to the correlators 164 and 165. Each correlator operates on the basis of the sample clock supplied through the input port 173.

A reference UW pattern comprising a known training sequence inside the incoherent correlator 146 is represented by $$UW(i)=R(i)-jIm(i) \quad (17)$$

where i=1 to N; N: UW length (symbol)

In the above equation, R(i) is the Ich UW reference pattern, and Im(i) the Qch UW reference pattern.

Data that is stored in the i-th shift registers in the correlators 162, 163, 164 and 165 at time nT is represented by $$V_{nt}(i)=K\cdot\{a_{nT}(i)+jb_{nT}(i)\}\cdot\exp(j\Delta\theta) \quad (18)$$

The incoherent correlator 146 sums up the complex products of the respective parts of Equations 17 and 18 as follows:

$$C(nT) = \sum_{i=1}^{N} VnT(i) \cdot UW(i) \quad (19)$$

$$= \sum_{i=1}^{N} K \cdot \{a_{nT}(i) + jb_{nT}(i)\} \cdot \exp(j\Delta\theta) \cdot$$

$$\{R(i) - jIm(i)\}$$

$$= K \cdot \exp(j\Delta\theta) \cdot \{X(nT) + jY(nT)\}$$

Here, X(nT) and Y(nT) are represented by $$X(nT) = \sum_{i=1}^{N} \{a_{nT}(i)R(i) + b_{nT}(i)Im(i)\}$$

$$Y(nT) = \sum_{i=1}^{N} \{R(i)b_{nT}(i) - Im(i)a_{nT}(i)\}$$

Assuming that the UW 13 is input to the incoherent correlator 146 without noise, $$a_{nT}(i)=R(i), b_{nT}(i)=Im(i)$$

Assuming that R(i)=$\pm$1 and Im(i)=$\pm$1, for example, C(nT) is represented by $$C_{UW}(nT) = K \cdot \exp(j\Delta\theta) \cdot \quad (20)$$

$$\sum_{i=1}^{N} \{R(i)^2 - Im(i)^2 + j(R(i)Im(i) - Im(i)R(i))\}$$

$$= K \cdot \exp(j\Delta\theta)\{2N + J0\}$$

When no UW 13 is input, the probability that $a_{nT}(i)$=R(i) and $b_{nT}(i)$=Im(i) will be valid is ½ each, and C(nT) that satisfies the condition of $|C_{UW}(nT)| \geq |C(nT)|$ is output.

Incidentally, the real and imaginary parts of C(nT) correspond to the respective outputs of the adder 166 and the subtracter 167. The real and imaginary parts of C(nT) are squared in the square-law circuits 168 and 169, respectively, and then added together in the adder 170 as follows:

$$Z(nt) = [real\{C(nT)\}]^2 + [imag\{C(nT))\}]^2 \quad (21)$$

-continued $$= [K\{X(nT)\cos(\Delta\theta) - Y(nT)\sin(\Delta\theta)\}]^2 + \quad (22)$$

$$[K\{X(nT)\sin(\Delta\theta) + Y(nT)\cos(\Delta\theta)\}]^2$$

If $C(nT) = C_{UW}(nT)$, then $$Z_{UW}(nT) = \{K \cdot X(nT)\cos(\Delta\theta)\}^2 + \{K \cdot X(nT)\sin(\Delta\theta)\}^2 \quad (23)$$

$$= 4K^2N^2$$

Therefore, the adder 170 outputs $4K^2N^2$ when C(nT)= CUW(nT), and it outputs a relatively small value on other occasions. The correlation value thus calculated is output from the incoherent correlator 146 through the output port 171 so as to be input to the UW tentative detection circuit 147.

Although it is assumed that R(i)=±1 and Im(i)=±1 in the foregoing for simplification, it should be noted that R(i) and Im(1) do not necessarily need to be binaries and that these may be analog values.

The operation of the UW tentative detection circuit 147 will be explained below.

In the UW tentative detection circuit 147, the correlation value output from the incoherent correlator 146 is compared with a predetermined threshold B.

Here, a value for the threshold B with which the UW 13 is tentatively detected on condition that the correlation value ≧ the threshold B is set in advance. Assuming that the correlation value ≧ the threshold B, the comparator 182 outputs a tentative UW detection signal, so that the flip-flop 183, which is triggered by the tentative UW detection signal, latches the address in the memory 144 where the UW data has been written and outputs it through the port 184.

The adaptive equalizer 148 will next be explained with reference to FIG. 27.

The adaptive equalizer 148 recognizes the address in the memory 144 where the received signal data corresponding to the UW 13 has been written from address information output from the UW tentative detection circuit 147, which is input thereto through the UW address input port 55, and causes the read address counter 56 to fetch the received signal data corresponding to the UW 13 from the memory 144.

The equalizer section that comprises the FF part 1, the FB part 2, the adder 3, the decision circuit 4, the tap-coefficient-update circuit 34 and the switching circuit 6 subjects the readout data to an operation carried out in the training mode (a), as has been set forth in the paragraph describing the operation of the conventional adaptive equalizer designed for QPSK modulation, thereby updating the tap-coefficients successively.

After updating the tap-coefficients for the last data in the received signal corresponding to the known transmission data sequence UW 13, the tap-coefficient-update circuit 34 fixes the tap-coefficients of the FF and FB parts 1 and 2 to the last updated values and further sends a training completion signal to the read address counter 56.

On receipt of the signal, the read address counter 56 causes the received signal data corresponding to the UW 13 to be read out from the memory 144 and output to the FF part 1, symbol by symbol. The data sequence input to the FB part 2 at this time is the known training sequence UW 13, which is input through the reference sequence input port 8.

The data that is input to the FF and FB parts 1 and 2 is subjected to a product-sum operation together with the fixed tap-coefficients, and the result of the operation undergoes a hard decision in the decision circuit 4 and is sent to the UW detector 103 through the UW data output port 57.

Figure 49:
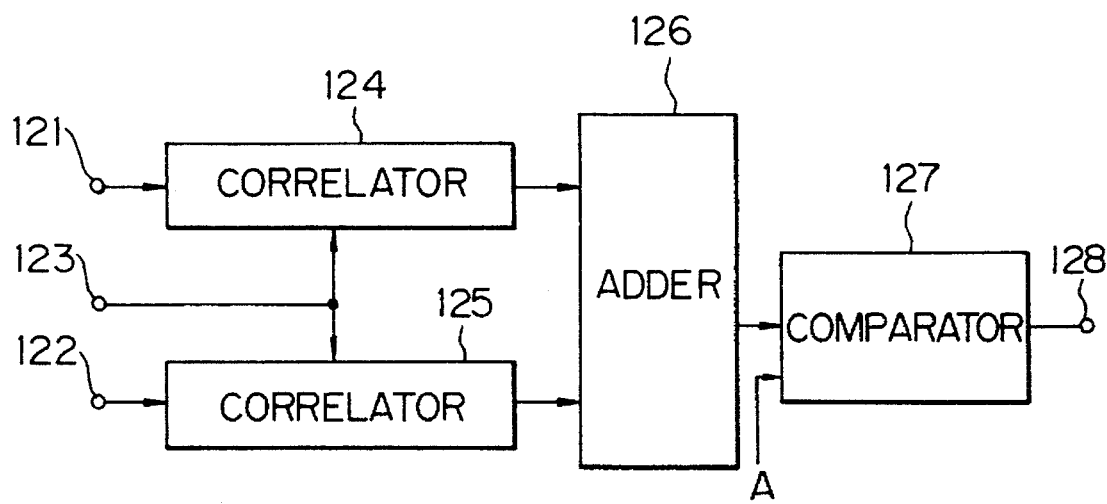
FIG. 49 is a block diagram showing exemplarily the internal arrangement of a UW detector shown in FIG. 48.
Figure 50:
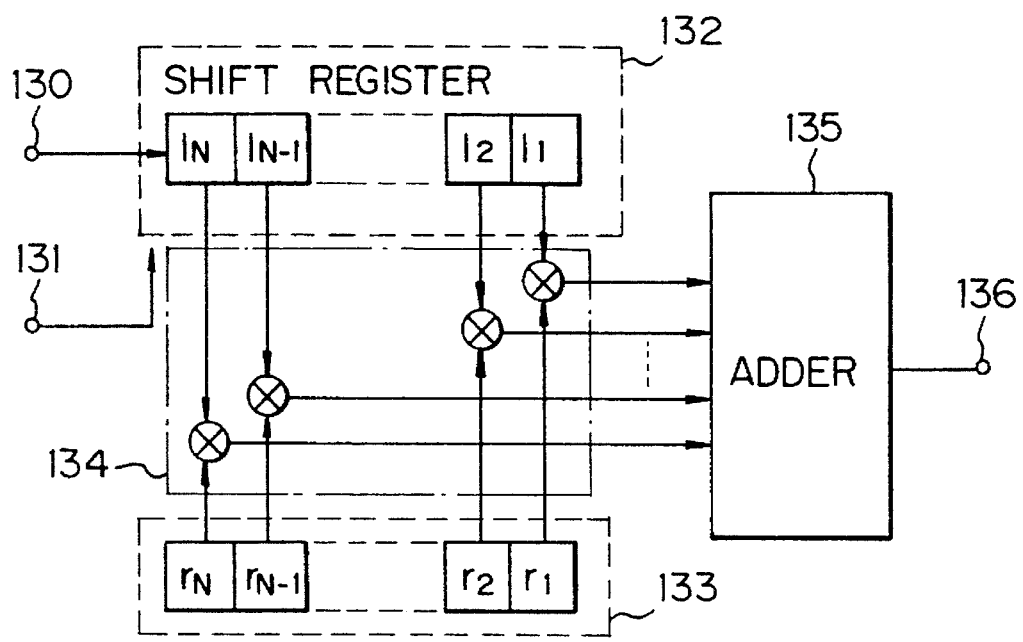
FIG. 50 is a block diagram showing exemplarily the internal arrangement of a correlator shown in FIG. 49.

The UW detector 103 receives the coherently detected UW data, which has been equalized in the adaptive equalizer 148, determines a correlation between the UW data and the reference UW pattern by a method similar to that in the prior art shown in FIG. 49, and outputs either a UW detection signal or a UW missed detection signal.

Then, the respective outputs of the UW detector 103 and the UW tentative detection circuit 147 are input to the frame synchronization control circuit 150.

When it receives a UW detection signal, the frame synchronization control circuit 150 recognizes the position of the UW from the output of the UW tentative detection circuit 147 and starts frame synchronization control such as aperture control.

On the other hand, when it receives a UW missed detection signal, the frame synchronization control circuit 150 ignores the output value of the UW tentative detection circuit 147 and reexecutes the acquisition operation.

Although in the foregoing description the sample clock for A/D conversion is arranged to effect symbol interval sampling at Nyquist point, it should be noted that the same advantageous effects can also be obtained by carrying out oversampling wherein sampling is executed 2 or more times per symbol.

Embodiment 8

An eighth embodiment of the present invention will be described below.

In this embodiment, a tentative UW position is determined by making a comparison between a correlation value and a predetermined threshold inside the UW tentative detection circuit 147. However, it is also possible to obtain the same advantageous effects by detecting the maximum value in the output of the incoherent correlator 146 within an aperture (within one frame in a case where there is no aperture) and defining the address of the maximum value as a tentative UW position.

Figure 28:
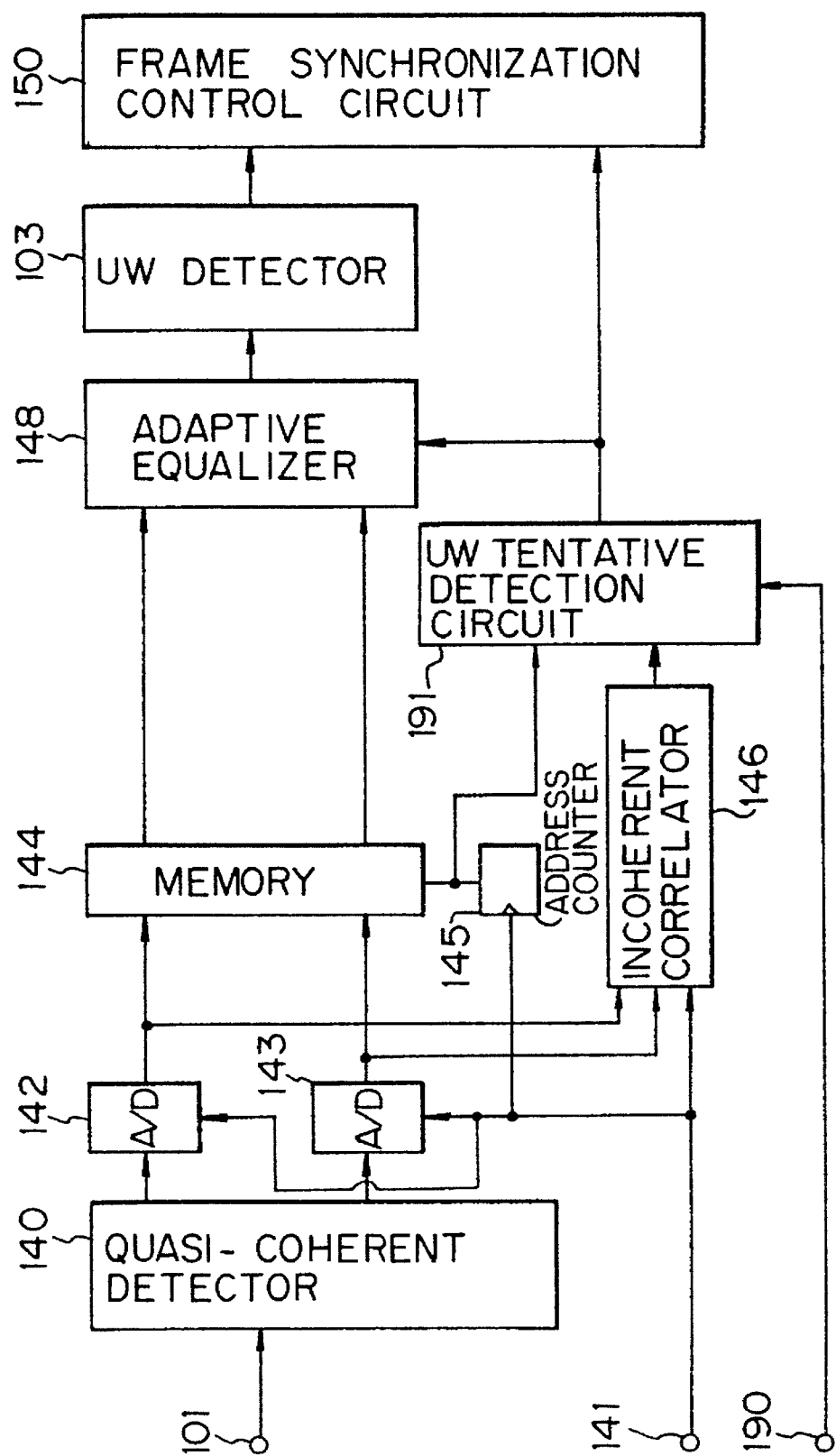
FIG. 28 is a block diagram showing Embodiment 8 of the receiver according to the present invention.

FIG. 28 is a block diagram showing this embodiment of the receiver according to the present invention. In the figure, the same elements as those in FIG. 24, which shows the seventh embodiment, are denoted by the same reference numerals, and description thereof is omitted.

Referring to FIG. 28, an input port 190 is used to input a gate signal for aperture gate, frame gate or the like. A UW tentative detection circuit 191 is supplied with the output of the address counter 145, the output of the incoherent correlator 146 and the gate signal to detect a tentative UW position.

Figure 29:
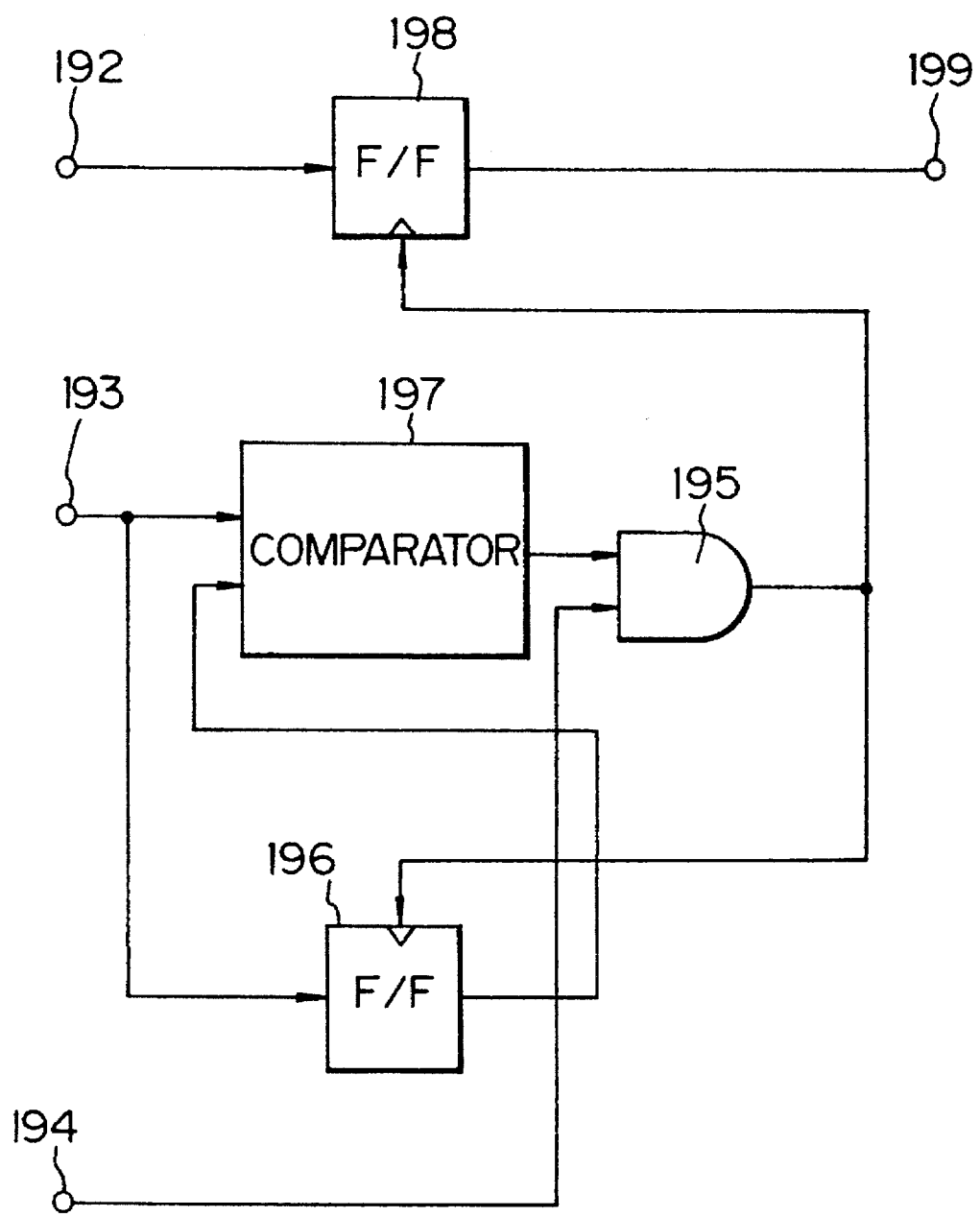
FIG. 29 is a block diagram showing exemplarily the internal arrangement of a UW tentative detection circuit shown in FIG. 28.

FIG. 29 is a block diagram showing the internal arrangement of the UW tentative detection circuit 191.

In FIG. 29, reference numeral 192 denotes an input port for the output value of the address counter 145, 193 an input port for the output value of the incoherent correlator 146, and 194 an input port for the gate signal. A gate circuit 195 enables or disables the comparator output pulse in response to the gate signal. A flip-flop 196 latches the output value of the incoherent correlator 146 in response to the output pulse of the gate circuit 195. A comparator 197 makes a comparison between the output value of the incoherent correlator 146 and the output value of the flip-flop 196 and outputs a pulse when the output value of the incoherent correlator 146 ≧ the output value of the flip-flop 197. A flip-flop 198 latches the output value of the address counter 145 in response to the output pulse of the gate circuit 195. An output port 199 is used to deliver the output of the flip-flop 198 to the outside.

In FIG. 28, the incoherent correlator 146 outputs a correlation value at every sample timing, and the correlation value is input to the comparator 197 through the input port 193.

When the input correlation value is smaller than the output value of the flip-flop 196, the comparator 197 outputs nothing, whereas, when the correlation value is larger than the output value of the flip-flop 196, the comparator 197 outputs a pulse. At this time, if the gate signal supplied through the input port 194 is ON, the pulse output from the comparator 197 passes through the gate circuit 195 to latch the correlation value in the flip-flop 196. Thus, the maximum correlation value in the gate range is latched in the flip-flop 196. At the same time, the pulse output from the gate 195 is input to the flip-flop 198, so that the flip-flop 198 stores a memory address where the maximum correlation value is stored.

The adaptive equalizer 148 recognizes a tentative UW position from the maximum correlation value through the output port 199 and then starts training.

Embodiment 9

A ninth embodiment of the present invention will be described below.

Figure 30:
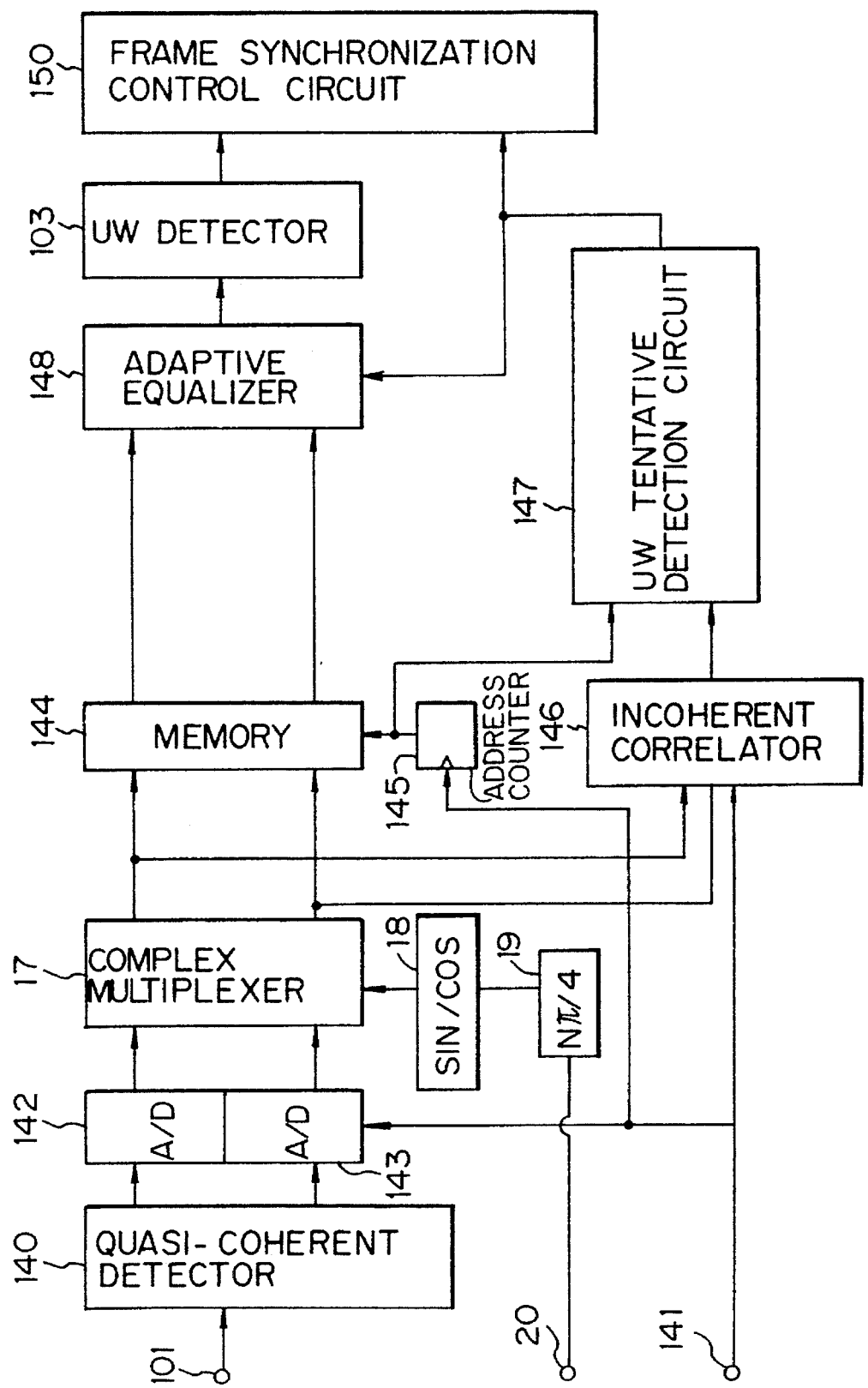
FIG. 30 is a block diagram showing Embodiment 9 of the receiver according to the present invention.

FIG. 30 is a block diagram showing Embodiment 9 of the receiver according to the present invention. In the figure, the same elements as those in FIGS. 1 and 28, which show Embodiments 1 and 7, respectively, are denoted by the same reference numerals, and description thereof is omitted.

In the foregoing Embodiment 7, the outputs of the A/D converters 142 and 143 are input directly to the incoherent correlator 146 and the memory 144. However, in a case where the received signal is a π/4 shifted QPSK modulation signal, a π/4 phase rotation component elimination circuit may be added at the back of the A/D converters 142 and 143. With this alternative arrangement also, the same advantageous effects are obtained.

Embodiment 10

A tenth embodiment of the present invention, will be described below.

Figure 31:
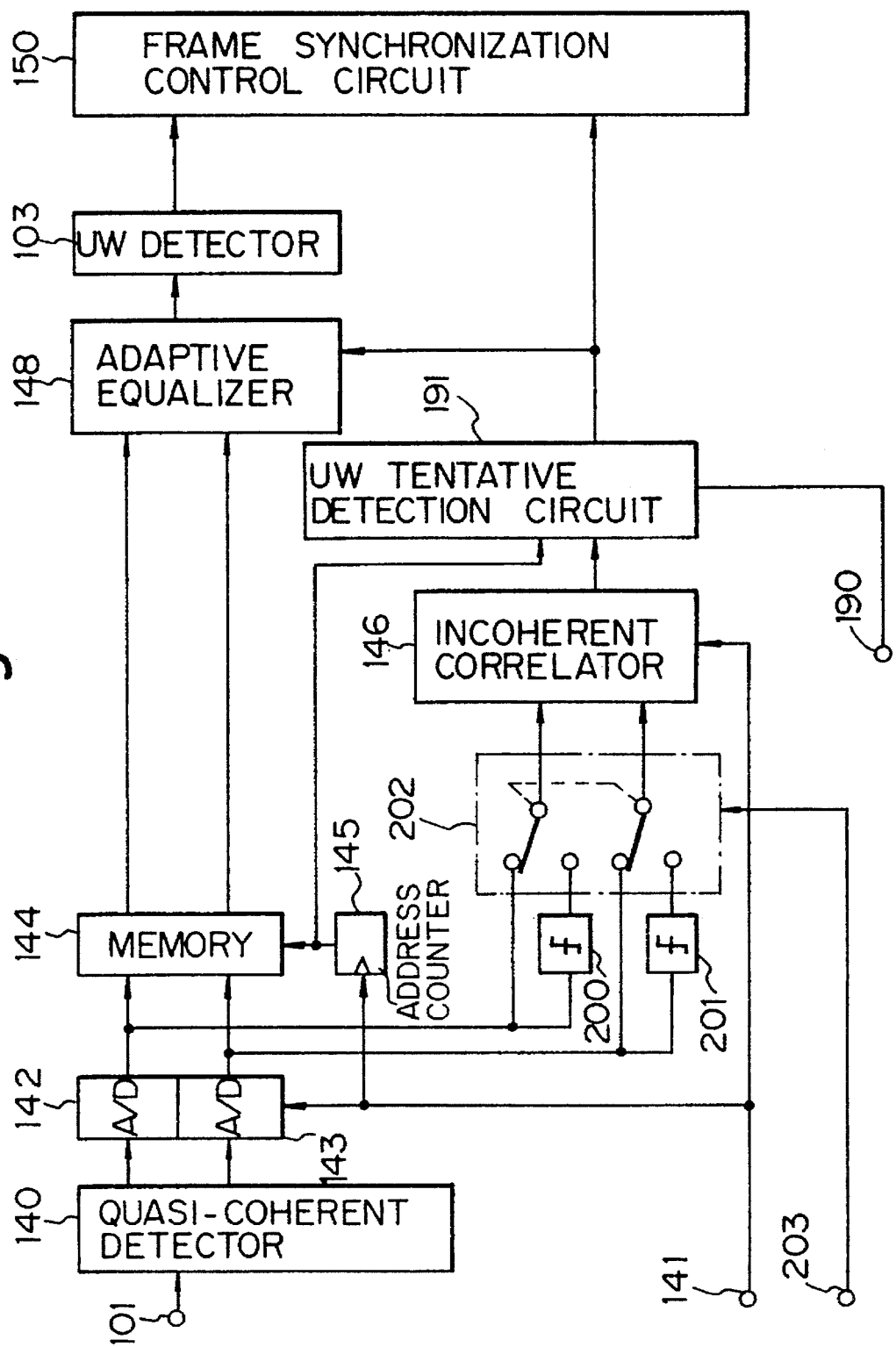
FIG. 31 is a block diagram showing Embodiment 10 of the receiver according to the present invention.

FIG. 31 is a block diagram showing this embodiment of the receiver according to the present invention. In the figure, the same elements as those in FIG. 24, which shows Embodiment 7, are denoted by the same reference numerals, and description thereof is omitted.

Referring to FIG. 31, hard-decision circuits 200 and 201 make a hard decision on the output values of the A/D converters 142 and 143, respectively. A selector 202 selects either the outputs of the A/D converters 142 and 143 or the outputs of the hard-decision circuits 200 and 201. An input port 203 is used to input a select signal for the selector 202.

The operation of the receiver shown in FIG. 31 will be explained below.

In a case where the variance of input signal level due to fading cannot be ignored in the time range for searching when the receiver effects UW detection (e.g., in a case where there is no aperture and UW is detected in a long period of time, i.e., at the time of hand off or initial acquisition), the complex representation of the outputs of the A/D converters 142 and 143 is as follows:

$$Vr(nT) = K(nT) \cdot \{a(nT) + jb(nT)\} \cdot \exp(j\Delta\theta) \quad (24)$$

where K(nT) is the amplitude, a(nT) the Ich baseband signal, b(nT) the Qch baseband signal, and Δθ the initial phase difference between the input signal and the local oscillator output for quasi-coherent detection.

Therefore, assuming that the input level is constant within the time equivalent to the UW length, the output value of the incoherent correlator 146 is represented by $$Zr(nT) = 4K^2(nT)N^2 \quad (25)$$

As will be understood from the above equation, since the amplitude term is time-varying, the output of the incoherent correlator 146 cannot be determined by the data pattern alone. Thus, UW detection is difficult to effect.

Therefore, at the time of hand off for example, the outputs of the hard-decision circuits 200 and 201 are selected as input signals to the incoherent correlator 146 by using a select signal input through the port 203.

The complex representation of the outputs of the hard-decision circuits 200 and 201 is as follows:

$$V_H(nT) = \{a_H(nT) + jb_H(nT)\} \cdot \exp(j\theta m) \quad (26)$$

where θm=0, ±π/2, π

In the above equation, $a_H(nT)$ and $b_H(nT)$ correspond to a(nT) and b(nT), respectively, in Equation 16, and the hard-decision value θm represents the ambiguity of the phase.

The output value of the incoherent correlator 146 at this time is represented by $$Z_H(nT) = [\{X(nT)\cos(\theta m) - Y(nT)\sin(\theta m)\}]^2 + [(X(nT)\sin(\theta m) + Y(nT)\cos(\theta m)\}]^2 \quad (27)$$

The output obtained when the UW pattern is input is represented by the following equation; it is independent of the amplitude of the input signal:

$$Z_{UW}H(nT) = 4N^2 \quad (28)$$

The UW tentative detection circuit 191 receives the output of the incoherent correlator 146 which has got rid of the variance of input signal level and detects a tentative UW position by the threshold method or the maximum value detecting method.

The adaptive equalizer 148 recognizes the address in the memory 144 where the received signal data corresponding to the UW 13 has been written from the output of the UW tentative detection circuit 191, and fetches the data corresponding to the UW 13 from the memory 144.

The adaptive equalizer 148 equalizes the received signal data corresponding to the UW 13 and outputs the equalized data to the UW detector 103, as described in Embodiment 7.

The UW detector 103 receives the UW data which has been subjected to the coherent detection and equalized by the adaptive equalizer 148, determines a correlation between the equalized UW data and the reference UW pattern by the same method as in the prior art and outputs either a UW detection signal or a UW missed detection signal.

Then, the output of the UW detector 103 and the output of the UW tentative detection circuit 191 are input to the frame synchronization control circuit 150.

When it receives a UW detection signal, the frame synchronization control circuit 150 recognizes the UW position from the output of the UW tentative detection circuit 191 and starts frame synchronization control such as aperture control.

On the other hand, when it receives a UW missed detection signal, the frame synchronization control circuit 150 ignores the output value from the UW tentative detection circuit 191 and reexecutes the acquisition operation.

In a stationary state, normally, the input signal level does not change substantially as far as the output of the incoherent correlator 146 is seen through the aperture. Therefore, the selector 202 is changed over by using a select signal supplied through the input port 203 so that the signals input to the incoherent correlator 146 are changed over to the soft-decision values, thereby enabling the system to operate normally even in the presence of frequency selective fading.

Figure 32:
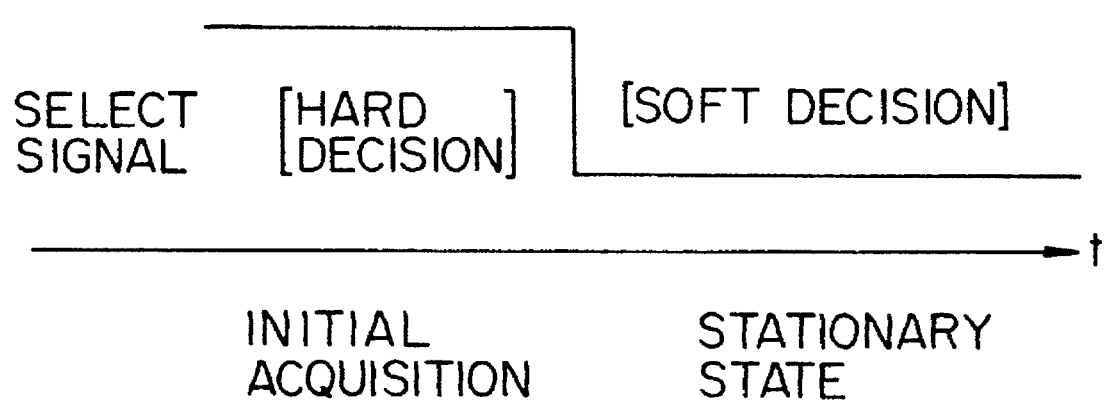
FIG. 32 is a chart showing the timing at which hard-decision data and soft-decision data are changed over from one to the other so as to be selectively input to an incoherent correlator shown in FIG. 31.

FIG. 32 shows an example of the select signal used to change over the selector 202.

The select signal is arranged such that during the initial acquisition, the hard-decision values are selected as those input to the incoherent correlator 146, whereas, during the stationary state, the soft-decision values are selected.

Embodiment 11

Another embodiment of the present invention, will be described below.

Figure 33:
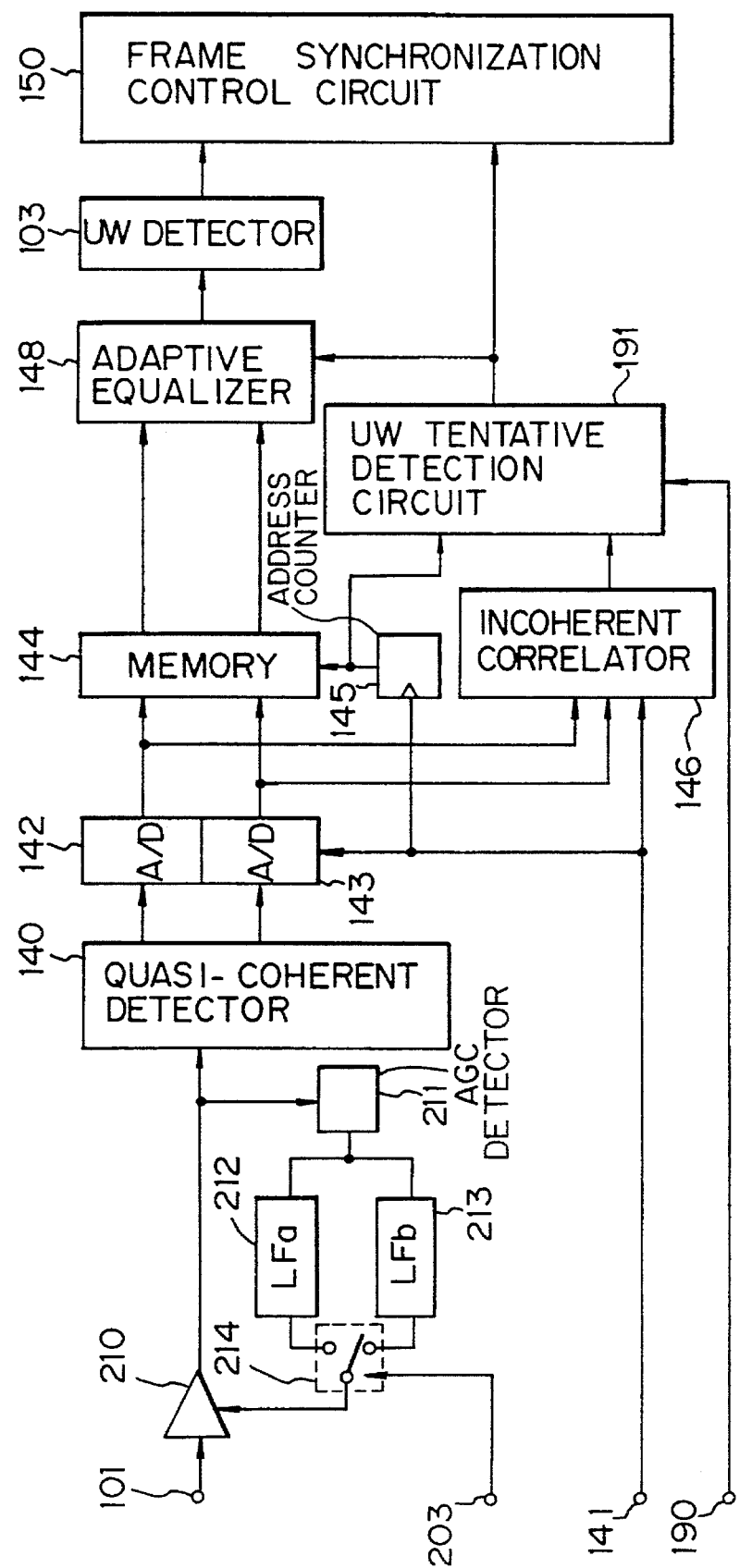
FIG. 33 is a block diagram showing Embodiment 11 of the receiver according to the present invention.

FIG. 33 is a block diagram showing this embodiment of the receiver according to the present invention. In the figure, the same elements as those in FIG. 31, which shows Embodiment 10, are denoted by the same reference numerals, and description thereof is omitted.

In the foregoing tenth embodiment, at the time of initial acquisition the signals input to the incoherent correlator 146 are changed over to the hard-decision signals to thereby eliminate the influence of the variance of input signal level due to fading. However, an automatic gain control (hereinafter referred to as "AGC") may be provided in the IF part (or the RF part) or the input part of the incoherent correlator 146 to effect changeover control such that the response speed (time constant) of the AGC during the initial acquisition varies from that during the stationary state. With this arrangement also, the same advantages are obtained.

In FIG. 33, reference numeral 210 denotes an AGC amplifier. An AGC detector 211 detects the output level of the AGC amplifier 210. A loop filter (LFa) 212 averages the output values of the AGC detector 211. A loop filter (LFb) 213 also averages the output values of the AGC detector 211. A selector 114 selects the output of the LFa 212 or the output of the LFb 213. The output of the selector 114 is connected to a control terminal of the AGC amplifier 210.

The operation will next be explained. Referring to FIG. 33, the received signal is input to the AGC amplifier 210 through the input port 101. The output of the AGC amplifier 210 is branched into two. One of them is input to the quasi-coherent detector 140, while the other is input to the AGC detector 211.

The AGC detector 211 outputs a voltage value in accordance with the input electric power, and the output voltage value is input to both the LFa 212 and the LFb 213. It is assumed that the time constant of the LFa 212 is substantially equal to the UW length and that the time constant of the LFb 213 is sufficiently larger than that of the LFa 212.

At the time of initial acquisition, the selector 214 selects the output of the LFa 212 in response to the select signal supplied through the input port 203. Since the time constant of the LFa 212 is substantially equal to the UW length, as has been stated above, if the input signal level becomes constant within the time equivalent to the UW length, the output level of the AGC amplifier 210 becomes substantially constant. Accordingly, the variance of input signal level due to fading has already been substantially eliminated from the received signal when input to the quasi-coherent detector 140, so that it is possible to effect UW tentative detection of high accuracy.

During the stationary state, the influence of the variance of input signal level is eliminated by the aperture effect; therefore, a larger time constant of the AGC is preferable with a view to reducing the effect of noise.

Accordingly, during the stationary state, the selector 214 selects the output of the LFb 213 in response to the select signal supplied through the input port 203.

Embodiment 12

A twelfth embodiment of the present invention, will be described below.

Figure 34:
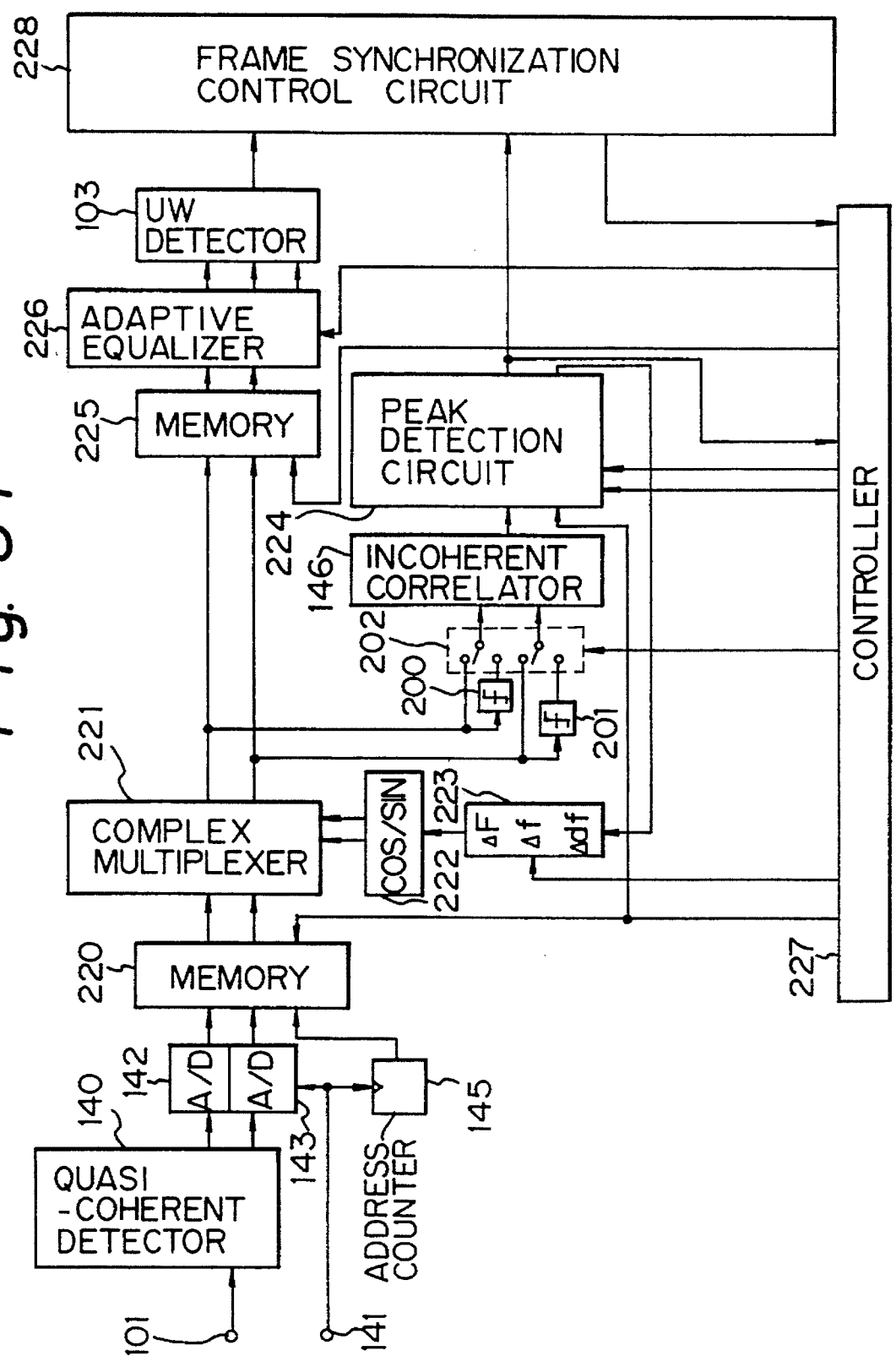
FIG. 34 is a block diagram showing Embodiment 12 of the receiver according to the present invention.

FIG. 34 is a block diagram showing this embodiment of the receiver according to the present invention. In the figure, the same elements as those in FIG. 31, which shows the tenth embodiment, are denoted by the same reference numerals, and description thereof is omitted.

Referring to FIG. 34, a memory 220 stores the outputs of the A/D converters 142 and 143. A complex multiplexer 221 phase-rotates the output value of the memory 220. A COS/SIN generator 222 gives the complex multiplexer 221 a COS/SIN value in accordance with the amount of phase rotation to be made. A frequency sweeper 223 gives phase rotation data to the COS/SIN generator 222 by sweep frequency and stores a frequency with which the incoherent correlator 146 outputs the maximum value. A peak detection circuit 224 outputs a maximum value detection pulse to the frequency sweeper 223 when the incoherent correlator 146 outputs the maximum value and also outputs a timing at which the output of the incoherent correlator 146 reaches a maximum. A memory 225 stores UW data phase-rotated with several different frequencies by the complex multiplexer 221. An adaptive equalizer 226 equalizes the output of the memory 225. A controller 227 is supplied with the address of the maximum value of the output from the peak detection circuit 224, and it designates a read address in the memory 220 and also a write address in the memory 225 and further sends a control signal to the frequency sweeper 223, a reset signal and aperture gate to the peak detection circuit 224, a select signal to the selector 202 and a start pulse to the adaptive equalizer 226. A frame synchronization control circuit 228 is supplied with the output of the UW detector 103 and the output of the peak detection circuit 224 and delivers a control signal to the controller 227.

Figure 35:
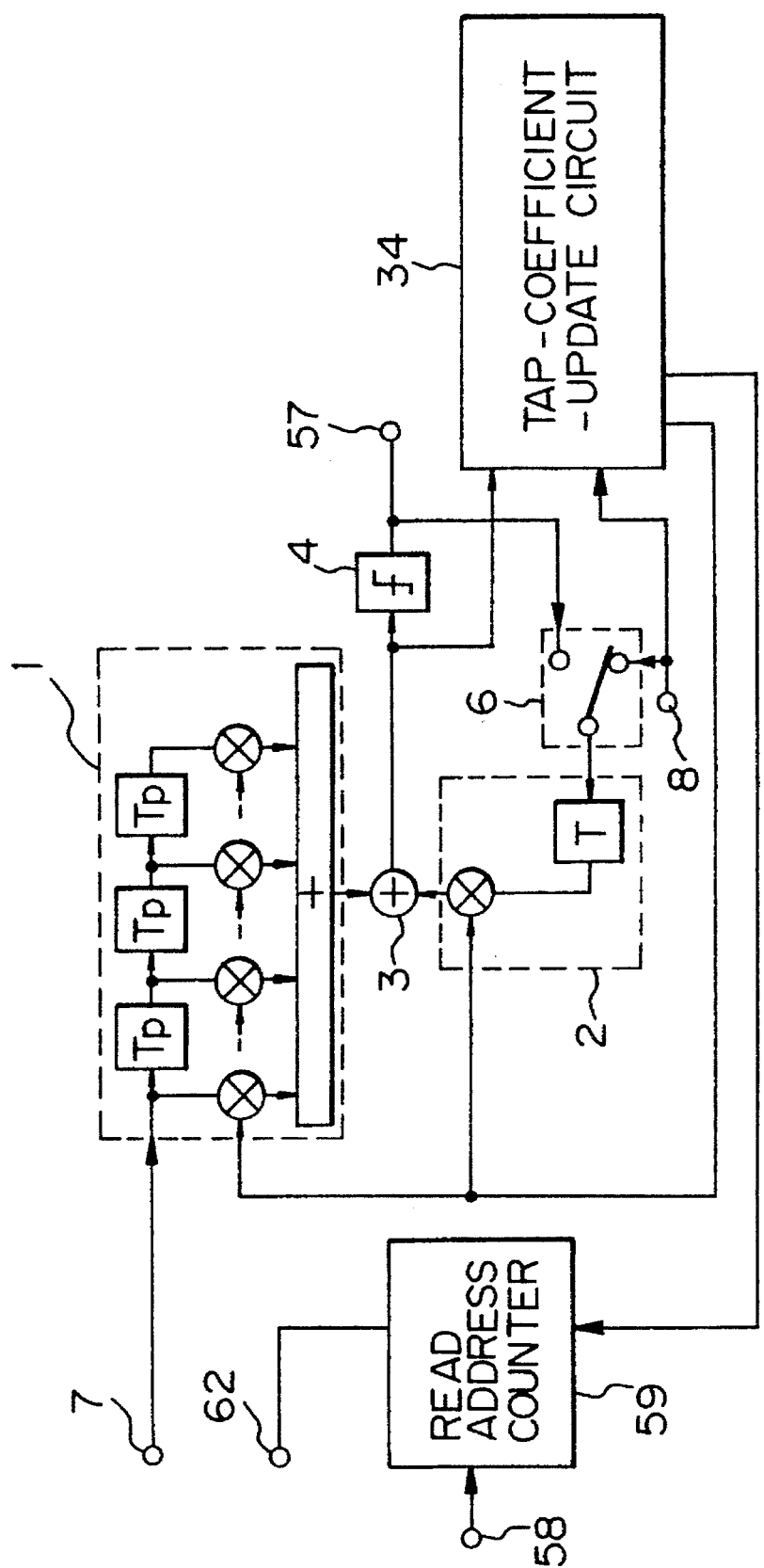
FIG. 35 is a block diagram showing exemplarily the internal arrangement of an adaptive equalizer shown in FIG. 34.

FIG. 35 is a block diagram showing exemplarily the arrangement of the adaptive equalizer 226, which is the same as FIG. 27 that shows the adaptive equalizer 148 illustrated in Embodiment 7; therefore, description thereof is omitted.

The operation of the receiver shown in FIG. 34 will be explained below.

Figure 36:
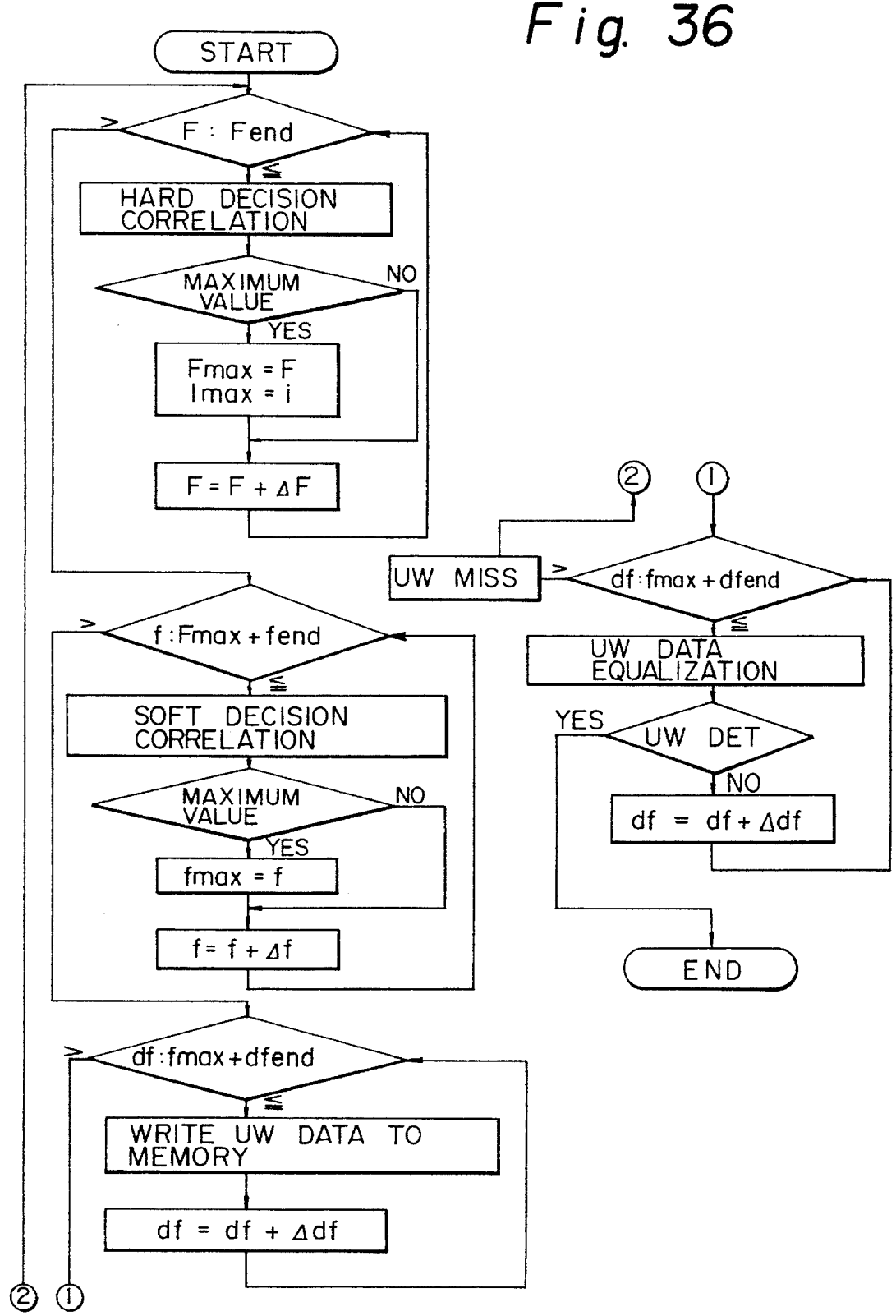
FIG. 36 is a flowchart showing the operation of the receiver shown in FIG. 34.

FIG. 36 is a flowchart showing the operation of the receiver shown in FIG. 34.

It is assumed that the memory 220 is stored with data consisting of 1 burst+αlength (or 1 frame+αlength) so that UW data is contained therein without fall.

The data stored in the memory 220 is read out in accordance with the read address output from the controller 227 and phase-rotated with a frequency designated in the frequency sweeper 223. The output of the complex multiplexer 221 is input to the incoherent correlator 146. At this time, hard decision is selected for the selector 202 by the controller 227.

The output of the incoherent correlator 146 is input to the peak detection circuit 224, together with the read address in the memory 220. When the output value of the incoherent correlator 146 is the largest of the values input to the peak detection circuit 224, the peak detection circuit 224 stores the timing at which the maximum value is input thereto and further sends a maximum value detection pulse to the frequency sweeper 223.

On receipt of the maximum value detection pulse, the frequency sweeper 223 stores the frequency with which the maximum value is output. The above operation is executed in the frequency range to be considered by using the first frequency step ($\Delta F$).

As a result of the above operation executed for several different frequencies, the peak detection circuit 224 is stored with the timing Imax (that is, the address written in the memory 220) at which the maximum value is output from the incoherent correlator 146, while the frequency sweeper 223 is stored with the frequency Fmax. At this time, the controller 227 is supplied with the maximum value output timing, which is decided to be a tentative UW position of the burst (or frame) concerned.

Next, the controller 227 extracts only the UW data from the memory 220 by using the tentative UW position Imax, and phase-rotates the UW data around the frequency Fmax by using the second frequency step ($\Delta f$).

The phase-rotated UW data is input to the incoherent correlator 146. At this time, the selector 202 selects soft-decision outputs in order to eliminate the influence of the initial phase.

Then, the output of the incoherent correlator 146 is input to the peak detection circuit 224. At this time, the timing for maximum value detection is limited to Imax only by the aperture sent from the controller 227; therefore, the peak detection circuit 224 executes only frequency search.

When the maximum correlation value based on the soft-decision UW data is input thereto, the peak detection circuit 224 sends a maximum value detection pulse to the frequency sweeper 223. In response to the maximum value detection pulse, the frequency sweeper 223 stores the frequency at which the maximum value has been output.

It should be noted that the maximum correlation value that is stored in the peak detection circuit 224 is reset by a reset signal from the controller 227 before the hard decision shifts to the soft decision.

This operation is executed in the second frequency range to be considered. After the completion of the frequency sweep, the frequency sweeper 223 is stored with the frequency (fmax) with which the maximum soft-decision correlation value is output at Imax.

The foregoing processes are the tentative UW position detection and the coarse frequency offset detection.

Next, the controller 227 extracts only the UW data by using Imax, phase-rotates the UW data around the frequency fmax by using the third frequency step ($\Delta df$) and writes the data in the memory 225.

It should be noted that the write address in the memory 225 is given by the controller 227.

In addition, the frequency step ($\Delta df$) is set so that any one of the frequencies swept falls into the range in which the adaptive equalizer 226 is operatable.

This operation is executed in the third frequency range to be considered, and as a result, the memory 225 is stored with the UW pattern phase-rotated with several different frequencies.

The adaptive equalizer 226 activates the read address counter 59 in response to a start pulse supplied from the controller 227 to fetch the received signal data corresponding to the UW 13, which has been phase-rotated with a certain frequency, from the memory 225.

The equalizer 226 that comprises the FF part 1, the FB part 2, the adder 3, the decision circuit 4, the tap-coefficient-update circuit 34 and the switching circuit 6 performs equalization on the data fetched from the memory 225.

After updating the tap-coefficients for the last UW data in the received signal, the tap-coefficient-update circuit 34 fixes the tap-coefficients of the FF and FB parts 1 and 2 to the last updated values, and sends a training completion signal to the read address counter 59.

On receipt of the signal, the read address counter 59 causes the received signal data corresponding to the UW 13 to be read out from the memory 144 and output to the FF part 1 again, symbol by symbol.

The data sequence that is input to the FB part 2 at this time is the known training sequence UW 13, which is input through the reference sequence input port 8.

The data that is input to the FF and FB parts 1 and 2 are subjected to a product-sum operation together with the fixed tap-coefficients. The result of the operation undergoes a hard decision in the decision circuit 4 and then output to the UW data output port 57.

The UW detector 103 receives the UW data which has already been subjected to coherent detection and equalized in the adaptive equalizer 226, determines a correlation between the UW data and the reference UW pattern by the same method as in the prior art, and outputs either a UW detection signal or a UW missed detection signal.

Then, the output of the UW detector 103 and the output of the peak detection circuit 224 are input to the frame synchronization control circuit 228. When a UW detection signal is input thereto, the frame synchronization control circuit 228 recognizes the UW position from the output of the peak detection circuit 224 and then starts frame synchronization control such as aperture control.

At the same time, the frame synchronization control circuit 228 sends a control signal to the controller 227 to cancel the initial acquisition mode. When a UW missed detection signal is output from the UW detector 103, the adaptive equalizer 226 reads out UW data phase-rotated with a different frequency from the memory 225 and repeats the above-described operation.

If no UW detection signal is detected even when the above-described operation is executed for all the UW data stored in the memory 225, UW false detection is declared for the burst (or frame) concerned, and the initial acquisition operation is then executed for the subsequent burst (or frame) from the hard-decision correlation determination.

Embodiment 13

An embodiment of the present invention, will be described below.

Figure 37:
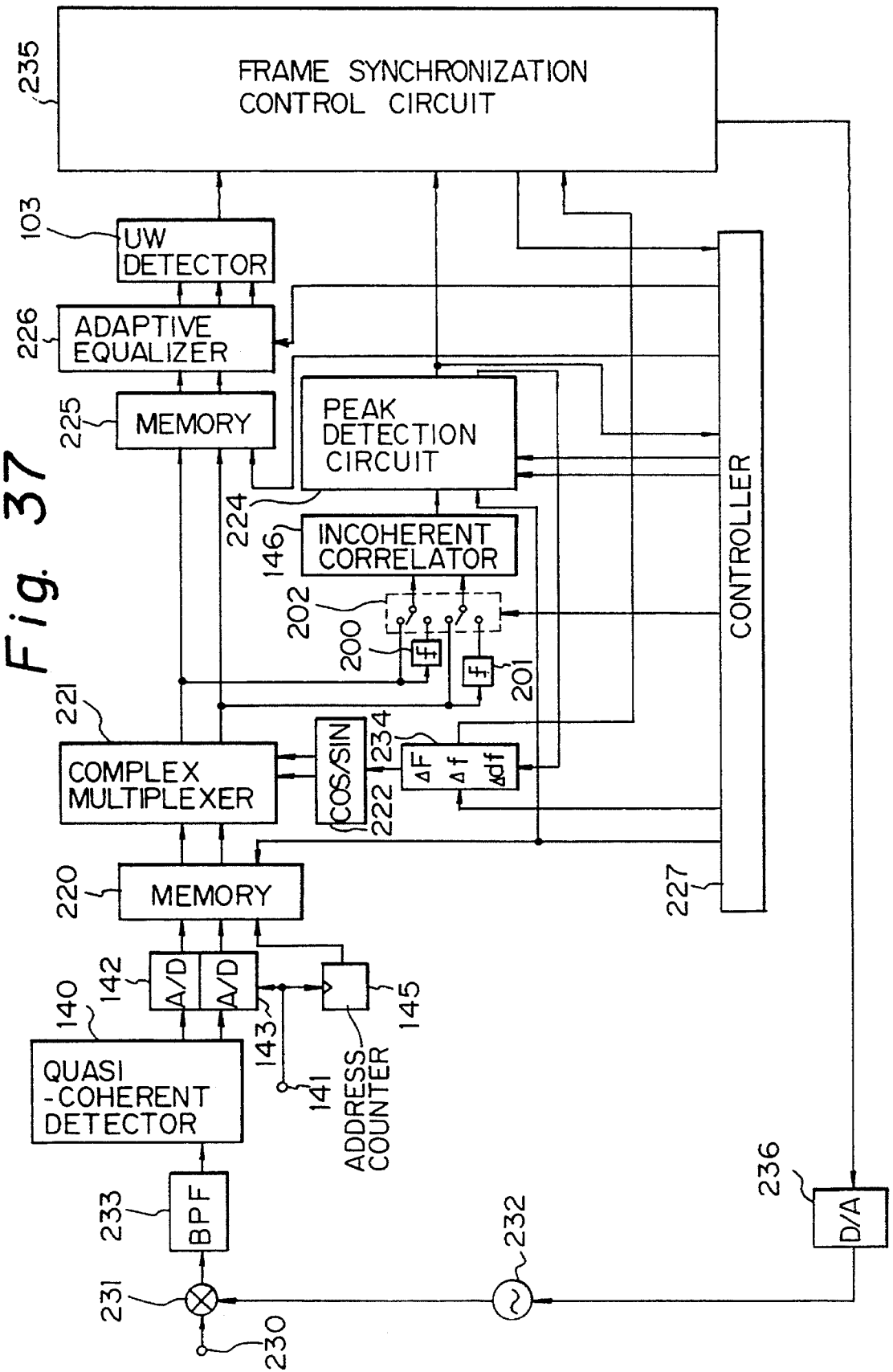
FIG. 37 is a block diagram showing Embodiment 13 of the receiver according to the present invention.

FIG. 37 is a block diagram showing this embodiment of the receiver according to the present invention. In the figure, the same elements as those in FIG. 34, which shows Embodiment 12, are denoted by the same reference numerals, and detailed description thereof is omitted.

In FIG. 37, reference numeral 230 denotes an input port for a received IF (or RF) signal, and 231 a mixer for frequency conversion of the received signal. A VCO 232 outputs a local oscillation signal which is input to the mixer 231. A band pass filter (hereinafter referred to as "BPF") 233 eliminates an unnecessary frequency component from the output of the mixer 231. A frequency sweeper 234 gives phase rotation data to the COS/SIN generator 222 and stores and outputs a frequency with which the incoherent correlator 146 outputs the maximum value.

A frame synchronization control circuit 235 is supplied with the respective outputs of the UW detector 103, the peak detection circuit 224 and the frequency sweeper 234, and it sends a control signal to the controller 227 and effects frame synchronization control and local control. A D/A converter 236 D/A converts a signal that is output from the frame synchronization control circuit 235 to control the VCO 232.

The operation of the receiver shown in FIG. 37 will be explained below.

It is assumed that the coarse frequency offset detection and the tentative UW position detection have already been completed in the initial acquisition operation and that pieces of UW data phase-rotated with several frequencies have already been written in the memory 225.

First, the coarse frequency offset information (fmax) stored in the frequency sweeper 234 and the output (Imax) of the peak detection circuit 224 are input to the frame synchronization control circuit 235. Then, the controller 227 gives a start pulse to the adaptive equalizer 226.

The adaptive equalizer 226 fetches the phase-rotated UW data from the memory 225. The adaptive equalizer 226 equalizes the fetched data and outputs the equalized data to the UW detector 103, as has been described in Embodiment 12.

The UW detector 103 receives the UW data which has been subjected to the coherent detection and equalized in the adaptive equalizer 226, determines a correlation between the equalized UW data and the reference UW pattern by the same method as in the prior art, and outputs either a UW detection signal or a UW missed detection signal.

The above-described processing is executed for all the UW data stored in the memory 225. If the third start frequency, the third frequency step (Δdf) and the number of times of sweep are known in advance (these conditions can be made known by previously giving rotating frequency information used in the frequency sweeper 234 to the frame synchronization control circuit 235), the frame synchronization control circuit 235 can find the frequency offset of each UW data processed by the adaptive equalizer 226 on the basis of the sequence in which UW data are written in the memory 225 and the coarse frequency offset information (fmax).

Figures 38, 39:
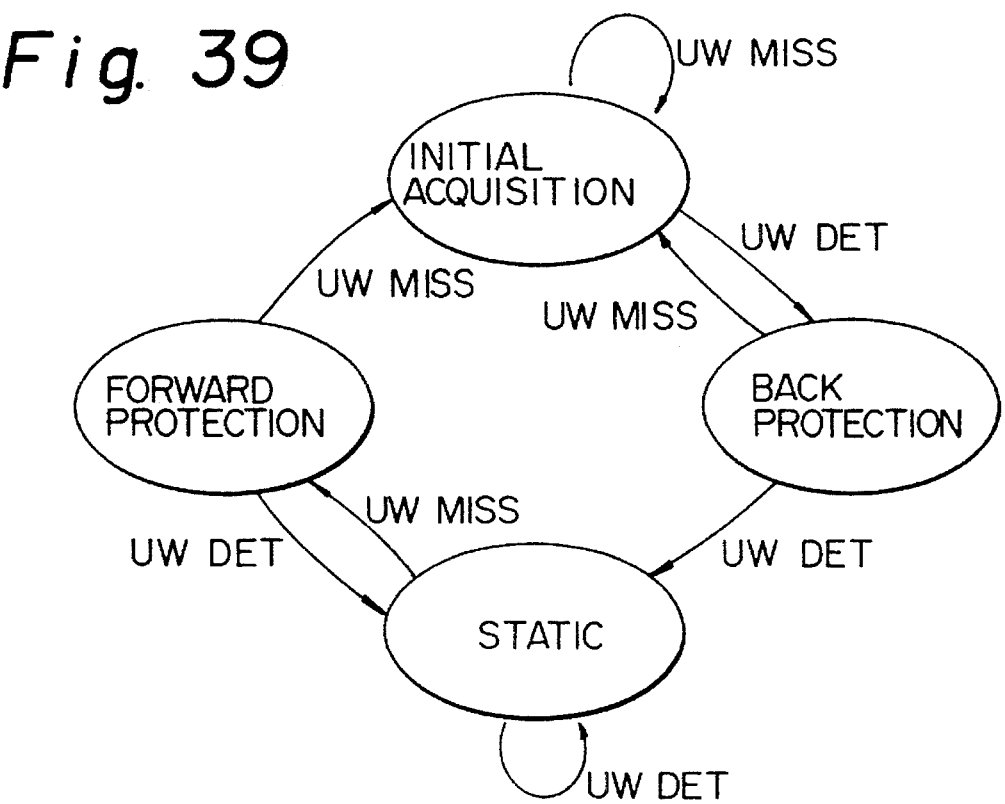
FIG. 38 is a table showing the result of UW detection by a UW detector shown in FIG. 37.
FIG. 39 shows a frame synchronization establishing flow of the receiver.

In this way, UW detection or UW missed detection is decided for each frequency offset, and a table such as that shown in FIG. 38 is generated in the frame synchronization control circuit 235.

Then, the frame synchronization control circuit 235 averages the frequencies with which UW has been detected, and decides the average frequency offset dFave to be the frequency offset of the burst (or frame) concerned. The frame synchronization control circuit 235 then sends a signal equivalent to that frequency to the D/A converter 236.

The D/A converter 236 converts the frequency signal into an analog voltage, thereby controlling the frequency oscillated by the VCO 232, and thus making constant the frequency of the subsequent signal input to the quasi-coherent detector 140.

If no UW is detected from all the UW data stored in the memory 225 (i.e., if UW missed detection is decided for all the UW data), UW false detection is declared for the burst (or frame) concerned, and the initial acquisition operation is then executed for the subsequent burst (or frame).

Embodiment 14

Embodiment 14 of the present invention, will be described below.

In a case where the VCO 232 is controlled as in Embodiment 13, no satisfactory accuracy can be obtained by a single control operation when the receiver shifts from the initial acquisition mode to the static mode due to the following control error factors:

(a) Error due to variations in the accuracy of the V/F characteristics of the VCO 232.

(b) Error due to the accuracy of the Δdf step.

(c) Error due to Doppler effect in the fading channel or random (d) Measuring error due to Gaussian noise.

Accordingly, it is necessary to improve the accuracy by effecting the control a plurality of times.

In general, when a receiver effects frame synchronization control, the initial acquisition mode does not shift directly to the static mode, but a back protection mode is interposed between these two modes.

FIG. 39 is a state transition graph, which is shown in the above-mentioned literature, i.e., Yamamoto and Karo, "TDMA Communications", the Institute of Electronics, Information and Communication Engineers (1989), pp.21.

The following is a description of the way in which the accuracy of frequency control is improved before the receiver shifts to the static mode by making use of the back protection mode used in the frame synchronization control.

The frame synchronization control and frequency control in Embodiment 13 correspond to the initial acquisition mode shown in FIG. 39. Accordingly, the receiver shifts to the back protection mode and then executes similar processing with respect to the data stored in the memory 220.

However, since the UW position is known at this time, it is possible to apply an aperture, and soft-decision data is employed as data input to the incoherent correlator 146.

Then, the peak detection circuit 224 obtains timing at which the incoherent correlator 146 outputs the maximum value within the aperture with respect to UW neighboring data phase-rotated with several different frequencies, thereby detecting a tentative UW position (Imax2) for the second burst (or frame). At the same time, coarse frequency offset information (fmax2) is obtained from the frequency with which the maximum value is output.

Next, UW data that is obtained from the tentative UW position (Imax2) is phase-rotated with several different frequencies around the coarse frequency offset information (fmax2), and the phase-rotated UW data is then sent to the memory 225, in the same way as in Embodiment 13.

It should be noted that the search range and frequency step used in this back protection mode are finer than those used in the initial acquisition mode. The adaptive equalizer 226 equalizes the UW data read out from the memory 225, effects UW detection by using the equalized data, and prepares a table such as that shown in FIG. 38 again, as has been described in Embodiment 13 of the present invention.

Then, the frame synchronization control circuit 235 averages frequencies with which UW has been detected, and sends a frequency control signal to the D/A converter 236.

The above operation is repeated a number of times which is equal to the number of back protection steps, thereby minimizing the frequency offset when the receiver shifts to the static mode.

Embodiment 15

An embodiment of the present invention, will be described below.

Figure 40:
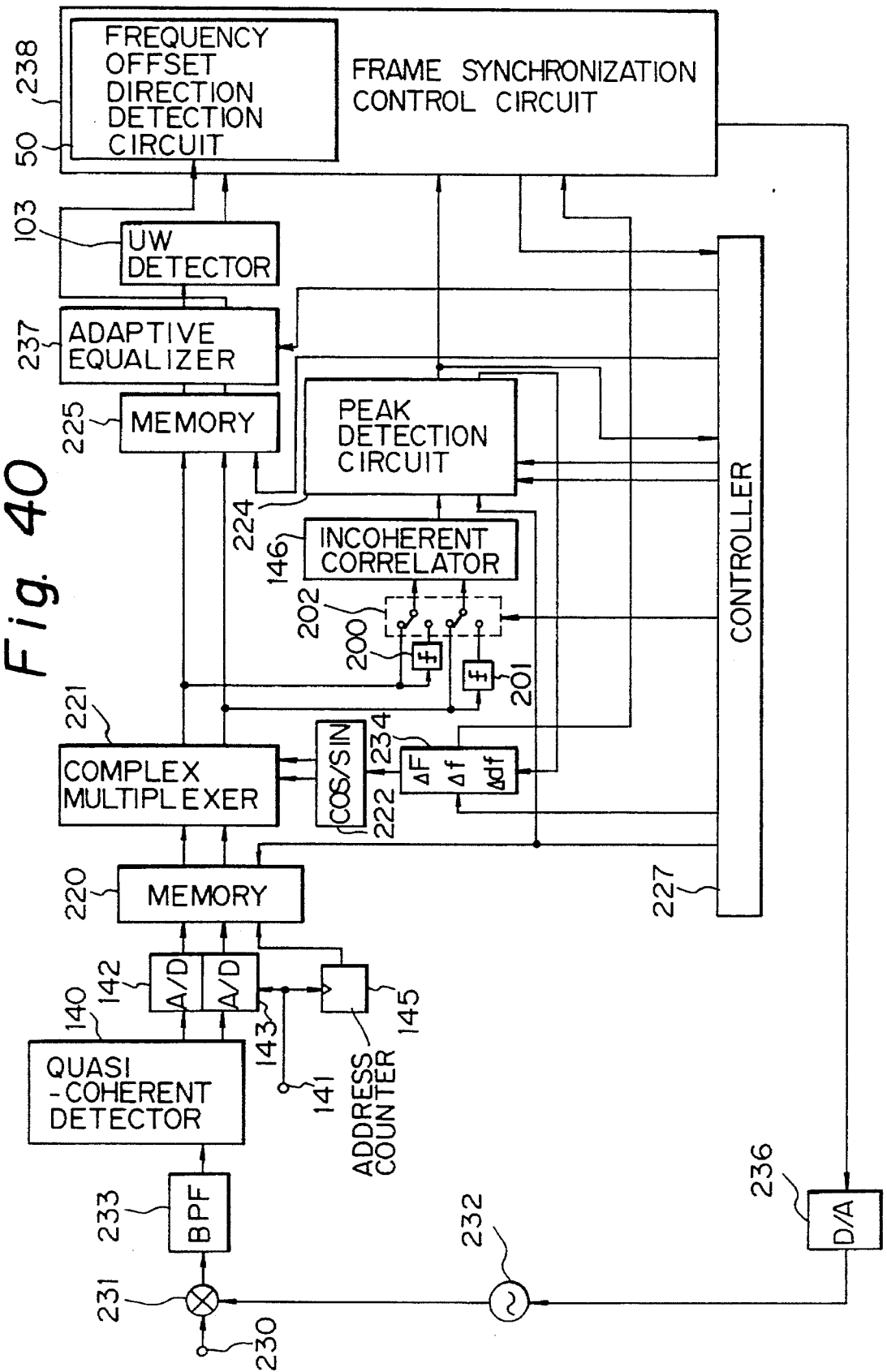
FIG. 40 is a block diagram showing Embodiment 15 of the receiver according to the present invention.

FIG. 40 is a block diagram showing Embodiment 15 of the receiver according to the present invention. In the figure, the same elements as those in FIG. 37, which shows Embodiment 13, are denoted by the same reference numerals, and detailed description is omitted.

Referring to FIG. 40, an adaptive equalizer 237 is equipped with the frequency offset direction estimation circuit 49. A frame synchronization control circuit 238 is equipped with the frequency offset direction detection circuit 50 and supplied with the respective outputs of the adaptive equalizer 237, the UW detector 103, the peak detection circuit 224 and the frequency sweeper 234. The frame synchronization control circuit 238 sends a control signal to the controller 227 and effects frame synchronization control and local control.

Figure 41:
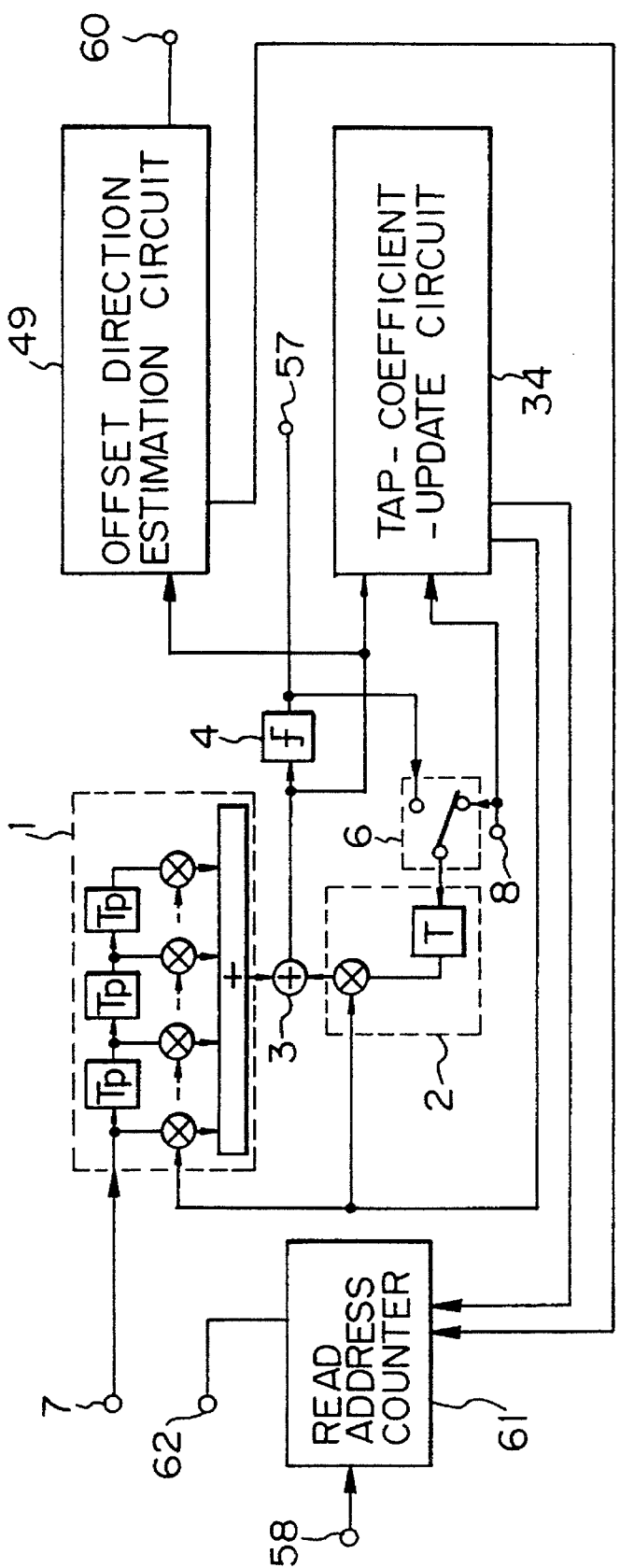
FIG. 41 is a block diagram showing exemplarily the internal arrangement of an adaptive equalizer shown in FIG. 40.
Figure 42:
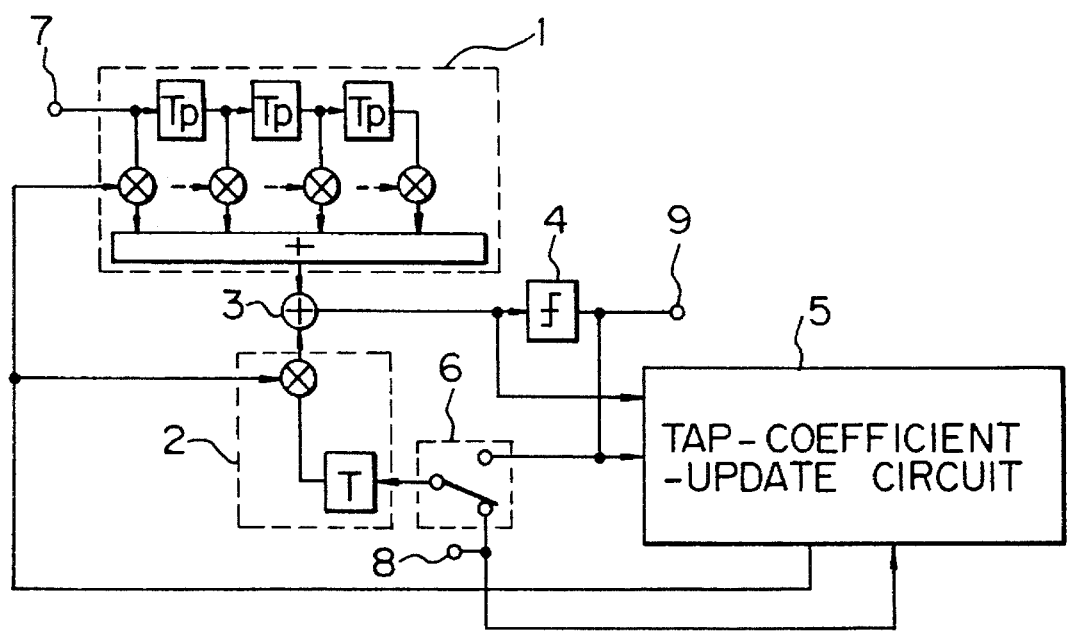
FIG. 42 is a block diagram of a conventional decision-feedback adaptive equalizer.

FIG. 41 is a block diagram showing exemplarily the arrangement of the adaptive equalizer 237. In the figure, the same elements as those in FIGS. 19 and 22, which show Embodiments 5 and 6, respectively, are denoted by the same reference numerals, and detailed description thereof is omitted.

Referring to FIG. 41, an offset direction output port 60 is used to output a result of frequency offset direction estimation to the frame synchronization control circuit 238. A read address counter 61 designates a read address for the memory 225.

There is a possibility that a frequency offset may still remain due to an error in the control of the VCO 232, explained in Embodiment 14, even if the receiver shifts to the static mode after making the frequency offset compensation in the initial acquisition mode or/and the back protection mode, as has been described in Embodiments 13 and 14.

Further, there is a possibility that a frequency offset will newly occur due to a change in the voltage-frequency characteristics of the VCO 232 caused by a change in the temperature inside the receiver.

Accordingly, in this embodiment the frequency control is effected even after the receiver has shifted to the static mode.

The operation of the receiver shown in FIG. 40 will be explained below.

In the initial acquisition mode and the back protection mode, the receiver having the above-described arrangement operates in the manner described in Embodiments 13 and 14.

In the static mode, the adaptive equalizer 237 causes the read address counter 61 to read out the received signal data corresponding to the UW 13 from the memory 225.

For the readout data, the equalizer 237 that comprises the FF part 1, the FB part 2, the adder 3, the decision circuit 4, the tap-coefficient-update circuit 34 and the switching circuit 6 executes the operation that is carried out in the training mode (a), which has been set forth in the paragraph describing the operation of the conventional adaptive equalizer designed for QPSK modulation, thereby successively updating the tap-coefficients.

After updating the tap-coefficients for the last UW data in the received signal, the tap-coefficient-update circuit 34 fixes the tap-coefficients of the FF and FB parts 1 and 2 to the last updated values and sends a training completion signal to the read address counter 61.

On receipt of the signal, the read address counter 61 causes the received signal data corresponding to the UW 13 to be read out from the memory 22S and output to tile FF part 1 again, symbol by symbol.

The data sequence input to the FB part 2 at this time is the known training sequence UW 13 that is input through the reference sequence input port 8.

The data input to the FF and FB parts 1 and 2 is subjected to a product-sum operation together with the fixed tap-coefficients, and the result of the operation is sent to the frequency offset direction estimation circuit 49. In addition, the result of the operation undergoes a hard decision in the decision circuit 4, and the result of the hard decision is output to the UW detector 103 from the UW data output port 57.

The frequency offset direction estimation circuit 49 finds a difference between the inner product obtained for each symbol and the value for the UW 13, which is known, to thereby calculate an error vector for each symbol, and sums up the error vector values thus obtained.

If the received signal has a frequency offset, the result of the product-sum operation is reflected on the error vector; therefore, it is possible to estimate the frequency offset direction (+or −) of the received signal from the sign of the result of the summation.

The result of the frequency offset direction estimation is output to the frame synchronization control circuit 238 from the offset direction output port 60.

The frequency offset direction detection circuit 50 in the frame synchronization control circuit 238 stores the result of frequency offset direction estimation for each burst, and after the estimation results for a predetermined number of bursts have been stored, the circuit 50 calculates the proportion of frequency offset direction estimation results which show the same frequency offset direction every predetermined number of bursts. If the calculated proportion exceeds a predetermined level, the frequency offset direction detection circuit 50 judges that the frequency offset is present in this direction, and sends to the D/A converter 236 a signal that causes a predetermined amount of change in the frequency in the direction in which the frequency offset is compensated for.

The D/A converter 236 converts the frequency change signal into an analog voltage, thereby controlling the frequency oscillated by the VCO 232, and thus making constant the frequency of the subsequent burst input to the quasi-coherent detector 140.

As has been described above, the invention provides an adaptive equalizer wherein, when the received signal is a π/4 shifted QPSK modulation signal, the π/4 phase rotation component is eliminated from the received signal in the complex multiplexer provided in the input stage of the adaptive equalizer, thereby eliminating the need for sorting each output data of the adder and for an arithmetic operation for π/4 phase rotation in the decision circuit. Thus, it is possible to obtain an adaptive equalizer in which the arrangement of the decision circuit is simplified.

The invention provides an adaptive equalizer wherein it is initialized not only at the head of each burst but also in the middle of it, and retraining is executed for reestimation of the channel, thereby minimizing the increase in the bit error rate in the latter half of the burst even when there is a large change in the channel condition during one burst, and thus improving the bit error rate in the burst as a whole.

This embodiment of the invention may also provide an adaptive equalizer wherein only when there is an error in the result of equalization of a training signal in the burst, retraining is executed for reestimation of the channel.

The invention provides an adaptive equalizer wherein UW detection is effected by making a comparison between the inner product of the last updated tap-coefficients for the UW and the received signal read out from the memory and a known training sequence UW, thereby making it possible to minimize the lowering of the UW detection probability even in the presence of frequency selective fading.

The invention provides an adaptive equalizer wherein the received signal is phase-rotated with different frequency offsets, and UW detection is effected with respect to the received signal phase-rotated in this way. Therefore, even if the received signal has a frequency offset, the UW detection probability increases. In addition, the frequency offset can be estimated from the result of UW detection carried out on each of the phase-rotated received signal data. Therefore, by making compensation for the frequency offset, the equalization characteristics are improved.

The invention provides an adaptive equalizer wherein a frequency offset direction of the received signal is estimated for each burst, and the frequency offset directions estimated over several bursts are averaged to detect the frequency offset direction of the received signal, whereby the estimation accuracy is improved. In addition, by making compensation for the frequency offset, the equalization characteristics are improved.

The invention provides a receiver wherein the UW position is tentatively detected by the incoherent correlator, and the demodulator is activated by using the tentatively detected UW position, thereby enabling the demodulator to be activated before the frame synchronization control circuit starts its operation. In addition, it is possible to realize UW detection of high accuracy by effecting UW detection on the output of the demodulator by using the adaptive equalizer. Thus, it is possible to obtain an adaptive equalizer which is capable of effecting frame synchronization control even at the time of initial acquisition and hand off in the presence of frequency selective fading.

The invention provides a receiver wherein when there is variance of input signal level, UW detection is effected by subjecting the input signal of the incoherent correlator to a hard decision, thereby enabling the influence of the variance of input signal level to be eliminated, whereas, when UW detection is performed in a range where the variance of input signal level can be ignored, the input signal of the incoherent correlator is subjected to a soft decision, thereby allowing the desired operation.

The invention provides a receiver wherein when UW data is to be sent to the adaptive equalizer, coarse AFC is effected in advance by using the output of the incoherent correlator, and a plurality of UW data which have been phase-rotated at minute steps around the frequency attained by the coarse AFC are sent to the adaptive equalizer to effect UW detection for each UW data, thereby permitting UW detection of high accuracy.

The invention provides a receiver wherein a frequency offset of the received signal input to the adaptive equalizer is fed back to the VCO (voltage controlled oscillator), thereby compensating for the frequency offset. Accordingly, even when the received signal has a frequency offset, stable demodulation can be realized.

The invention provides a receiver wherein even when there is a frequency offset which cannot be compensated for in the initial acquisition mode and the back protection mode, a frequency offset direction is estimated from the inner product of the UW data for each burst during the static mode, and the frequency offset directions thus detected over several bursts are averaged to detect a direction in which the frequency offset is present. Then, compensation for the frequency offset is made on the basis of the result of the frequency offset direction detection, thereby realizing stable demodulation.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. An adaptive equalizer comprising:

a transversal filter having an input for receiving a signal, tap-coefficients, and an output, a decision part having an input connected to the output of the transversal filter and an output, a tap-coefficient-update part that updates the tap-coefficients of said transversal filter according to a tap-coefficient-update algorithm a complex multiplexer that phase-rotates the signal input to said transversal filter, a differential decoder that differentially decodes the output of said decision part, and means for eliminating a $\pi/4$ phase rotation component in the received signal whereby the received signal is equalized.

2. An adaptive equalizer comprising:

a transversal filter having an input for receiving a signal indicative of a burst, tap-coefficients, and an output, a decision part having an input connected to the output of the transversal filter and an output, a tap-coefficient-update part that updates the tap-coefficients of said transversal filter according to a tap-coefficient-update algorithm, means for initializing said tap-coefficient-update part and the tap-coefficients of said transversal filter to a given state both when the burst starts and at another time during the one burst; and means for retraining said transversal filter by using a training sequence contained in the one burst.

3. An adaptive equalizer comprising:

a transversal filter having an input for receiving a signal indicative of a burst, tap-coefficients, and providing an equalized output, a decision part having an input connected to the output of the transversal filter and an output, a tap-coefficient-update part that updates tap-coefficients of said transversal filter according to a tap-coefficient-update algorithm, means for initializing said tap-coefficient-update part and the tap-coefficients of said transversal filter a plurality of times during one burst;

means for training said transversal filter by using a training sequence contained in the burst whereby the training sequence is equalized;

means for making a comparison between the equalized training sequence contained in the burst and a known training sequence; and wherein said means for initializing said tap-coefficients and said means for training are operative only when there is an error in said equalized training sequence.

4. An adaptive equalizer comprising:

a transversal filter having an input for receiving a signal, tap-coefficients, and an output, a decision part having an input connected to the output of the transversal filter and an output, a tap-coefficient-update part that updates the tap-coefficients of said transversal filter according to a tap-coefficient-update algorithm a memory for storing a received signal; and a unique word detector that effects unique word detection by using an inner product of the tap-coefficients for the unique word and the received signal stored in said memory.

5. An adaptive equalizer comprising:

a transversal filter having an input for receiving a signal, tap-coefficients, and an output, a decision part having an input connected to the output of the transversal filter and an output, a tap-coefficient-update part that updates the tap-coefficients of said transversal filter according to a tap-coefficient-update algorithm;

a memory for storing a received signal;

a unique word detector that effects unique word detection by using the inner product of the tap-coefficients for the unique word and the received signal stored in said memory;

means for subjecting unique word data stored in said memory to an arithmetic operation to provide phase rotations corresponding to different frequency offsets;

unique word detection means that sends the result of said arithmetic operation to said transversal filter and effects unique word detection with respect to said unique word data; and means for estimating a frequency offset by using the result of said unique word detection and for compensating for said frequency offset.

6. An adaptive equalizer comprising:

a transversal filter having an input for receiving a signal, tap-coefficients, and an output, a decision part having an input connected to the output of the transversal filter and an output, a tap-coefficient-update part that updates the tap-coefficients of said transversal filter according to a tap-coefficient-update algorithm a memory disposed connected to the input of said transversal filter to store a received signal; and means for estimating for each burst a frequency offset direction by using the tap-coefficients for the unique word and the received signal stored in said memory, and for detecting a frequency offset direction by averaging the frequency offset directions estimated for each burst, and for making compensation for frequency offset at a certain minute step.

7. A receiver comprising:

means for quasi-coherently detecting a received signal;

a memory for temporarily storing received data output from said quasi-coherent detection means;

an address counter that designates a write address for said memory;

an incoherent correlator that determines correlation between a received data pattern output from said quasi-coherent detection means and a known unique word pattern;

means for tentatively detecting a unique word position on the basis of an output of said address counter and an output of said incoherent correlator;

an adaptive equalizer that equalizes the received data in said memory to provide equalized data on the basis of an output of said unique word position tentative detection means;

a unique word detector that detects a unique word pattern on the basis of said equalized data; and means for effecting frame synchronization control on the basis of an output of said unique word tentative detection means and an output of said unique word detector.

8. A receiver according to claim 7, further comprising means for selecting one of a hard decision value and a soft decision value, which are obtained from data output from said quasi-coherent detection means, as one signal input to said incoherent correlator.

9. A receiver according to claim 8, further comprising means by which when unique word data is to be sent to said adaptive equalizer, coarse automatic frequency control is effected in advance by using the output of said incoherent correlator, and a plurality of unique word data which have been phase-rotated at minute steps around the frequency attained by said coarse automatic frequency control are sent to said adaptive equalizer to effect unique word detection for each unique word data.

10. A receiver according to claim 9, further comprising:

a mixer which effects frequency conversion of the received signal;

a voltage controlled oscillator which gives a local oscillator output to said mixer; and means for detecting a frequency offset in said adaptive equalizer and for feeding the frequency offset back to said voltage controlled oscillator to make compensation for frequency offset.

11. A receiver according to claim 10, further comprising:

means for estimating a frequency offset direction for each burst in said adaptive equalizer by using the last updated tap-coefficients for the unique word and the received signal stored in said memory;

means for detecting a frequency offset direction by averaging the frequency offset directions estimated for each burst; and means for making compensation for a frequency offset when detected by changing the control voltage applied to said voltage controlled oscillator in a direction in which said frequency offset is cancelled.

12. A method for receiving a signal, comprising the steps of:

quasi-coherently detecting the signal;

temporarily storing the detected signal in a memory;

designating a write address for said memory;

determining a correlation between the detected signal and a known unique word pattern;

tentatively detecting a unique word position on the basis of the write address and said correlation;

equalizing the detected signal in said memory to provide equalized data on the detected unique word position;

detecting a unique word pattern on the basis of the equalized data; and effecting frame synchronization control on the basis of an the detected unique word position and the detected unique word pattern.

13. The method of claim 12, further comprising the step of selecting one of a hard decision value and a soft decision value, which are obtained from the detected signal, as the detected signal used in the step of determining the correlation.

14. The method of claim 13, further comprising the steps of, effecting coarse automatic frequency control advance by using the determined correlation, and phase-rotating a plurality of unique word data at minute steps around the frequency attained by said coarse automatic frequency control before the step of equalizing the detected signal.

15. The method of claim 14, further comprising:

frequency converting the detected signal;

generating a local oscillating signal; and detecting a frequency offset in said step of equalizing and feeding the detected frequency offset back to said voltage controlled oscillator to make compensation for frequency offset.

16. The method of claim 15, further comprising:

estimating a frequency offset direction for each burst in said step of equalizing by using the tap-coefficients for the unique word and the received signal stored in said memory;

detecting a frequency offset direction by averaging the frequency offset directions estimated for each burst; and making compensation for a frequency offset when detected by changing the control voltage applied to said voltage controlled oscillator in a direction in which said frequency offset is cancelled.

17. A method for equalizing an input signal, comprising the steps of:

phase-rotating the input signal by $(5/4)\pi$;

applying the phase-rotated input signal to an adaptive equalizer in which input data is phase rotated by $-(5/4)\pi$; and whereby a $\pi/4$ phase-rotation component is eliminated from the input signal.

18. A method for equalizing an input signal defining a burst having first and second parts, each part having a start and an end, comprising the steps of:

initializing tap coefficients of a transversal filter and a tap coefficient error covariance matrix at the start of the first part of the burst;

training the transversal filter by updating the tap coefficients of the transversal filter according to an output obtained by applying the first part of the burst to the transversal filter and the tap coefficient error covariance matrix;

initializing the tap coefficients of the transversal filter and the tap coefficient error covariance matrix at the start of the second part of the burst;

retraining the transversal filter by updating the tap coefficients according to an output obtained by applying the second part of the burst to the transversal filter and the tap coefficient error covariance matrix.

19. The method of claim 18, further comprising the step of comparing the equalized training sequence to a known training sequence to detect an error in the equalized training sequence, and wherein the step of retraining is performed only when an error in the equalized training sequence is detected in the step of comparing.

20. A method for equalizing an input signal, comprising the steps of:

(a) training a transversal filter by updating tap coefficients of the transversal filter according to an output obtained by applying the input signal to the transversal filter;

(b) setting the tap coefficients to most recently updated values; and (c) after the step of setting (i) applying the input signal to a feedforward part of the transversal filter;

(ii) applying a known training sequence to a feedback part of the transversal filter;

(iii) obtaining an output of the traversal filter as a result of the steps of applying;

(iv) subjecting the output of the transversal filter to a decision to obtain an output sequence; and (v) comparing the output sequence to the known training sequence to determine whether a unique word is detected.

21. A method for equalizing an input signal, comprising the steps of:

training a transversal filter by updating tap coefficients of the transversal filter according to an output obtained by applying the input signal to the transversal filter;

applying the input signal to a feedforward part of the transversal filter;

applying a known training sequence to a feedback part of the transversal filter;

subjecting the output of the transversal filter to a decision;

comparing the result of the decision to the known training sequence;

phase-rotating the input signal in response to no detection of the unique word pattern;

repeating the steps of applying, subjecting and comparing using the phase-rotated signal; and determining the frequency offset of the input signal.

22. A method for equalizing an input signal, comprising the steps of:

training a transversal filter by updating tap coefficients of the transversal filter according to an output obtained by applying the input signal to the transversal filter;

applying the input signal to a feedforward part of the transversal filter;

applying a known training sequence to a feedback part of the transversal filter;

subjecting the output of the transversal filter to a decision;

comparing the result of the decision to the known training sequence to obtain an error vector;

estimating a frequency offset direction using the error vector; and compensating for frequency offset in the input signal using the estimated frequency offset direction.

23. An adaptive equalizer for equalizing the input signal having a burst with first and second parts, comprising:

a transversal filter having an input, an output, and a plurality of tap coefficients;

means for initializing a tap coefficient error covariance matrix and the tap coefficients at the start of the first part of the burst;

means for updating the tap coefficients according to both the output of the transversal filter obtained by applying the first part of the burst to the transversal filter and the tap coefficient error covariance matrix;

means for initializing the tap coefficients and the tap coefficient error covariance matrix at the start of the second part of the burst; and means for updating the tap coefficients according to both the output of the transversal filter obtained by applying the second part of the burst to the transversal filter and the tap coefficient error covariance matrix.

24. An adaptive equalizer for equalizing the input signal having a burst with first and second parts, comprising:

a transversal filter having an input, an output, and a plurality of tap coefficients;

means for initializing a tap coefficient error covariance matrix and the tap coefficients;

means for updating the tap coefficients in response to the output of the transversal filter obtained by applying a part of the burst to the transversal filter and the tap coefficient error covariance matrix;

means, operative in response to the start of the first part of the burst, for operating said means for initializing and the means for updating, wherein the part of the burst applied to the transversal filter for the means for updating is the first part; and means, operative in response to the start of the second part of the burst, for operating said means for initializing and the means for updating, wherein the part of the burst applied to the transversal filter for the means for updating is the second part.

25. A system for equalizing an input signal, comprising:

a transversal filter having a feedforward part, a feedback part, an input, an output, and a plurality of tap coefficients;

means for updating the tap coefficients of the transversal filter according to an output obtained by applying the input signal to the transversal filter;

means, operative after an update of the tap coefficients, for setting the tap coefficients of the transversal filter to most recently updated values;

means, operative after the tap coefficients are set to the most recently updated values, for applying the input signal to the feedforward part of the transversal filter;

means, operative after the tap coefficients are set to the most recently updated values, for applying a known training sequence to the feedback part of the transversal filter;

means, operative after the tap coefficients are set to the most recently updated values, for subjecting the output of the transversal filter to a decision to obtain an output sequence; and means for comparing the output sequence to the known training sequence to determine whether a unique word is detected.

26. A system for equalizing the input signal, comprising:

a transversal filter having an input, an output, and a plurality of tap coefficients;

means for training the transversal filter by updating tap coefficients on the transversal filter according to an output obtained by applying the input signal to the transversal filter;

means for estimating a frequency offset direction of the input signal according to an average of frequency offset directions estimated for each burst; and means for compensating for a frequency offset in the input signal using the estimated frequency offset.

27. A method for receiving a signal, comprising the steps of:

quasi-coherently detecting the signal;

temporarily storing the detected signal in a memory;

designating a write address for said memory;

determining a correlation between the detected signal and a known unique word pattern using an incoherent correlator;

tentatively detecting a unique word position by detecting a maximum value in the incoherent correlator within an aperture;

equalizing the detected signal in said memory to provide equalized data on the detected unique word position;

detecting a unique word pattern on the basis of the equalized data; and effecting frame synchronization control on the basis of the detected unique word position and the detected unique word pattern.

28. An apparatus for equalizing an input signal using a transversal filter, comprising:

means for training the transversal filter by updating tap coefficients of the transversal filter according to an output obtained by applying the input signal to the transversal filter;

means for applying the input signal to a feedforward part of the transversal filter;

means for applying a known training sequence to a feedback part of the transversal filter;

means for subjecting the output of the transversal filter to a decision;

means for comparing the result of the decision to the known training sequence;

means for phase-rotating the input signal in response to no detection of the unique word pattern;

means for repeatedly operating the means for applying, means for subjecting and means for comparing using the phase-rotated signal; and means for determining the frequency offset of the input signal.

29. An apparatus for equalizing an input signal using a transversal filter, comprising:

means for training the transversal filter by updating tap coefficients of the transversal filter according to an output obtained by applying the input signal to the transversal filter;

means for applying the input signal to a feedforward part of the transversal filter;

means for applying a known training sequence to a feedback part of the transversal filter;

means for subjecting the output of the transversal filter to a decision;

means for comparing the result of the decision to the known training sequence to obtain an error vector;

means for estimating a frequency offset direction using the error vector; and means for compensating for frequency offset in the input signal using the estimated frequency offset direction.

30. An apparatus for equalizing an input signal, comprising:

a transversal filter having a feedforward part, a feedback part, and tap coefficients, wherein the feedforward part has an input for receiving the input signal and wherein the feedback part has an input for receiving a known training sequence;

means for updating tap coefficients of the transversal filter according to an output obtained by applying the input signal to the transversal filter;

means for subjecting the output of the transversal filter to a decision;

means for comparing the result of the decision to the known training sequence;

means for phase-rotating the input signal in response to no detection of the unique word pattern;

means for repeatedly operating the means for subjecting and means for comparing including means for applying the phase-rotated signal to the input of the feedforward part; and means for determining the frequency offset of the input signal.

31. An apparatus for equalizing an input signal, comprising:

a transversal filter having a feedforward part, a feedback part, and tap coefficients, wherein the feedforward part has an input for receiving the input signal and wherein the feedback part has an input for receiving a known training sequence;

means for updating tap coefficients of the transversal filter according to an output obtained by applying the input signal to the transversal filter;

means for subjecting the output of the transversal filter to a decision;

means for comparing the result of the decision to the known training sequence to obtain an error vector;

means for estimating a frequency offset direction using the error vector; and means for compensating for frequency offset in the input signal using the estimated frequency offset direction.

* * * * *